US012566507B2

(12) United States Patent
Lamberty

(10) Patent No.: US 12,566,507 B2
(45) Date of Patent: ***Mar. 3, 2026

(54) METHOD AND APPARATUS FOR MANIPULATING CONTENT IN AN INTERFACE

(71) Applicant: West Texas Technology Partners, LLC, Washington, DC (US)

(72) Inventor: Michael Lamberty, Santa Clara, CA (US)

(73) Assignee: West Texas Technology Partners, LLC, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/455,875

(22) Filed: Aug. 25, 2023

(65) Prior Publication Data

US 2024/0241585 A1     Jul. 18, 2024

Related U.S. Application Data

(63) Continuation of application No. 17/377,051, filed on Jul. 15, 2021, now Pat. No. 11,740,704, which is a continuation of application No. 16/748,589, filed on Jan. 21, 2020, now Pat. No. 11,079,855, which is a continuation of application No. 16/377,724, filed on Apr. 8, 2019, now Pat. No. 10,585,492, which is a continuation of application No. 15/614,512, filed on Jun. 5, 2017, now Pat. No. 10,296,100, which is a (Continued)

(51) Int. Cl.
G09G 5/00     (2006.01)
G02B 27/01     (2006.01)

G06F 1/16     (2006.01)
G06F 3/01     (2006.01)

(52) U.S. Cl.
CPC ........... G06F 3/017 (2013.01); G02B 27/017 (2013.01); G06F 1/163 (2013.01); G06F 3/011 (2013.01); *G02B 2027/014* (2013.01)

(58) Field of Classification Search
CPC .......... G06F 3/017; G06F 1/163; G06F 3/011; G02B 27/017; G02B 2027/014
See application file for complete search history.

(56) References Cited

U.S. PATENT DOCUMENTS

| 7,400,322 | B1 | 7/2008 | Urbach |
| 9,367,136 | B2 | 6/2016 | Latta et al. |

(Continued)

*Primary Examiner* — Adam R. Giesy
(74) *Attorney, Agent, or Firm* — Cadwalader, Wickersham & Taft LLP

(57) ABSTRACT

A method includes sensing entities in first and second domains. If a first stimulus is present and an entity is in the first domain, the entity is transferred from first to second domain via a bridge. If a second stimulus is present and an entity is in the second domain, the entity is transferred from second first domain via the bridge. At least some of the first domain is outputted. An apparatus includes a processor that defines first and second domains and a bridge that enables transfer of entities between domains, an entity identifier that identifies entities in the domains, a stimulus identifier that identifies stimuli, and a display that outputs at least some of the first domain. The processor transfers entities from first to second domain responsive to a first stimulus, and transfers entities from second to first domain responsive to a second stimulus.

23 Claims, 32 Drawing Sheets

Related U.S. Application Data continuation of application No. 14/019,249, filed on Sep. 5, 2013, now Pat. No. 9,710,067.

(56) References Cited

U.S. PATENT DOCUMENTS

| | | | |
|---|---|---|---|
| 11,163,367 B2 | 11/2021 | Mason et al. | |
| 2002/0037768 A1 | 3/2002 | Ohshima | |
| 2005/0212749 A1 | 9/2005 | Marvit et al. | |
| 2011/0193939 A1 | 8/2011 | Vassigh et al. | |
| 2011/0291926 A1 | 12/2011 | Gokturk et al. | |
| 2012/0066648 A1 | 3/2012 | Rolleston et al. | |
| 2012/0139907 A1 | 6/2012 | Lee et al. | |
| 2012/0180000 A1 | 7/2012 | Weng et al. | |
| 2013/0083062 A1 | 4/2013 | Geisner et al. | |
| 2013/0265267 A1 | 10/2013 | Victor | |
| 2013/0265284 A1 | 10/2013 | Yun et al. | |
| 2013/0335303 A1 | 12/2013 | Maciocci et al. | |
| 2013/0335573 A1 | 12/2013 | Forutanpour et al. | |
| 2014/0002444 A1 | 1/2014 | Bennett et al. | |
| 2014/0002491 A1* | 1/2014 | Lamb ................... | G02B 27/017 345/633 |
| 2014/0028716 A1 | 1/2014 | Yeh | |
| 2014/0320408 A1 | 10/2014 | Zagorsek et al. | |
| 2014/0359540 A1 | 12/2014 | Kelsey et al. | |
| 2023/0122811 A1 | 4/2023 | Putman et al. | |

* cited by examiner

104

102

204

208

206

202

304C

306C

308C

302C

306D

308D

304D

302D

1104

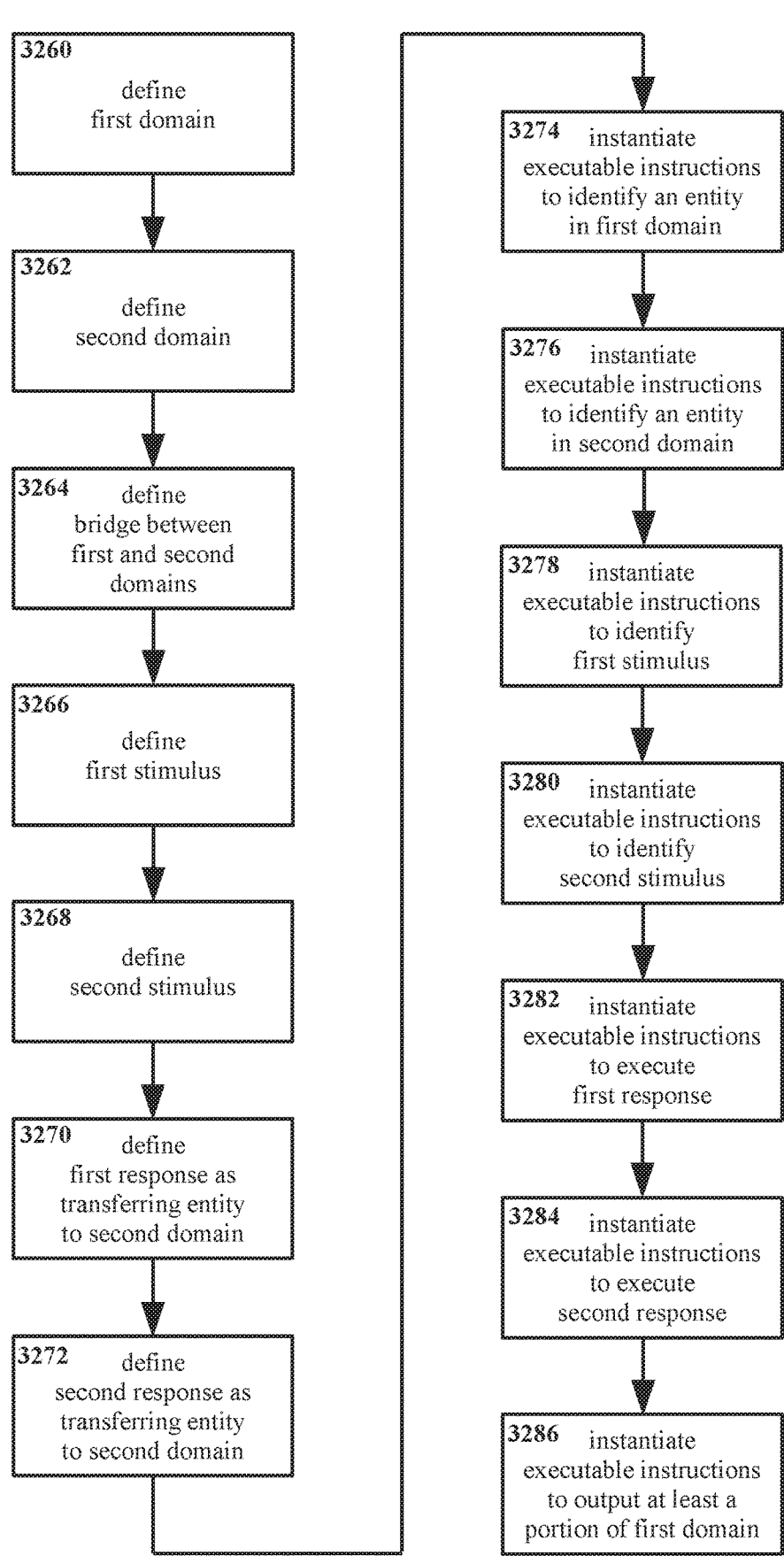

3260 define first domain

3262 define second domain

3264 define bridge between first and second domains

3266 define first stimulus

3268 define second stimulus

3270 define first response as transferring entity to second domain

3272 define second response as transferring entity to second domain

3274 instantiate executable instructions to identify an entity in first domain

3276 instantiate executable instructions to identify an entity in second domain

3278 instantiate executable instructions to identify first stimulus

3280 instantiate executable instructions to identify second stimulus

3282 instantiate executable instructions to execute first response

3284 instantiate executable instructions to execute second response

3286 instantiate executable instructions to output at least a portion of first domain

FIG. 32

METHOD AND APPARATUS FOR MANIPULATING CONTENT IN AN INTERFACE

CROSS-REFERENCE TO RELATED APPLICATION

This application is a continuation of U.S. patent application Ser. No. 17/377,051, filed Jul. 15, 2021, which is a continuation of U.S. patent application Ser. No. 16/748,589, filed Jan. 21, 2020, which is now U.S. Pat. No. 11,079,855, which is a continuation of U.S. patent application Ser. No. 16/377,724, filed Apr. 8, 2019, which is now U.S. Pat. No. 10,585,492, which is a continuation of U.S. patent application Ser. No. 15/614,512, filed Jun. 5, 2017, which is now U.S. Pat. No. 10,296,100, which is a continuation of U.S. patent application Ser. No. 14/019,249, filed Sep. 5, 2013, which is now U.S. Pat. No. 9,710,067. All of these applications are hereby incorporated by reference in their entirety for all purposes.

FIELD OF THE INVENTION

This invention relates to manipulation of content in an interface. More particularly, the invention relates to establishing distinct first and second domains of an interface, manipulating entities therein, and moving entities therebetween.

DESCRIPTION OF RELATED ART

In some interfaces a generally open environment is provided that enables entities to be stored, arranged, manipulated, etc. within the environment. For example, certain graphical user interfaces for PCs, tablets, etc. have a desktop supporting icons that represent programs, files, folders, constructs such as "trash", etc.

However, such an approach has limits. A single undifferentiated space offers relatively few options for arranging and disposing entities therein; to continue the example of a PC desktop, icons either are on the desktop or not. Also, a single space can rapidly become crowded with entities. Also, where PC desktops and similar approaches typically are themselves static or nearly so, more dynamic or interactive environments such as might be encountered with virtual or augmented reality systems may be less well-suited for static, single-domain approaches. This may be particularly true for environments wherein multiple users may access and/or manipulate the environments.

There is a need for a simple, efficient method and apparatus for manipulating and/or storing content within an interface.

BRIEF SUMMARY OF THE INVENTION

The present invention contemplates a variety of systems, apparatus, methods, and paradigms for manipulating content in an interface.

In one embodiment of the present invention, a method is provided that includes identifying the presence of at least one entity in a first domain and/or a second domain substantially distinct from the first domain, the first and second domains each having at least two dimensions, the first and second domains being in communication via a bridge so as to enable transfer of the entity between the first and second domains therewith. The method includes identifying the presence of a first stimulus, and identifying the presence of a second stimulus. If the first stimulus is present and the entity is present in the first domain, the entity is transferred from the first domain to the second domain. If the second stimulus is present and the entity is present in the second domain, the entity is transferred from the second domain to the first domain. The method includes generating output data suitable for outputting at least a portion of the first domain.

At least a portion of the second domain may be coincident with at least a portion of the first domain in the at least two dimensions, with the first and second domains being distinct in at least a dimension other than the at least two dimensions.

At least a portion of the second domain may be substantially adjacent at least a portion of the first domain.

The first and second domains may be distinct in the at least two dimensions thereof.

The bridge may be substantially fixed with respect to the visual field of a viewer. The bridge may be substantially fixed with respect to the center of mass of a viewer. The bridge may be disposed substantially outside the visual field of a viewer. The bridge may be disposed substantially at the edge of the visual field of a viewer. The bridge may be disposed within the visual field of a viewer.

The bridge may be movable. The bridge may be movable responsive to a viewer command. The bridge may be biased toward at least one of a rest position therefor and a rest orientation therefor. The rest position may be substantially outside the visual field of a viewer. The rest position may be substantially at the edge of a visual field of a viewer. The rest position may be within the visual field of a viewer.

The content of the second domain may not be resolved. The content of the second domain may be selectively resolved, such that the content is resolved to at least one first viewer but is not resolved to at least one second viewer. The content of the second domain may be selectively resolved, such that the content is resolved with a first configuration to at least one first viewer and with a second configuration to at least one second viewer.

The entity may be a graphical icon, a virtual object, an augmentation, executable instructions, stored data, a control, and/or a menu.

The first and second domains may each include three dimensions. The first domain may be a virtual reality environment and/or an augmented reality environment. The second domain may be a virtual reality environment and/or an augmented reality environment.

The bridge may be visible. The bridge may be substantially invisible.

The first stimulus may include a user manipulation. The first stimulus may include a hand posture, a hand gesture, a stylus posture, and/or a stylus gesture. The first stimulus may include an end-effector engaging the entity in the first domain and moving the entity from the first domain through the bridge to the second domain while the end-effector is engaged with the entity. The first stimulus may include engaging the entity in the first domain and executing a hand posture, a hand gesture, a stylus posture, and/or a stylus gesture in the first domain. The first stimulus may include passing an end-effector through the bridge. The first stimulus may include passing the end-effector through the bridge substantially along a first path, wherein passing the end-effector through the bridge other than substantially along a first path does not constitute execution of the first stimulus. The first stimulus may include passing the end-effector through the bridge while executing one a first posture with the end-effector, wherein passing the end-effector through the bridge other than while executing a first posture does not constitute execution of the first stimulus. The first stimulus may include passing the end-effector through the bridge while executing a first gesture with the end-effector, wherein passing the end-effector through the bridge other than while executing a first gesture does not constitute execution of the first stimulus.

The second stimulus may include a user manipulation. The second stimulus may include a hand posture, a hand gesture, a stylus posture, and/or a stylus gesture in the first domain. The second stimulus may include an end-effector engaging the entity in the second domain and moving the entity from the second domain through the bridge to the first domain while the end-effector is engaged with the entity. The second stimulus may include engaging the entity in the second domain and executing a hand posture, a hand gesture, a stylus posture, and/or a stylus gesture in the second domain. The second stimulus may include passing an end-effector through the bridge. The second stimulus may include passing the end-effector through the bridge substantially along a second path, wherein passing the end-effector through the bridge other than substantially along a second path does not constitute execution of the second stimulus. The second stimulus may include passing the end-effector through the bridge while executing a second posture with the end-effector, wherein passing the end-effector through the bridge other than while executing a second postures does not constitute execution of the second stimulus. The second stimulus may include passing the end-effector through the bridge while executing a second gesture with the end-effector, wherein passing the end-effector through the bridge other than while executing a second gesture does not constitute execution of the second stimulus.

The first and second stimuli may be substantially similar.

The bridge may substantially correspond with at least a portion of the outer edge of the visual field of a viewer. The bridge may substantially correspond with substantially all of the outer edge of the visual field of a viewer.

The first domain may substantially correspond with the visual field of a user, and the second domain may be disposed outward from the first domain.

The method may include outputting some or all of the first domain through at least one window. The method may include outputting some or all of the first domain through stereo windows. The window may substantially correspond to the visual field of a viewer.

The method may include outputting some or all of the first domain through stereo windows, the stereo windows substantially corresponding to the visual field of a viewer, wherein: the first and second domains each include three spatial dimensions, substantially all of the second domain is coincident with at least a portion of the first domain in three spatial dimensions, the first and second domains are distinct in a non-spatial dimension, the bridge substantially corresponds with at least a portion of the outer edge of a visual field of a viewer such that the second domain is substantially outward of the outer edge of the visual field with the bridge being substantially fixed with respect to the visual field, the bridge is movable with respect to the first domain, the second domain is substantially fixed with respect to the bridge, the content of the second domain is not resolved, the first stimulus includes an end-effector engaging the entity in the first domain and moving the entity from the first domain through the bridge to the second domain while the end-effector is engaged with the entity, and the second stimulus includes an end-effector engaging the entity in the second domain and moving the entity from the second domain through the bridge to the first domain while the end-effector is engaged with the entity.

The method may include outputting some or all of the first domain through stereo windows, the stereo windows substantially corresponding to the visual field of a viewer, wherein: the first and second domains each include three spatial dimensions, at least a portion of the second domain is adjacent at least a portion of the first domain, the bridge substantially corresponds with at least a portion of the outer edge of the visual field of a viewer such that the second domain is substantially outward of the outer edge of the visual field with the bridge being substantially fixed with respect to the visual field, the bridge is movable with respect to the first domain, the second domain is substantially fixed with respect to the bridge, the content of the second domain is not resolved, the first stimulus includes an end-effector engaging the entity in the first domain and moving the entity from the first domain through the bridge to the second domain while the end-effector is engaged with the entity, and the second stimulus includes an end-effector engaging the entity in the second domain and moving the entity from the second domain through the bridge to the first domain while the end-effector is engaged with the entity.

The second domain may also be in communication with a beta second domain via the bridge so as to enable transfer of the entity between the second domain and the beta second domain therewith, with the method further including identifying the presence of third stimulus and, if the third stimulus is present and the entity is present in the second domain, transferring the entity from the second domain to the beta second domain.

In another embodiment of the present invention, a method is provided that includes defining in a processor first and second domains, the first and second domains each including at least two dimensions, the second domain being substantially distinct from the first domain. The method includes defining in the processor a bridge between the first and second domains so as to enable transfer of an entity between the first and second domains, and defining in the processor at least one entity disposed in at least one of the first and second domains. The method also includes defining in the processor a first stimulus, defining in the processor a first response to the first stimulus with the first response including transferring the entity from the first domain to the second domain, defining in the processor a second stimulus, and defining in the processor a second response to the second stimulus with the second response comprising transferring the entity from the second domain to the first domain. The method further includes instantiating in the processor executable instructions adapted to identify the presence of the entity in the first domain, instantiating in the processor executable instructions adapted to identify the presence of the entity in the second domain, instantiating in the processor executable instructions adapted to identify the presence of the first stimulus, and instantiating in the processor executable instructions adapted to identify the presence of the second stimulus. The method also includes instantiating in the processor executable instructions adapted execute the first response, instantiating in the processor executable instructions adapted to execute the second response, and instantiating in the processor executable instructions adapted to output at least a portion of the first domain.

The method may include defining the first and second domains in the processor such that at least a portion of the second domain is coincident with at least a portion of the first domain in at least two dimensions, and such that the first and second domains are distinct in at least a dimension other than the two dimensions. The method may include defining the first and second domains in the processor such that at least a portion of the second domain is substantially adjacent at least a portion of the first domain.

The method may include instantiating in the processor executable instructions adapted to enable motion of the bridge. The method may include instantiating in the processor executable instructions adapted to enable motion of the bridge responsive to a viewer command. The method may include instantiating in the processor executable instructions adapted to bias the continuity toward a rest position therefor.

The method may include instantiating in the processor executable instructions adapted to selectively resolve the content of the second domain, such that the content is resolved to at least one first viewer but is not resolved to at least one second viewer. The method may include instantiating in the processor executable instructions adapted to selectively resolve the content of the second domain, such that the content is resolved with a first configuration to at least one first viewer and with a second configuration to at least one second viewer.

The method may include defining at least one output window, and instantiating in the processor executable instructions adapted to output at least the portion of the first domain through the at least one window. The method may include defining stereo output windows, and instantiating in the processor executable instructions adapted to output at least the portion of the first domain through the stereo windows.

In another embodiment of the present invention, a method is provided that includes identifying the presence of at least one entity in at least one of a first domain and a second domain substantially distinct from the first domain, the first and second domains each including at least two dimensions, the first and second domains being in communication via a bridge so as to enable transfer of the entity between the first and second domains therewith. The method includes identifying the presence of at least one of: a stimulus initiating in the first domain and terminating in the second domain, a stimulus initiating in the second domain and terminating in the first domain, a stimulus substantially entirely in the first domain, and a stimulus substantially entirely in the second domain. If the stimulus is present initiating in the first domain and terminating in the second domain, a first response is executed. If the stimulus is present initialing in the second domain and terminating in the first domain, a second response is executed. If the stimulus is present substantially entirely in the first domain, a third response is executed. If the stimulus is present substantially entirely in the second domain, a fourth response is executed. The method includes outputting at least a portion of the first domain.

In another embodiment of the present invention, a method is provided that includes identifying the presence of at least one of: a stimulus initiating in a first domain and terminating in a second domain substantially distinct from the first domain, the first and second domains each comprising at least two dimensions, the second domain being substantially distinct from the first domain, the first and second domains being in communication via a bridge so as to enable transfer of the entity between the first and second domains therewith; the stimulus initiating in the second domain and terminating in the first domain; the stimulus substantially entirely in the first domain; and the stimulus substantially entirely in the second domain. If the stimulus is present initiating in the first domain and terminating in the second domain, a first response is executed. If the stimulus is present initiating in the second domain and terminating in the first domain, a second response is executed. If the stimulus is present substantially entirely in the first domain, a third response is executed. If the stimulus is present substantially entirely in the second domain, a fourth response is executed. The method includes outputting at least a portion of the first domain.

The method may include identifying the presence of at least one entity in at least one of the first domain and the second domain.

The first response may include transferring the entity from the first domain to the second domain, with the second response including transferring the entity from the second domain to the first domain.

In another embodiment of the present invention, an apparatus is provided that includes a processor, the processor being adapted to define a first domain and a second domain substantially distinct from the first domain, the first and second domains each comprising at least two dimensions, the processor further being adapted to define a bridge such that the first and second domains are in communication via the bridge so as to enable a transfer of an entity between the first and second domains therewith. The apparatus includes an entity identifier in communication with the processor, the entity identifier being adapted to identify the presence of the entity in the first domain and the second domain. The apparatus includes a stimulus identifier in communication with the processor, the stimulus identifier being adapted to identify a first stimulus and a second stimulus. The apparatus includes at least one display in communication with the processor, the display being adapted to output at least a portion of the first domain. The processor is further adapted to transfer the entity from the first domain to the second domain in response to the first stimulus, and to transfer the entity from the second domain to the first domain in response to the second stimulus.

The entity identifier may include executable instructions disposed on the processor. The entity identifier may include a physical component distinct from the processor.

The display may include a stereo display.

The apparatus may include a body, with the processor, the entity identifier, the stimulus identifier, and the display being in communication with the body. The body may be adapted to be worn on a user's head. The display may be disposed on the body such that when the body is worn on the head, the display is disposed proximate and substantially in front of at least one eye of the head.

In another embodiment of the present invention, a method is provided that includes means for identifying the presence of at least one entity in at least one of a first domain and a second domain substantially distinct from the first domain, the first and second domains each comprising at least two dimensions, the first and second domains being in communication via a bridge so as to enable transfer of the entity between the first and second domains therewith. The apparatus includes means for identifying a presence of a first stimulus, and means for identifying a presence of a second stimulus. The apparatus also includes means for transferring the entity from the first domain to the second domain if the first stimulus is present and the entity is present in the first domain, and means for transferring the entity from the second domain to the first domain if the second stimulus is present and the entity is present in the second domain. The apparatus further includes means for outputting at least a portion of the first domain.

BRIEF DESCRIPTION OF THE SEVERAL VIEWS OF THE DRAWINGS

Like reference numbers generally indicate corresponding elements in the figures.

FIG. 32 shows an example method for implementing steps according to the present invention onto a processor.

DETAILED DESCRIPTION OF THE INVENTION

Figure 1:
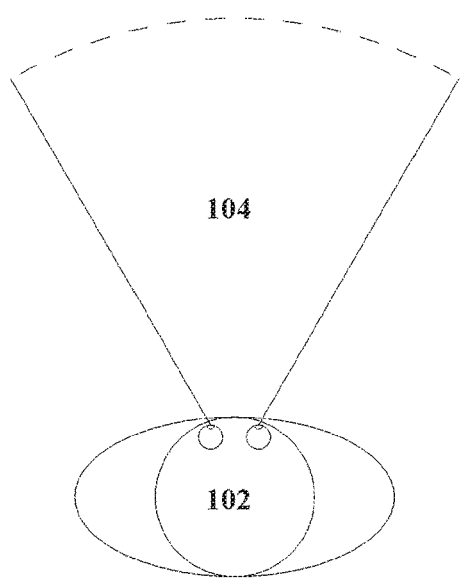
FIG. 1 shows an overhead schematic view of an example arrangement of a first domain according to the present invention.

Referring to FIG. 1, an example arrangement of a first domain according to the present invention is shown therein in an overhead schematic form.

As may be seen, a viewer 102 is disposed within FIG. 1. Although the viewer 102 is not necessarily part of the present invention, as the present invention relates at least in part to methods and apparatuses for interfacing between a user and a computer system, e.g. using a graphical or visual approach, the presence of a viewer may be illuminating. However, it is emphasized that the present invention need not necessarily be defined or otherwise arranged with respect to either a viewer, nor is a viewer necessarily required to be present.

In addition, as may be seen in FIG. 1 a first domain 104 is shown therein. The first domain 104 is a logical construct in which entities may be present, moved to, moved from, etc. The present invention is not particularly limited with regard to the entities that may be accommodated by the first domain 104.

For at least some embodiments, it may be useful to partly or completely overlay the first domain 104 onto a physical space, virtual space, etc., e.g. such that some or all of the first domain 104 is spatially coincident with some or all of a physical environment. However, such an arrangement is an example only, and it is emphasized that the first domain 104 is a logical construct, and the distinction between whether an entity is in the first domain 104 or not is a logical distinction that does not necessarily correspond to position in space (or to position in space alone). For example, a physical entity may be disposed at a physical location in space that is spatially coincident with the first domain 104 without necessarily being logically considered to be in the first domain 104.

Thus, although the first domain 104 may be referred to herein for simplicity as a "place", a "space", a "region", etc., it should be understood that the first domain 104 does not necessarily encompass a physical environment or portion thereof, physical objects, any particular location or parcel of physical space, etc.

As shown in FIG. 1, the first domain 104 is configured so as to approximately correspond with an area of an environment that would be within the visual field of the viewer 102 shown therein. The edges of the first domain 104 thus correspond approximately with the edges of the viewer's visual field. However, this is an example only; the present invention is not limited to a first domain 104 that is defined in terms of a field of view, and other arrangements may be equally suitable. The arrangement of a first domain 104 with regard to a human visual field and other options for the first domain 104 will be addressed at greater length below. In addition, it is noted that a relatively simple map of a human visual field is considered with respect to FIG. 1, for the sake of simplicity and clarity of illustration. In practice a human visual field may be more complex, broader, non-uniform, etc.

Figure 2:
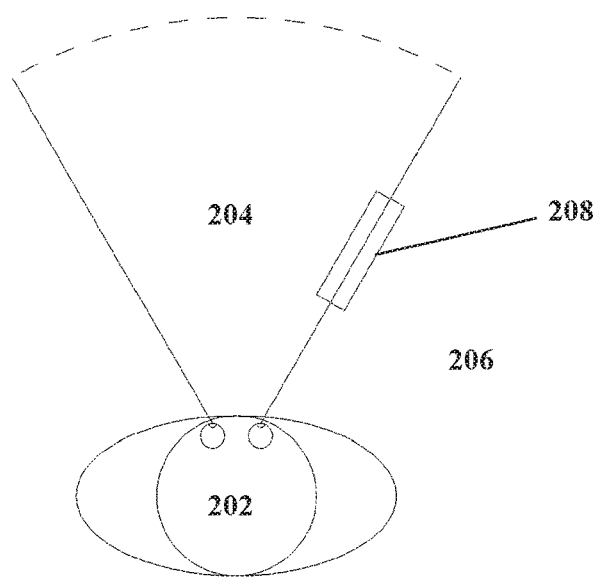
FIG. 2 shows an overhead schematic view of an example arrangement of first and second domains with a bridge therebetween according to the present invention.

Turning to FIG. 2, an arrangement is shown with both a first domain 204 and a second domain 206 distinct from the first domain. As shown, the first domain 204 is configured so as to approximately correspond with an area of an environment that would be within the visual field of a viewer 202 as shown therein. The second domain 206 is shown to represent a portion of an environment other than the first domain 204; that is, as shown the first and second domains 204 and 206 together encompass substantially an entire environment surrounding a viewer 202. However, such an arrangement is not required; the first and second domains 204 and 206 will not necessarily encompass an entire environment. Likewise, the second domain 206 is not required to be larger than the first domain 204 as shown in example FIG. 2, nor is the second domain 206 required to be adjacent to the first domain 204, etc.

As with the first domain (as described above with regard to FIG. 1), the second domain 206 is a logical construct. Entities may be present in the second domain 206, moved thereto, moved therefrom, etc., and the present invention is not particularly limited with regard to the entities that may be accommodated by the second domain 206. Although for at least some embodiments it may be useful to partly or completely overlay the second domain 206 onto a physical space, virtual space, etc., the distinction between whether an entity is in the second domain 206 or not is a logical distinction that does not necessarily correspond to position in space (or to position in space alone).

To use an alternative description, the first and second domains 204 and 206 may fairly be considered to be statuses. That is, whether an entity is in the first domain 204 or not, or in the second domain 206 or not, is not necessarily a matter of the entity's position. Likewise, the first and second entities 204 and 206 are not required to be defined in terms of space or position. The first and/or second domains 204 and 206 may be defined spatially for at least some embodiments, and the first and/or second domains 204 and 206 may for clarity be depicted at some points herein as spaces (for example in FIG. 2), however, neither the first domain 204 nor the second domain 206 necessarily will be defined spatially for any particular embodiment.

Still with regard to FIG. 2, a bridge 208 between the first domain 204 and the second domain 206 is shown therein. The bridge 208 serves as a link between the first and second domains, such that entities may be moved between the first and second domains 204 and 206. As the first and second domains 204 and 206 are logical constructs, so also is the bridge 208 therebetween a logical construct. While the bridge 208 may be considered under at least some circumstances to be similar to an actual physical bridge, a tunnel, a gateway, etc. the bridge 208 in the present invention is not limited by such physical metaphors, so long as the bridge 208 serves to transfer entities between the first and second domains 204 and 206.

Entities are transferred across the bridge 208, that is, from the first domain 204 to the second domain 206 or vice versa, through the use of stimuli. Typically a first stimulus transfers an entity in the first domain 204 to the second domain 206, while a second stimulus transfers an entity in the second domain 206 to the first domain 204. Stimuli are discussed in greater detail below.

The rules governing the first and second domains 204 and 206 and the behavior of entities therein are not necessarily identical. For example, in a virtual reality or augmented reality system virtual/augmented entities in the first domain 204 may be resolved (that is, such entities may be rendered visibly as graphical objects), while entities in the second domain 206 are not resolved. Thus, transferring an entity from the second domain 206 to the first domain 204 may entail a change in visibility; from the standpoint of someone viewing the environment, an entity drawn from the second domain 206 into the first domain 204 might seem to have appeared out of nowhere.

The first domain 204, second domain 206, and bridge 208 may or may not be visible or otherwise sensible. For illustration purposes in FIG. 2 (and elsewhere herein) lines of demarcation are shown between the first and second domains 204 and 206, and the bridge 208 is shown as a visible outline. A first domain 204, second domain 206, and/or bridge 208 may be made visible in numerous fashions, for example (e.g. within a virtual/augmented reality environment) using lines or other markers, differences in coloring, textual or graphical markings, etc. A first domain 204, second domain 206, and/or bridge 208 also may be made sensible without necessarily being visible, for example by associating sounds, haptic feedback, etc. thereto, to presence therein, to use thereof, etc.

As has been described, the first and second domains 204 and 206 are logical constructs, and do not necessarily correspond to physical spaces. However, correspondence of the first and second domains 204 and 206 to physical spaces also is not prohibited. For example, as illustrated in FIG. 2 the second domain 206 is substantially adjacent to the first domain 204. Thus, in the arrangement of FIG. 2 the first and second domains 204 and 208 are distinguished from one another as separate but adjacent areas in space.

However, other arrangements may be equally suitable. One example alternate arrangement is shown in FIG. 3A and FIG. 3B.

Figure 3A:
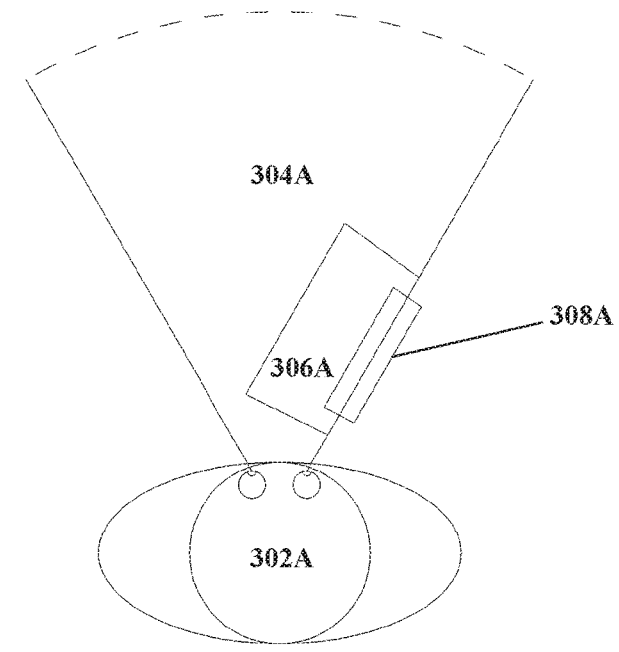
FIG. 3A shows an overhead schematic view of an example arrangement of first and second domains with a bridge therebetween and the domains distinct in a third dimension according to the present invention.

In FIG. 3A, a viewer 302A, first and second domains 304A and 306A, and a bridge 308A connecting the first domain 304A to the second domain 306A are shown in an overhead schematic view. Although the second domain 306A is illustrated extending inward from the edge of the first domain 304A toward the center thereof, rather than extending outward, the arrangement is otherwise at least generally similar to that of FIG. 2.

Figure 3B:
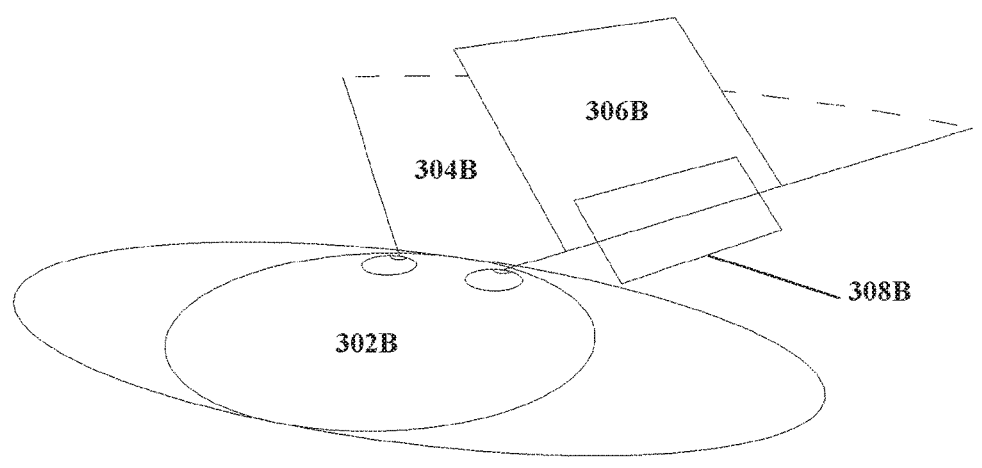
FIG. 3B shows a perspective schematic view of an example arrangement of first and second domains with a bridge therebetween and the domains distinct in a third dimension according to the present invention.

However, FIG. 3B shows an arrangement similar to that in FIG. 3A but from a perspective view, from a point behind, to the right, and above. Again, a viewer 302B, first and second domains 304B and 306B, and a bridge 308B connecting the first domain 304B to the second domain 306B are shown. As in FIG. 3A, in FIG. 3B the second domain 306B is illustrated extending inward from the edge of the first domain 304B toward the center thereof. However, as may also be seen in FIG. 3B, the second domain 306B is inclined upward relative to the first domain 304B, rather than being in a plane with the first domain 3048. Thus, although both the first and second domains 304B and 306B are themselves both two-dimensional, and overlap or coincide if considered only in two dimensions, the first and second domains 304B and 306B are distinct from one another in another dimension, specifically the third (z) dimension as shown.

Although as shown in FIG. 3B, the first and second domains 304B and 306B are distinct from one another in a spatial dimension, other dimensional arrangements may be equally suitable. As previously described, the first and second domains 304B and 306B are logical constructs; thus, the first and second domains 304B and 306B may be distinguished through what might be considered logical dimensions. For example, rather than utilizing a third spatial dimension, dimensional values may be assigned to the first and/or second domains 304B and 306B that do not necessarily correspond to a physical dimension. Computer processors, for example, can track and utilize such logical or other non-spatial dimensions as readily as spatial dimensions.

Utilizing non-spatial (e.g. logical) dimensions to distinguish a first domain from a second domain may be particularly useful, for example, in cases where interfaces and/or environments themselves utilize all three human-perceptible spatial dimensions. Such an arrangement may be extrapolated from FIG. 3B.

The arrangement in FIG. 3B, aside from the inclination of the second domain 306B with respect to the first domain 304B, is generally two-dimensional. Such an arrangement is presented therein for the sake of clarity and simplicity.

However, a similar arrangement may be implemented according to the present invention that is generally three dimensional. An example of such an arrangement is shown in FIG. 3C.

Figure 3C:
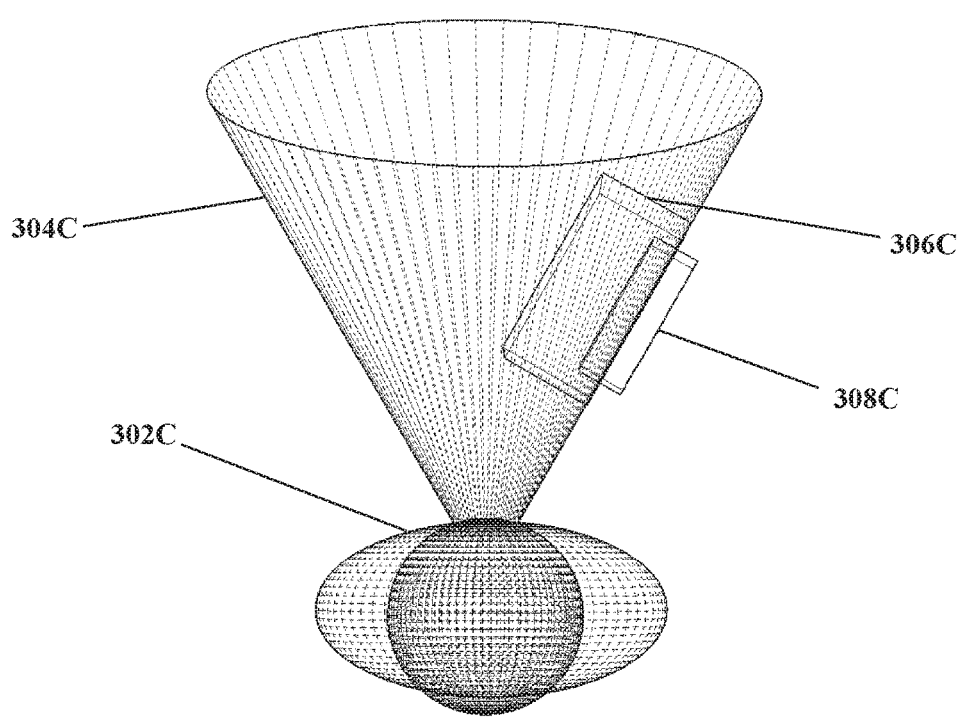
FIG. 3C shows an overhead wireframe view of an example arrangement of first and second domains with a bridge therebetween according to the present invention.

In FIG. 3C, an overhead wireframe view of a three dimensional arrangement at least somewhat similar to that in FIG. 3A is depicted. In FIG. 3C, a viewer 302C, first and second domains 304C and 306C, and a bridge 308C linking the first domain 304C to the second domain 306C are shown. The first domain 304C substantially corresponds to a visual field of the viewer 302C, though again such an arrangement is an example only. The second domain 306C is a substantially rectangular volume, extending inward from the surface of the first domain 304C, again presented as an example only. It is noted that as shown, the second domain 306C appears to coincide spatially with at least a portion of the first domain 304C.

Figure 3D:
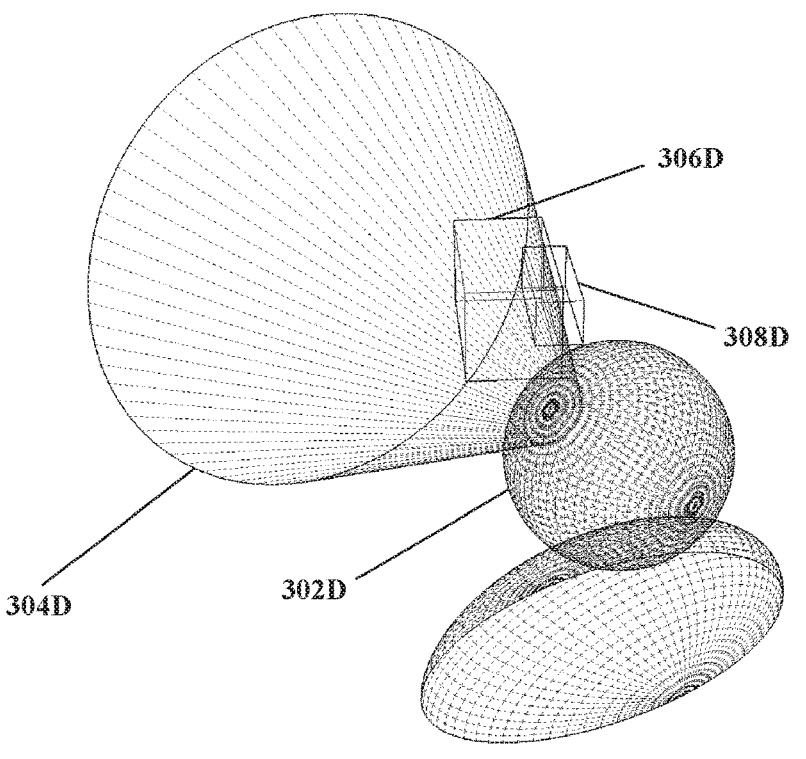
FIG. 3D shows a perspective wireframe view of an example arrangement of first and second domains with a bridge therebetween according to the present invention.

In FIG. 3D, a perspective wireframe view of a three dimensional arrangement at least somewhat similar to that in FIG. 3C is shown. FIG. 3D shows a viewer 302D, first and second domains 304D and 306D, and a bridge 308D linking the first domain 304D to the second domain 306D. In FIG. 3D, it is again apparent (particularly in combination with FIG. 3C) that the second domain 306D coincide spatially with at least a portion of the first domain 304D.

However, because the first and second domains 304D and 306D are logical constructs, and are not necessarily physical spaces, it is still possible for the first and second domains 304D and 306D to be distinct even if and where the first and second domains 304D and 306D coincide spatially. For example, a logical dimension may be defined so as to distinguish the first domain 304D from the second domain 306D. That is, for an entity that is in the physical space wherein the first and second and domains 304D and 306D are spatially coincident, whether the entity in question is in the first domain 304D or the second domain 306D may be determined by a value representing a dimension other than the conventional three spatial dimensions. Such an arrangement might utilize a spatial fourth dimension as determined and/or implemented in a processor, or such an arrangement might utilize a more abstract dimension such as a simple binary factor, e.g. assigning (for example with a processor) a single-bit "0" for the first domain 304D or a "1" for the second domain 306D to the entity in question to differentiate between whether the entity is present in the first domain 304D or in the second domain 306D. Such a bit might be flipped for an entity passing through the bridge 308D. That is, moving an entity into the physical space (if any) corresponding to the second domain 306D might only flip such a domain dimension bit for that entity to 1 if the entity entered the second domain 306D via the bridge 308D.

Other arrangements may be equally suitable.

Thus, for the arrangement shown in FIG. 3D, the second domain 306D may be distinct from the first domain 304D even though the first and second domains 304D and 306D are spatially coincident. Likewise and more particularly, a second domain 306D having three spatial dimensions may be distinct from a first domain 304D having three spatial dimensions even though the first and second domains 304D and 306D are spatially coincident, for example through the use of a fourth logical dimension.

Thus far the first and second domain have been described mostly insofar as the second domain being distinct from the first domain. While the aforementioned distinction between the first and second domains is a feature of the present invention, at this point additional discussion of the nature of the first and second domains may be illuminating.

As previously described herein (with reference to FIG. 1 and FIG. 2), the first and second domains are logical constructs, and are not necessarily spaces. Rather, as also previously described (with reference to FIG. 2), the first and second domains represent a potential status. That is, an entity may be considered to be present in the first domain, and/or may be considered to be present in the second domain. While for clarity entities may be addressed as being "in" the first domain or "in" the second domain, this should not be taken to imply that the first or second domains are necessarily spaces or positions.

The presence of an entity within the first or second domain may be considered in some ways analogous to the presence of a file within a folder on a GUI desktop. While the analogy is inexact, it may be understood that a file that is "inside a folder" is not necessarily physically located within the folder. In such case, the folder does not represent a place, nor even necessarily a defined sector of memory, but a path or identifier that associates the file with the folder. In at least a somewhat similar fashion, the first and second domains are not necessarily literal places (though the use of first and/or second domains that are literal places is not excluded from the present invention), and an entity that is in the first or second domain may not necessarily be disposed therein in a spatial sense (although again, such an arrangement is not excluded from the present invention). Rather, an entity that is "in" the first or second domain is associated with the first or the second domain, and is subject to rules applicable to entities so associated with the first or second domain as appropriate.

Typically, although not necessarily, the first and second domains of the present invention are defined within a virtual reality environment and/or an augmented reality environment. In such instances, the association of an entity with the first or second domains may be implemented using a processor, including but not limited to a processor controlling the virtual or augmented environment. Such implementation may be purely data-based, e.g. simple data flags identifying entities as being in the first or second domain, positional data determining whether an entity is in spatial regions defined as the first or second domains (for embodiments wherein the first and/or second domains are defined spatially), etc.

Although as described it is not required for the first and second domains to be defined spatially, in at least some embodiments, including but not limited to embodiments utilizing virtual reality and/or augmented reality environments, the first and/or second domains may represents a spaces, that is, spatial portions of the virtual/augmented reality environment in question. For arrangements wherein the virtual and/or augmented reality environment corresponds with and/or exists within a real world physical space, the first and/or second domains may coincide with and/or represent spatial portions of the real world. For purposes of illustration certain functions of the first and second domains will now be described with regard to such spatial embodiments of the first and second domains.

For embodiments wherein the first and second domains are at least partially spatial in nature, the first and second domains may represent first and second spaces. For example, the first domain may represent one volumetric three dimensional space, while the second domain represents another volumetric three dimensional space.

As visible in FIG. 2 and as described previously with reference thereto, if the first and second domains are portions of a space, the first and second domains may be distinct from one another by virtue of position within that space. That is, as is visible in FIG. 2, the first domain 204 may represent one part of a space (i.e. as illustrated in FIG. 2 a wedge or cone), with the second domain 206 being another part of space. The first and second domains may be adjacent, as is shown for the first and second domains 204 and 206 in FIG. 2, but there is no requirement for the first and second domains to be adjacent. Similarly, although the first and second domains may between them occupy the entirety of a space as is shown for the first and second domains 204 and 206 in FIG. 2, it is not required for the first and second domains to together so occupy all of a space. In particular, areas that are neither first domain nor second domain may exist in some embodiments, and third or additional domains may exist. Other arrangements also may be equally suitable.

As visible in FIG. 3A through FIG. 3D and as described previously with reference thereto, if the first and second domains are portions of space, the first and second domains also may be distinct from one another other than through position within that space. That is, as is visible in FIG. 3B and FIG. 3D, the second domain 306B or 306D may be coincident with the first domain 3048 or 304D within the spatial dimensions of the environment but may be otherwise separated, e.g. through displacement along another dimension. While in terms of physical reality such a dimension may not tangibly exist, for purposes of a user interface, virtual environment, augmented reality environment, etc. such a dimension can be implemented logically, e.g. in a controlling processor for a virtual or augmented reality environment.

Other arrangements for distinction between the first and second domains may be equally suitable.

However defined, the first and second domains may operate using different rules, including but not limited to different rules for manipulating and otherwise dealing with entities therein. For example, for an arrangement wherein the first and second domains are defined within a processing system, e.g. as part of a virtual or augmented reality environment, the rules defined for and/or applied to the first domain may be different from the rules defined for and/or applied to the second domain.

As a more concrete example, consider the matter of whether or not a particular virtual or augmented reality entity is resolved. In terms of a virtual or augmented reality environment, an entity is resolved or "rezzed" if that entity is sensibly manifested within the virtual/augmented environment. For an entity that is resolved, nominally visible features will be rendered visibly, audible features will be expressed audibly, etc. The notion of resolving an entity is significant in virtual/augmented environments at least for the reason that an entity may potentially exist in the form of data (e.g. data saved on a hard drive in communication with a processor) without being made present as part of the virtual environment at a given time and place. The data may be present without the entity representing that data being manifest within the environment (i.e. the entity is not visible).

To draw a parallel, a character in a video game may "have" or "be carrying" one or more objects (possibly an arbitrarily large number of objects) that are not visibly present within the game at any particular moment. Weapons might be displayed only when the character equips them, light sources only when the character activates them, keys only when the character must unlock something, etc. The objects in question may exist as data, but may not be displayed by the system. When those objects are not displayed (resolved) by the system, the objects are not simply out of view (i.e. concealed or obstructed from line of sight)

but rather do not exist as objects within the environment, instead only existing as data within the controlling processor.

Returning to the matter of different rules for first and second domains, for some embodiments for example the first and second domains may apply different rules to entities therein insofar as resolving those entities. Entities in the first domain might be resolved, while entities in the second domain are not resolved. Thus, entities in the first domain would be visible (assuming those entities had a visible component in the first place), while entities in the second domain would not be visible. Furthermore, for such an arrangement an entity being moved from the first domain to the second domain would initially be visible and then would disappear, while an entity being moved from the second domain to the first domain would initially be invisible and then would appear.

Differences in resolution for the first and second domains, when present, are not limited only to binary arrangements (i.e. resolving or not resolving an entity). Entities may be selectively resolved. For example, some entities may be visible in the first domain but not in the second domain, while other entities are visible in the first and second domains, etc. Alternately, entities may be resolved in the second domain while under some conditions but not under others, etc. Entities also may be resolved with different sizes, transparencies, frame rates, resolutions (in the sense of the number of pixels, etc.), color schemes, bit depths, dimensionality (e.g. 2D vs. 3D), etc. in the first and second domains.

Furthermore, entities may be resolved (or other rules applied) selectively in terms of differing viewers. For example, an entity in the second domain might be resolved for a first viewer, but not for a second viewer. Such an arrangement might be implemented, for example, in a virtual/augmented reality environment that is displayed individually to different viewers so as to be tailored thereto. As a more concrete example, a virtual/augmented reality environment displayed to viewers via head mounted displays, such that each viewer sees (or at least may see) the environment differently. Given such an arrangement, a particular entity could be resolved (thus visible) for one viewer, but not resolved (thus invisible) for another viewer.

With regard to multiple viewers, it is noted that first and second domains may be specific to an individual viewer. That is, for an environment supporting multiple viewers, each individual viewer may have a first domain and a second domain specific to that viewer. For first and second domains that are spatially defined, an entity might be in a position that is in a second domain for one viewer, while being in a first domain for another viewer. In such arrangement, typically (though not necessarily) entities may be associated with individual viewers in order to determine which (if any) first and/or second domain applies to any particular entity.

As already noted with regard to single viewers, here entities are selectively resolved differently for different viewers, differences are not limited only to resolution and non-resolution. Entities in the first or second domains may be resolved with different sizes, transparencies, frame rates, resolutions (in the sense of the number of pixels, etc.), color schemes, bit depths, dimensionally (e.g. 2D vs. 3D), etc. for each different viewer.

Differences in resolution/non-resolution between the first and second domains (and more particularly differences in visibility/invisibility therebetween), and or for different viewers, are an example only, and the present invention is not limited thereto. Likewise, differences in rules of operation between first and second domains are not limited only to differences that are readily noticeable by viewers. Other differences may be equally suitable, in addition to or instead of a difference in resolution.

Similarly to the first and second domains, the bridge also is a logical construct. While the bridge may for at least certain embodiments be disposed at a spatial location, and/or may link spatial locations (i.e. spatially-defined first and second domains), the bridge is not limited only to a spatial definition. Rather, the bridge is in essence a switch mechanism, in that entities may be transferred ("moved") between the first domain and the second domain through use of the bridge.

Typically, though not necessarily, for a bridge that is disposed at some location in space, transitions between the first and second domains may be accomplished by moving an entity to and/or through the space occupied by the bridge. However, other arrangements may be equally suitable.

For example, as is noted the bridge is not required to be defined spatially. Indeed, the bridge may not have any localized existence at all. The bridge may for example exist purely as executable instructions, such that some stimulus-such as a gesture executed by a viewer-causes an entity to transition between first and second domains.

However, although the first domain, second domain, and bridge are not necessarily areas or objects, for purposes of explanation it is frequently useful to describe embodiments thereof that do correspond to physical locations and/or spaces (e.g. with reference to FIG. 1 through FIG. 3D and certain other illustrations herein).

Figure 4:
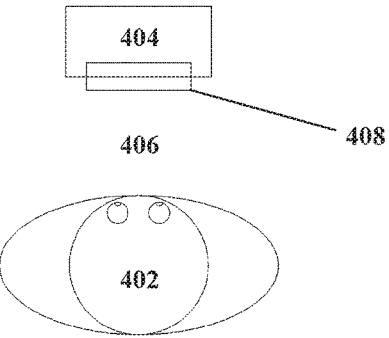
FIG. 4 shows an overhead schematic view of an example arrangement of a first and second domain with a bridge therebetween according to the present invention, the bridge being disposed within the first domain.

Turning now to FIG. 4, an arrangement is shown therein having viewer 402, first and second domains 404 and 406, and a bridge 408 connecting the first domain 404 to the second domain 406 in an overhead schematic view. Although the second domain 406 is illustrated as a finite pocket disposed centrally in front of the viewer 402, the arrangement is otherwise at least somewhat similar to that shown in previous figures herein. It is noted that, assuming the bridge 408 is resolved with a generally opaque appearance, the viewer 402 may be unable to see the second domain 406 (even assuming the second domain 406 is resolved and nominally visible) because the bridge 408 may obstruct a line of sight between viewer 402 and second domain 406.

Figure 5A:
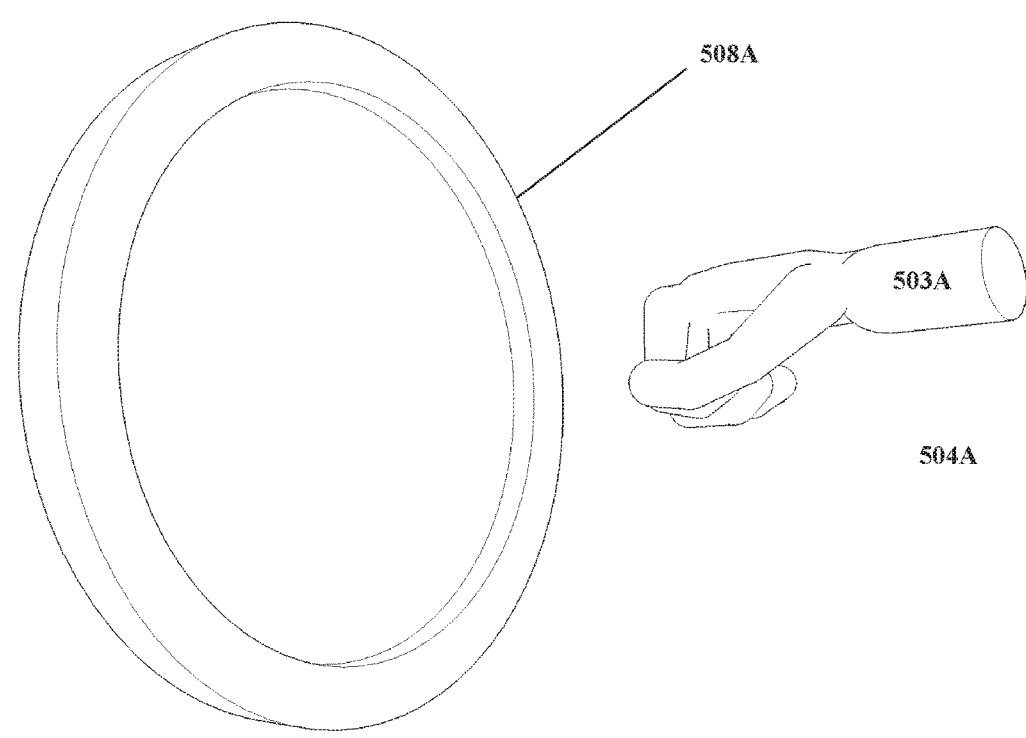
FIG. 5A shows a perspective view of an example arrangement of a first and second domain with a bridge therebetween, initiating transferring an entity from the second domain according to the present invention.

Now with reference to FIG. 5A, an arrangement is shown therein that is at least somewhat similar to that in FIG. 4. FIG. 5A includes a first domain 504A and a bridge 508A, and a hand 503A as might belong to a viewer. The bridge 508A is resolved in this example as a ring with an opaque "curtain" central thereto, so that the bridge 508A does not permit vision therethrough. It is emphasized that such an arrangement for the bridge 508A is an example only. In addition, no second domain is visible behind the bridge 508A, but a second domain is presumed to be in communication with the first domain 504A via the bridge 508A (and such communication will be demonstrated with regard to subsequent images).

Examination of the hand 503A reveals that the hand 503A in a particular posture, specifically in a posture corresponding approximately to one used to grip an object. As has been noted, typically a first stimulus transfers an entity in the first domain to the second domain, while a second stimulus transfers an entity in the second domain to the first domain. Stimuli may include but are not limited to hand postures and hand gestures; in the arrangement shown in FIG. 5A through FIG. 5D, the gripping posture as shown is utilized as a portion of a gestures that that serves as a second stimulus (that is, a stimulus that transfers an entity from the second domain to the first domain).

Figure 5B:
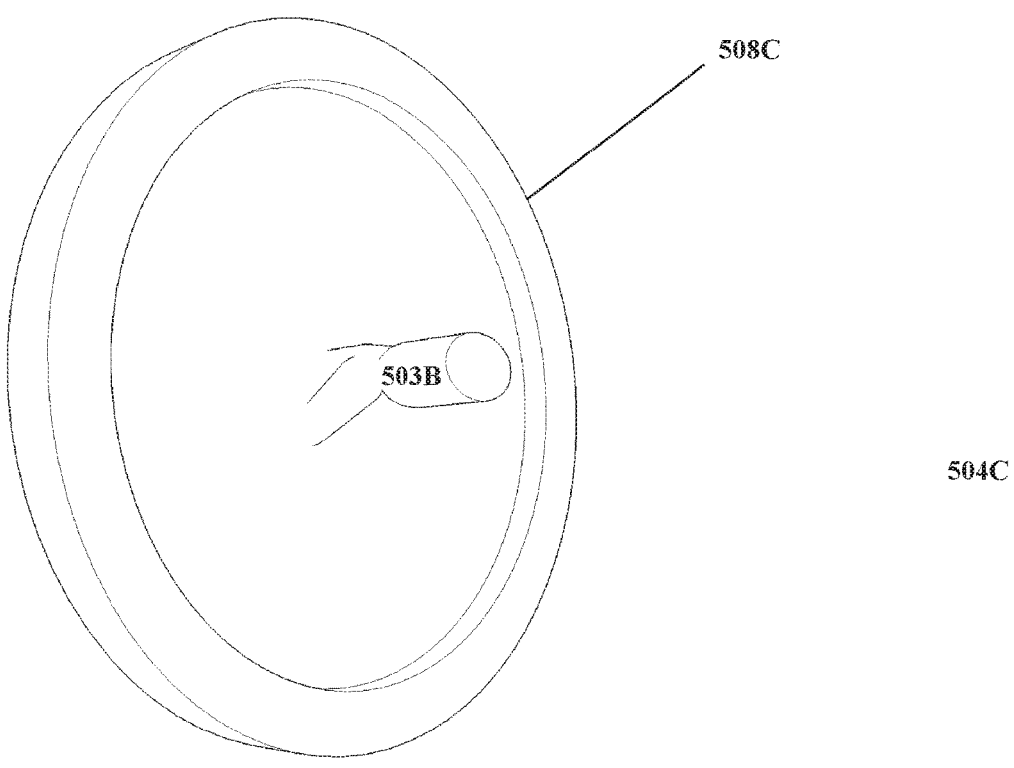
FIG. 5B shows a perspective view of an example arrangement of a first and second domain with a bridge therebetween, continuing transferring an entity from the second domain according to the present invention.

Moving on to FIG. 5B, a later portion of a second stimulus gesture with the hand 503B may be seen. The first domain 504B and the bridge 508B are visibly unchanged from FIG. 5A, but the hand 503B has moved so as to extend partially through the gate 508B into the second domain (not visible in FIG. 5B).

Figure 5C:
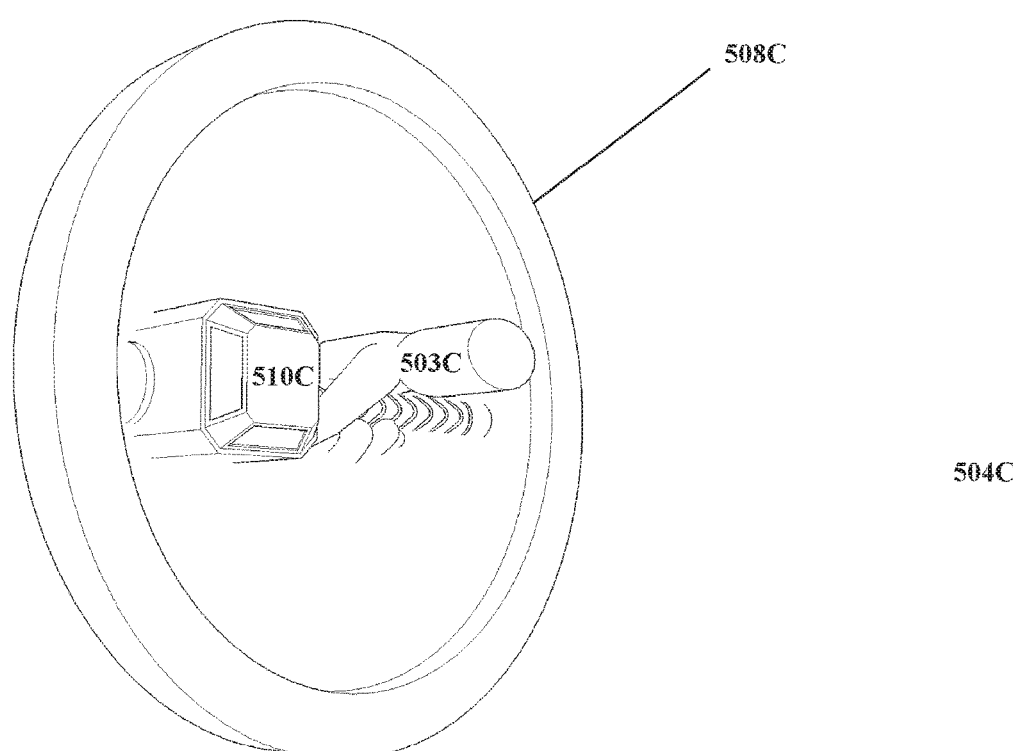
FIG. 5C shows a perspective view of an example arrangement of a first and second domain with a bridge therebetween, further continuing transferring an entity from the second domain according to the present invention.

Turning to FIG. 5C, a still later portion of a second stimulus gesture with the hand 503C may be seen. Again, the first domain 504C and the bridge 508C are visibly unchanged from FIG. 5B. However, the hand 503C has moved so as to partially withdraw from the gate 508C and thus also from the second domain (not visible in FIG. 5C). In addition, an entity 510C is visible partially withdrawn from the second domain, the example entity 510C being illustrated herein in the form of a large hammer.

It is emphasized that the entity 510C is not itself necessary part of the present invention. The entity 510C may be affected by, and/or interact with, the present invention in ways that are illustrative of the present invention, and entities therefor are shown and described herein for that reason. However, the entity 510C is no more an inherent part of the present invention itself than is the viewer (as previously described).

Figure 5D:
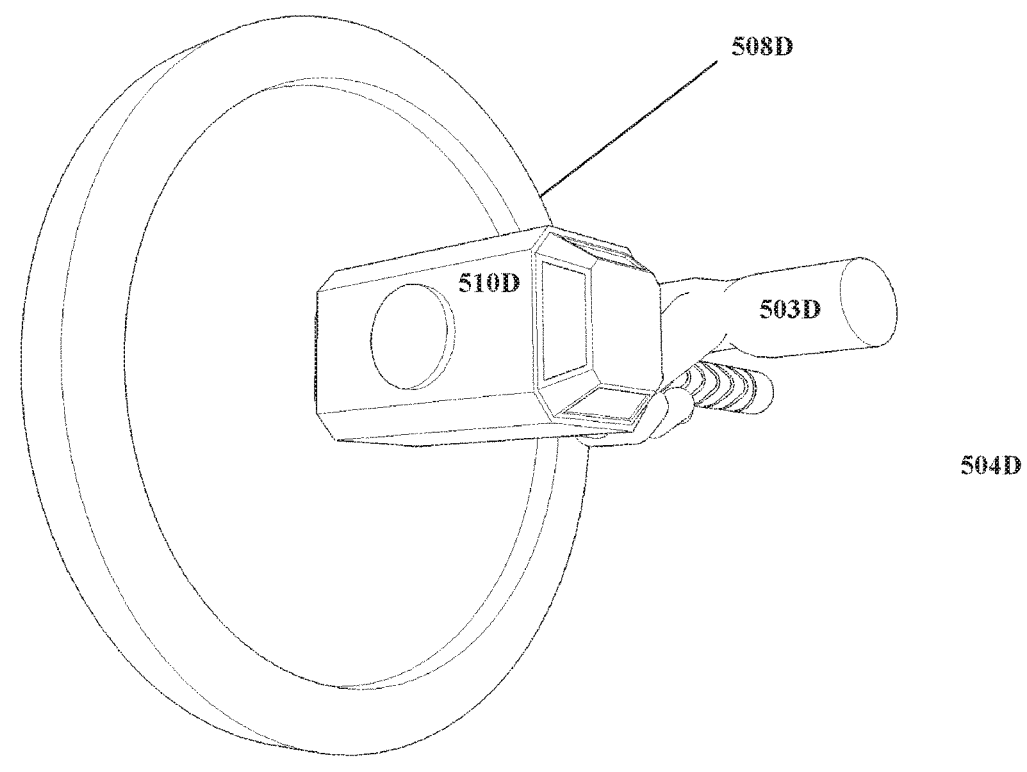
FIG. 5D shows a perspective view of an example arrangement of a first and second domain with a bridge therebetween, completing transferring an entity from the second domain according to the present invention.

Now with reference to FIG. 5D, an arrangement is shown after a second stimulus gesture with the hand 503D is complete. The first domain 504D and the bridge 508D are visibly unchanged from FIG. 5C. The hand 503D is fully withdrawn from the bridge 508D, and the entity 510D is now disposed within the first domain 504D. In sum, as a result of the gesture shown in the sequence of FIG. 5A through FIG. 5D, the entity has been transferred from the second domain (not illustrated) to the first domain.

The gesture shown to represent a seconds stimulus in FIG. 5A through FIG. 5D is an example only. While a "grab and drag" gesture as in FIG. 5A through FIG. 5D may be useful for certain embodiments, for example at least since such a gesture resembles motions for manipulations of objects more generally (i.e. picking something up and moves it), other postures, gestures, and other arrangements may be equally suitable.

Figure 6A:
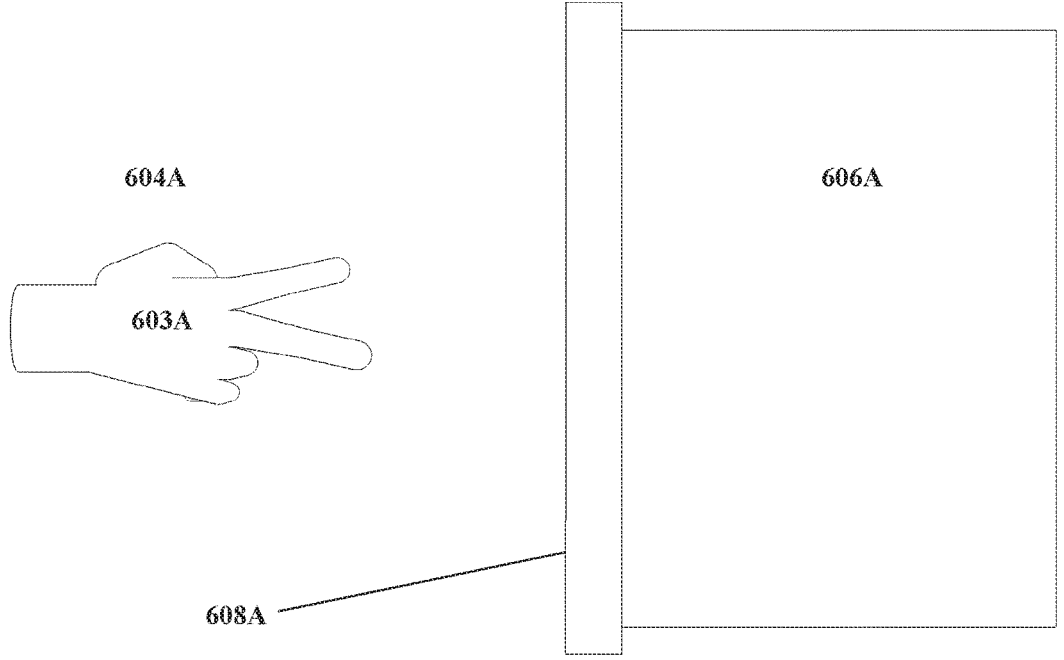
FIG. 6A shows an overhead view of an example arrangement of a first and second domain with a bridge therebetween, initiating transferring an entity from the second domain according to the present invention.

For example, turning to FIG. 6A, therein another arrangement is shown that is at least somewhat similar to that in FIG. 5A, though from an overhead perspective. FIG. 6A includes a first domain 604A, a second domain 606A, a bridge 608A, and a hand 603A as might belong to a viewer. As may be seen, the hand 603A is in a particular posture, specifically with first and second fingers substantially extended and at least partially spread, referred to herein as a "peg" posture, adapted to engage an entity for example at the spread fingertips, and/or at a point therebetween. In the arrangement shown in FIG. 6A through FIG. 6D, the peg posture as shown is utilized as a portion of a gesture that that serves as a second stimulus (a stimulus that transfers an entity from the second domain to the first domain).

Figure 6B:
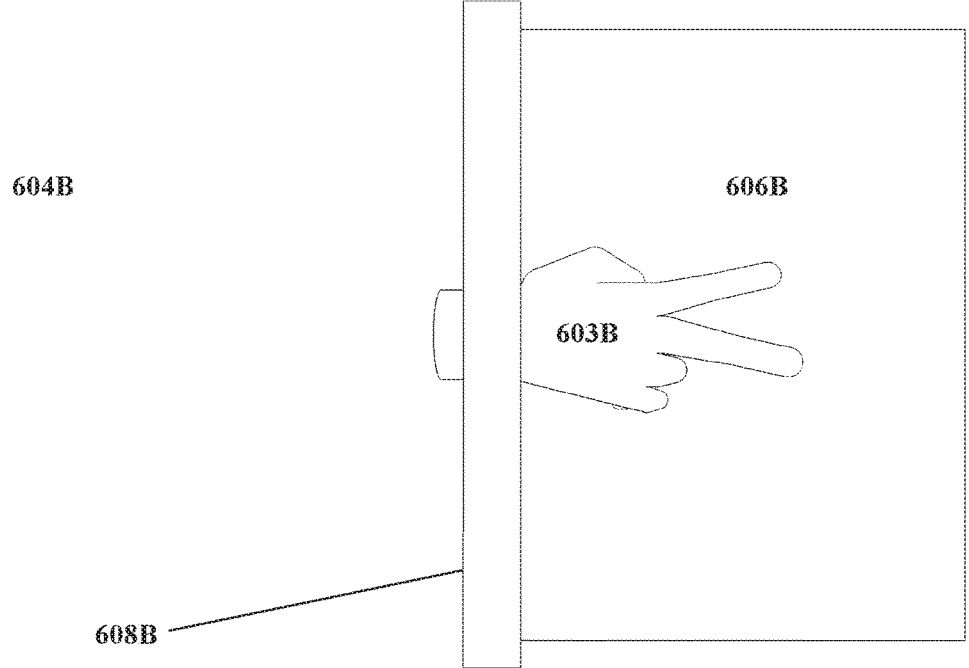
FIG. 6B shows an overhead view of an example arrangement of a first and second domain with a bridge therebetween, continuing transferring an entity from the second domain according to the present invention.

Moving on to FIG. 6B, a later portion of a second stimulus gesture with the hand 603B may be seen. The first domain 604B, second domain 606B, and the bridge 508B are visibly unchanged from FIG. 6A, but the hand 603B has moved so as to extend at least partially through the gate 608B into the second domain 606B.

Figure 6C:
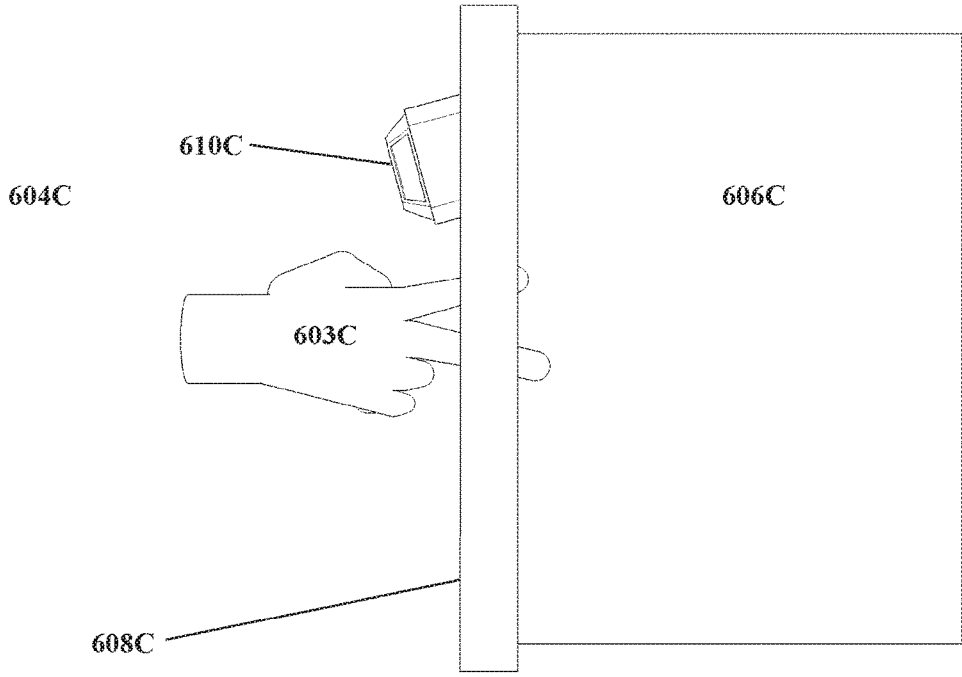
FIG. 6C shows an overhead view of an example arrangement of a first and second domain with a bridge therebetween, further continuing transferring an entity from the second domain according to the present invention.

Turning to FIG. 6C, a still later portion of a second stimulus gesture with the hand 603C may be seen. Again the first domain 604C, second domain 606C, and bridge 508C are visibly unchanged from FIG. 6B. However, the hand 603C has moved so as to partially withdraw from the gate 608C and thus also from the second domain 606C. In addition, an entity 610C is visible partially withdrawn from the second domain.

Figure 6D:
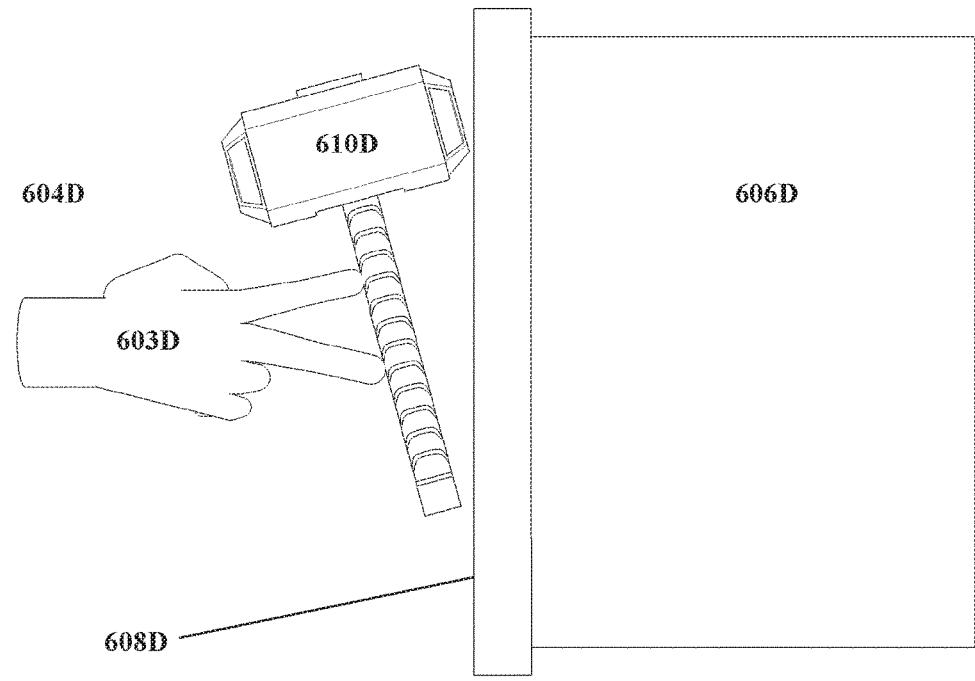
FIG. 6D shows an overhead view of an example arrangement of a first and second domain with a bridge therebetween, completing transferring an entity from the second domain according to the present invention.

Now with reference to FIG. 6D, an arrangement is shown after a second stimulus gesture with the hand 603D is complete. The first domain 604D, second domain 606D, and bridge 608D are visibly unchanged from FIG. 6C. The hand 603D is fully withdrawn from the bridge 608D and from the second domain 606D, and the entity 610D is now disposed within the first domain 604D. In sum, as a result of the gesture shown in the sequence of FIG. 6A through FIG. 6D, the entity has been transferred from the second domain to the first domain.

As shown with regard to the examples in FIG. 5A through FIG. 5D and FIG. 6A through FIG. 6D, the gesture utilized as a second stimulus is of substantially consistent configuration. That is, although the hand may move, fingers do not change position, etc. However, this is an example only, and gestures with varying configurations may be equally suitable.

Figure 7A:
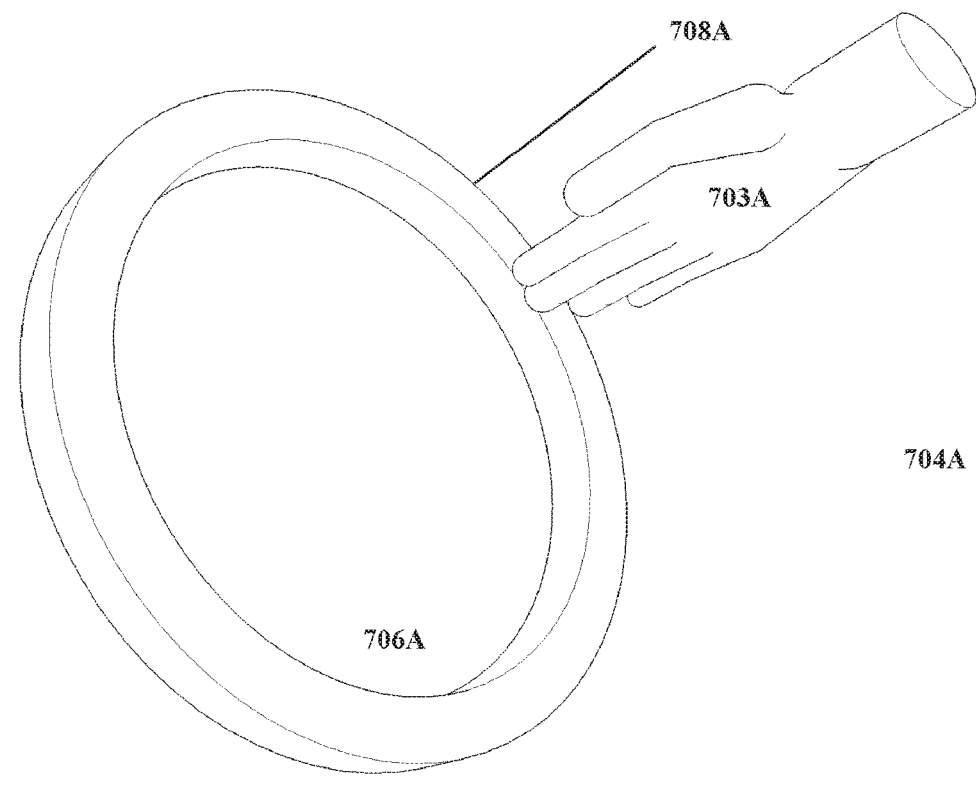
FIG. 7A shows a perspective view of an example arrangement of a first and second domain with a bridge therebetween, initiating transferring an entity from the second domain according to the present invention.

For example, referring now to FIG. 7A, an arrangement is shown therein that is at least somewhat similar to that in FIG. 5A. FIG. 7A includes a first domain 704A, a second domain 706A, a bridge 708A, and a hand 703A as might belong to a viewer. The bridge 708A is resolved in this example as an open ring permitting vision therethrough. The second domain 706A is visible through the aperture of the bridge 708A. It is noted that no rigid spatial boundaries are illustrated for the first and second domains 704A and 706A. As previously noted, the first domain, second domain, and bridge are logical constructs, and thus the second domain may—as in the example illustrated in FIG. 7A—be defined not in spatial terms, but in terms of "on the far side of the bridge", "having passed through the bridge", etc.

As may be seen the hand 703A is in a particular posture, substantially flat and face down with fingers substantially extended and substantially together. In the arrangement shown in FIG. 7A, the flat hand posture as shown is utilized as a portion of a gesture that that serves as a second stimulus (a stimulus that transfers an entity from the second domain to the first domain).

Figure 7B:
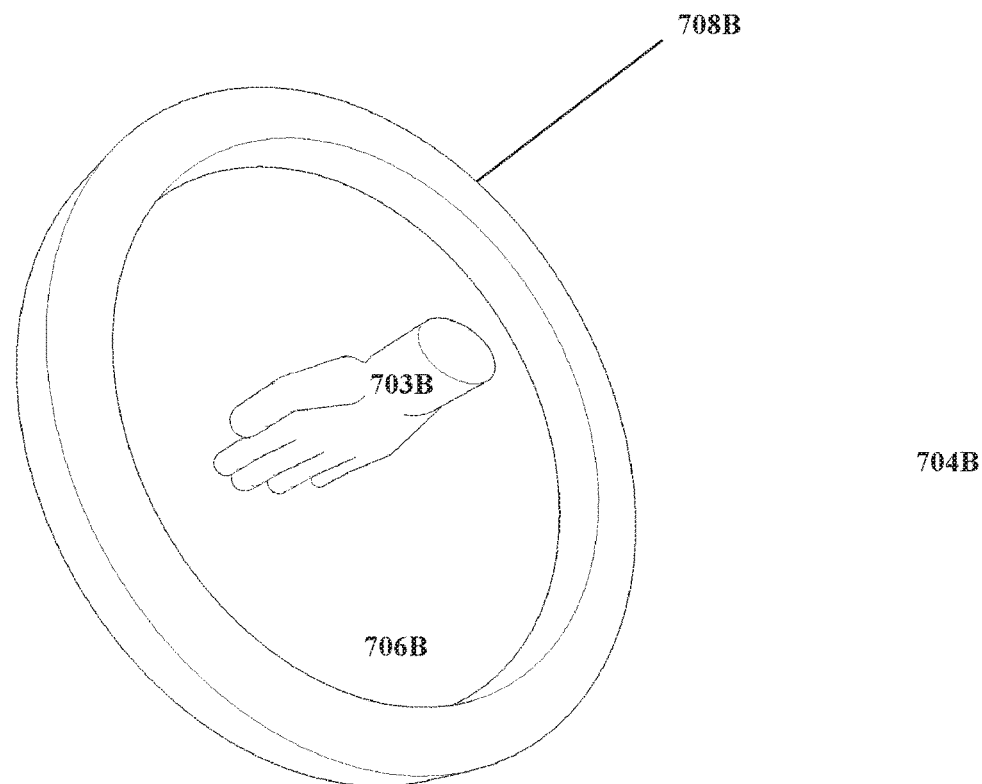
FIG. 7B shows a perspective view of an example arrangement of a first and second domain with a bridge therebetween, continuing transferring an entity from the second domain according to the present invention.

Moving on to FIG. 7B, a later portion of a second stimulus gesture with the hand 703B may be seen. The first domain 704B, second domain 706B, and bridge 708B are visibly unchanged from FIG. 7A, but the hand 703B has moved so as to extend partially through the gate 708B into the second domain 706B.

Figure 7C:
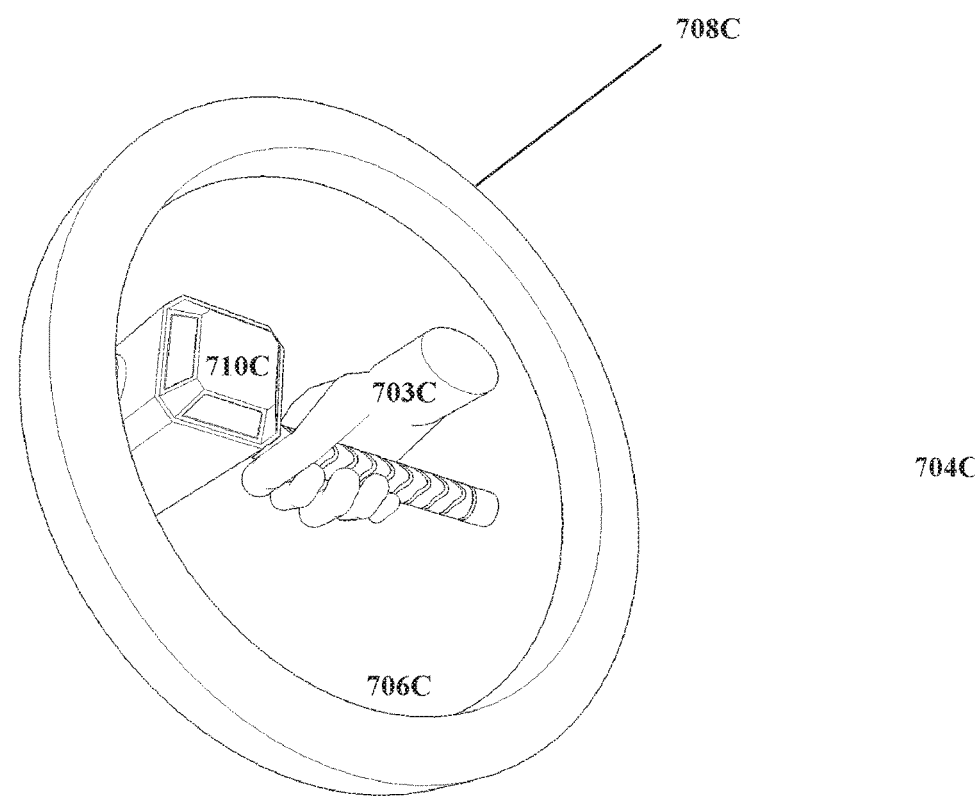
FIG. 7C shows a perspective view of an example arrangement of a first and second domain with a bridge therebetween, further continuing transferring an entity from the second domain according to the present invention.

Turning to FIG. 7C, a still later portion of a second stimulus gesture with the hand 703C may be seen. Again, the first domain 704C, second domain 706C, and bridge 708C are visibly unchanged from FIG. 7B. However, the hand 703C has changed configuration, the fingers having moved so that the hand 703C has assumed a posture corresponding approximately to one used to grip an object.

In addition, an entity 710C is visible in the grip of the hand 703C. The entity 710C may resolve, for example, in response to a change in configuration of the hand 703C such as that illustrated in FIG. 7C. Although in at least some other examples herein the entities are not resolved until removed from the second domain, such an arrangement is not required, and an arrangement such as is shown in FIG. 7C is also acceptable, wherein entities in the second domain 706C are resolved in response to partial or full execution of a stimulus. That is, although for some embodiments resolution may occur upon removal from the second domain, other arrangements may be equally suitable.

In addition, it is noted that although the entity 710C is resolved as viewed through the bridge 708C, as previously noted the entity 710C will not necessarily be resolved from all possible points of view or for all viewers. For example, the entity 710C might be resolved when viewed through the bridge 708 while being not resolved (effectively invisible) from other perspectives, e.g. from above, from the sides, from beyond the bridge 708. In metaphorical terms, the second domain 706C may for at least certain purposes be considered as similar to an extradimensional pocket, with the bridge 708C serving as a gateway thereto.

Figure 7D:
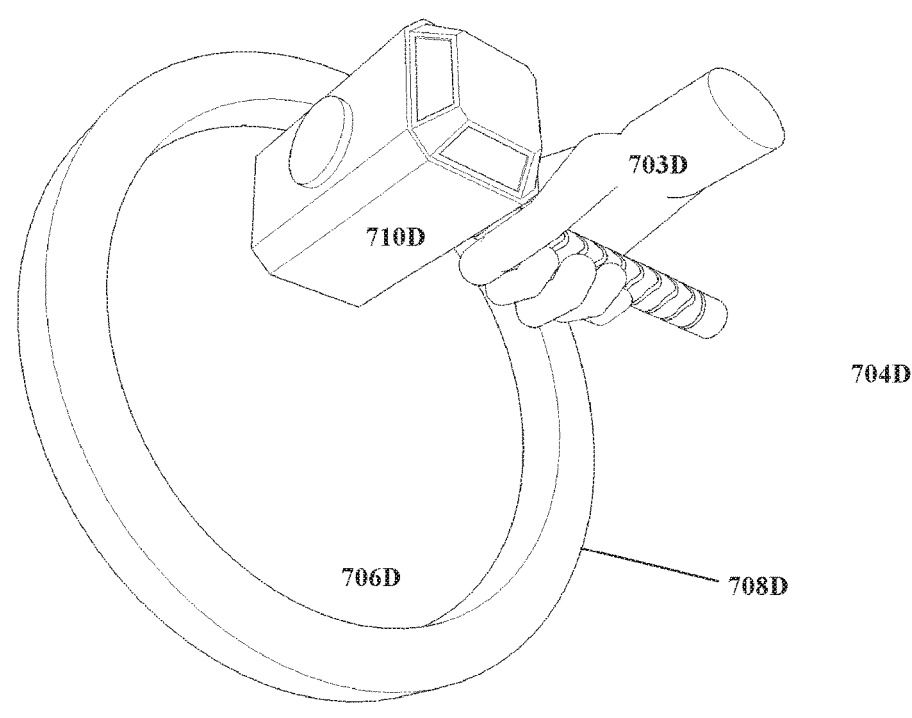
FIG. 7D shows a perspective view of an example arrangement of a first and second domain with a bridge therebetween, completing transferring an entity from the second domain according to the present invention.

Moving on to FIG. 7D, an arrangement is shown with the entity 710D removed from the second domain 706D via the bridge 708D. The first domain 704D, second domain 706D, and bridge 708D are visibly unchanged from FIG. 7D. In sum, as a result of the gesture shown in the sequence of FIG. 7A through FIG. 7D, an entity has been transferred from the second domain to the first domain.

FIG. 5A through FIG. 5D, FIG. 6A through FIG. 6D, and FIG. 7A through FIG. 7D all show second stimuli, that is, stimuli for transferring an entity from the second domain to the first domain. Similar first stimuli—stimuli for transferring an entity from the first domain to the second domain—may be constructed by reversing the order of the steps illustrated therein. Moreover, it is emphasized that neither the first nor the second stimuli is limited to the specific examples illustrated in FIG. 5A through FIG. 5D, FIG. 6A through FIG. 6D, and FIG. 7A through FIG. 7D, and other arrangements may be equally suitable.

In particular, it is noted that end-effectors other than a hand may be utilized in first and/or second stimuli. For example, for certain embodiments a stylus might be used for gestures and/or postures serving as first and/or second stimuli. Likewise, user manipulations other than gestures and/or postures may be equally suitable, including but not limited to voice commands, subvocalizations, facial postures and/or movements, eye orientation and/or movement, input device commands (e.g. typed text, mouse clicks, joystick manipulation, etc.) and brainwave levels and patterns.

However, for at least some embodiments of the present invention viewer-executed end-effector manipulations, including but not limited hand postures and/or gestures, may be useful, at least insofar as hand postures and gestures are frequently natural and intuitive.

It is noted that although the gestures shown in FIG. 5A through FIG. 5D, FIG. 6A through FIG. 6D, and FIG. 7A through FIG. 7D involve passing an end-effector (specifically a viewer's hand) through the bridge, contact between an end-effector and the bridge is not required.

Figure 8A:
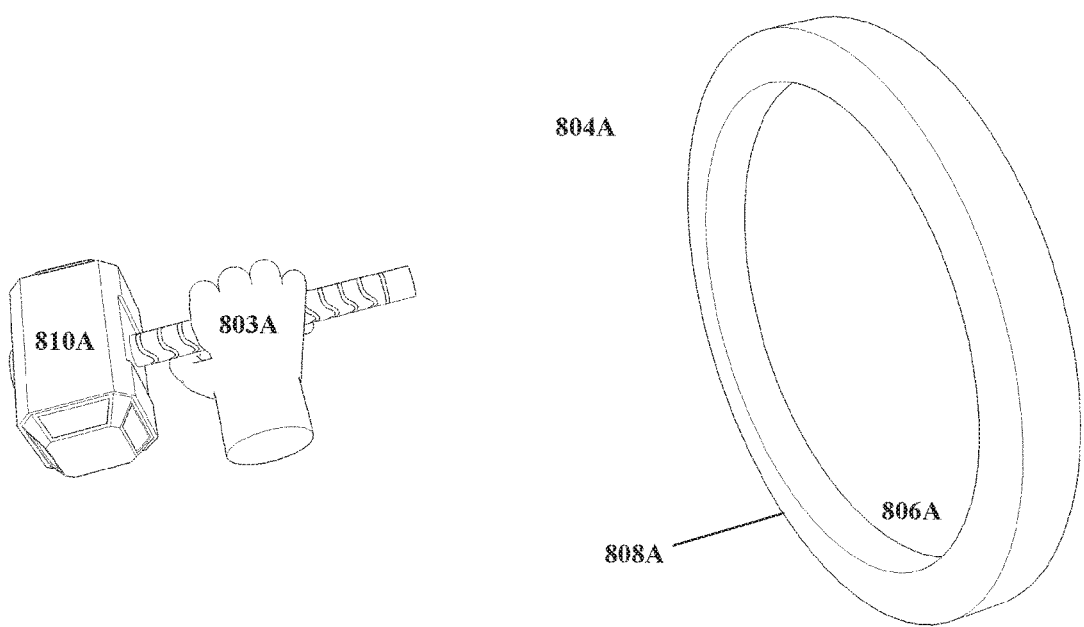
FIG. 8A shows a perspective view of an example arrangement of a first and second domain with a bridge therebetween, initiating transferring an entity into the second domain according to the present invention.

For example, turning to FIG. 8A an arrangement is shown therein with a first domain 804A, a second domain 806A, a bridge 808A, and a hand 803A as might belong to a viewer. The bridge 808A is resolved in this example as a ring permitting vision therethrough. The second domain 806A is visible through the aperture of the bridge 808A. Also in FIG. 8A, an entity 810A is present, engaged by the hand 803A. The entity might for example be a virtual or augmented object, although this is an example only. As may be seen the hand 803A is in a posture corresponding approximately to one used to grip an object. In the arrangement shown in FIG. 8A, the gripping hand posture as shown is utilized as a portion of a gesture that that serves as a first stimulus (a stimulus that transfers an entity from the first domain to the second domain), more particularly a first stimulus that does not require a hand 803A or other end effector to pass through or directly engage the bridge 808A.

Figure 8B:
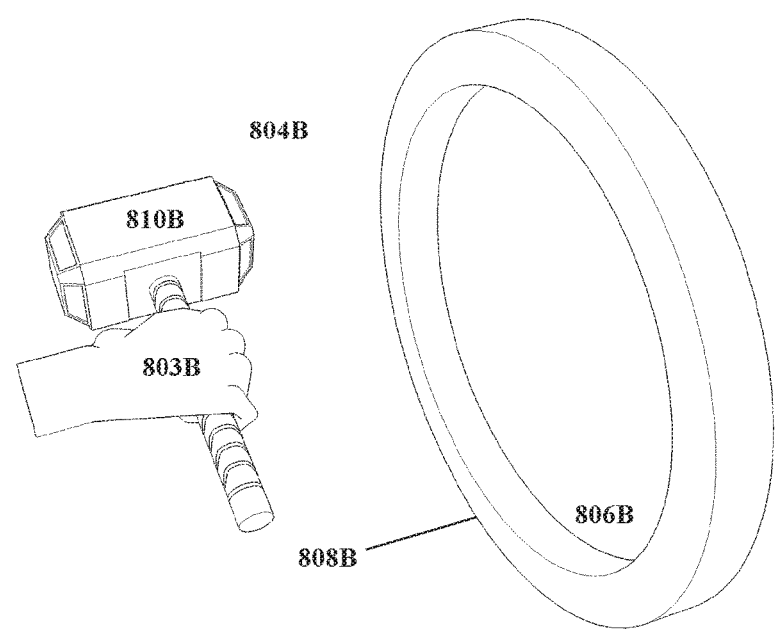
FIG. 8B shows a perspective view of an example arrangement of a first and second domain with a bridge therebetween, continuing transferring an entity into the second domain according to the present invention.

Turning to FIG. 8B, a later portion of a first stimulus gesture with the hand 803B may be seen. The first domain 804B, second domain 806B, and bridge 808B are visibly unchanged from FIG. 8A, but the hand 803B has moved toward the gate 808B and rotated, moving and rotating the entity 810B therewith.

Figure 8C:
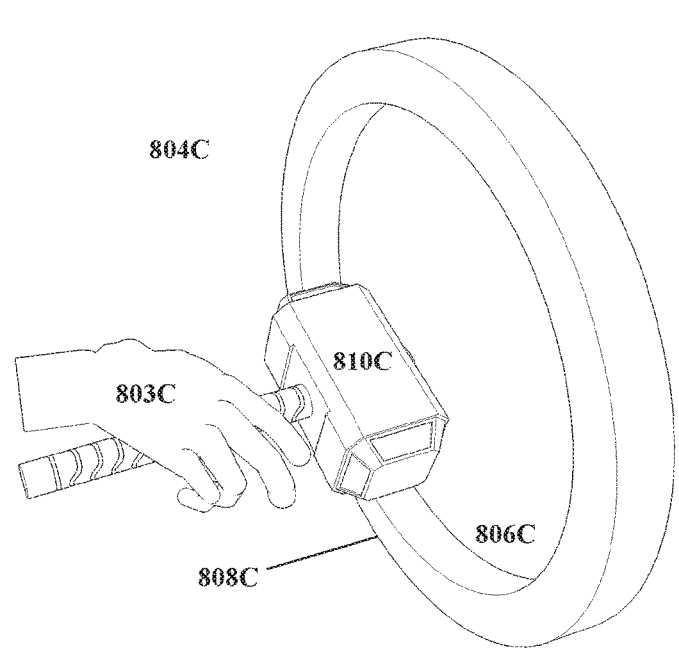
FIG. 8C shows a perspective view of an example arrangement of a first and second domain with a bridge therebetween, further continuing transferring an entity into the second domain according to the present invention.

In FIG. 8C, a still later portion of a first stimulus gesture with the hand 803C is shown. The first domain 804C, second domain 806C, and bridge 808C are visibly unchanged from FIG. 8B. However, the hand 803C has moved further toward the gate 808B and further rotated. In addition, the hand 803C has changed configuration so as to no longer be in a gripping posture, instead being in a posture substantially similar to one for releasing a thrown object. The entity 810C has also further moved and rotated. In addition, the entity 810C is no longer engaged with the hand 803C, the hand 803C having disengaged therefrom (i.e. through the change in the configuration of the hand 803C).

Figure 8D:
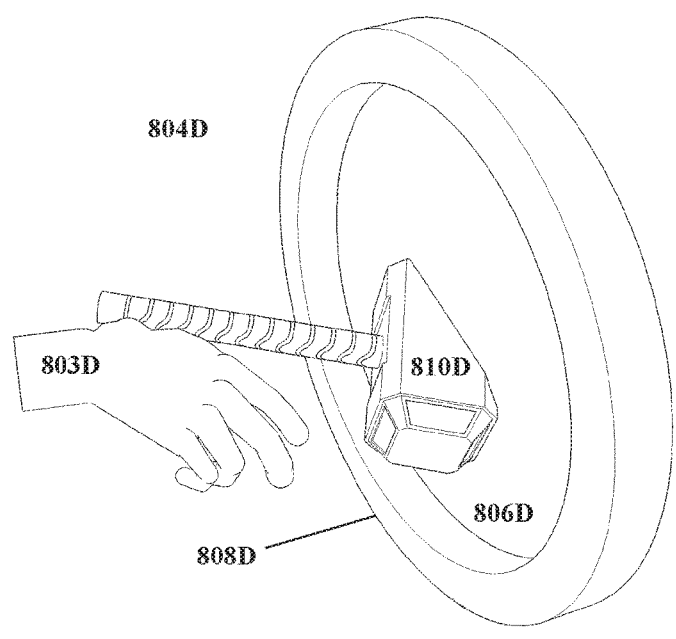
FIG. 8D shows a perspective view of an example arrangement of a first and second domain with a bridge therebetween, still continuing transferring an entity into the second domain according to the present invention.

Moving to FIG. 8D, a yet later portion of a first stimulus gesture with the hand 803D is shown. The first domain 804D, second domain 806D, and bridge 808D are visibly unchanged from FIG. 8C. The hand 803D likewise is unchanged. However, the entity 810D has continued to move in the direction of the bridge 808D and to rotate. In the example as shown, the entity 810D is partially de-resolved, having passed partially through the bridge 808D. As previously noted, such a behavior is an example only, and other arrangements are equally suitable. In an arrangement such as a virtual and/or augmented reality system, self-moving behavior such as is shown for the entity 810D in FIG. 8D might be accomplished for example by instituting a physics model for some or all entities within the virtual and/or augmented reality system, so that such entities behave in at least some regards similarly to physical objects in the physical world (e.g. exhibiting linear and/or angular momentum, etc.). Other arrangements also may be suitable.

Figure 8E:
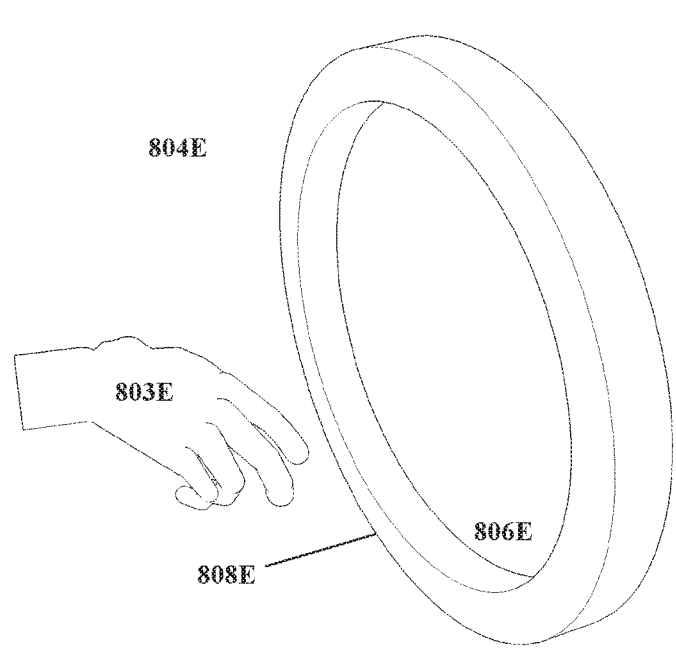
FIG. 8E shows a perspective view of an example arrangement of a first and second domain with a bridge therebetween, completing transferring an entity into the second domain according to the present invention.

Turning to FIG. 8E, an arrangement after the first stimulus by the hand 803E is complete is shown. The first domain 804E, second domain 806E, and bridge 808E are visibly unchanged from FIG. 8C. The hand 803E likewise is unchanged. The entity is no longer visible, having passed through the bridge 808E and now being within the second domain 806E. In sum, as a result of the gesture (first stimulus) shown in the sequence of FIG. 8A through FIG. 8E, an entity has been transferred from the first domain to the second domain, and has been so transferred without the hand passing through or otherwise directly interacting with the bridge.

Other arrangements for first and/or second stimuli that do not incorporate contact with, passage through, and/or direct interaction with a bridge may also be equally suitable. For example, a posture/gesture might be executed within the first domain, e.g. in relation to an entity in the first domain, with the entity then being transferred to the second domain. As a more specific example, touching an entity (or otherwise identifying the entity) and snapping the fingers on a hand might constitute a stimulus, with the entity then being transferred between first and second domains. As has been noted, the bridge may in some embodiments be a set of executable instructions with no resolved appearance or "form" as such, and so may not even exist in such a way as to enable hands, entities, etc. to pass therethrough or interact directly therewith. Thus, for at least some embodiments first and/or second stimuli may necessarily exclude passage through the bridge, and/or direct interaction therewith.

However, for at least some embodiments it may be useful to utilize a bridge that is spatially disposed within an environment, for at least the reason that contacting a bridge with a hand or other end-effector, and/or passing a hand or other end-effector through a bridge, may be intuitive for transferring entities. Such an arrangement bears at least some resemblance to manipulation of familiar physical-world objects, e.g. taking an item out of a bag of a box, etc. Although additional arrangements having a spatially defined bridge, first domain, and/or second domain are presented subsequently to illustrate additional features of the present invention, a spatially defined bridge, first domain, and/or second domain is not required, and the present invention is not limited thereto.

Figure 9:
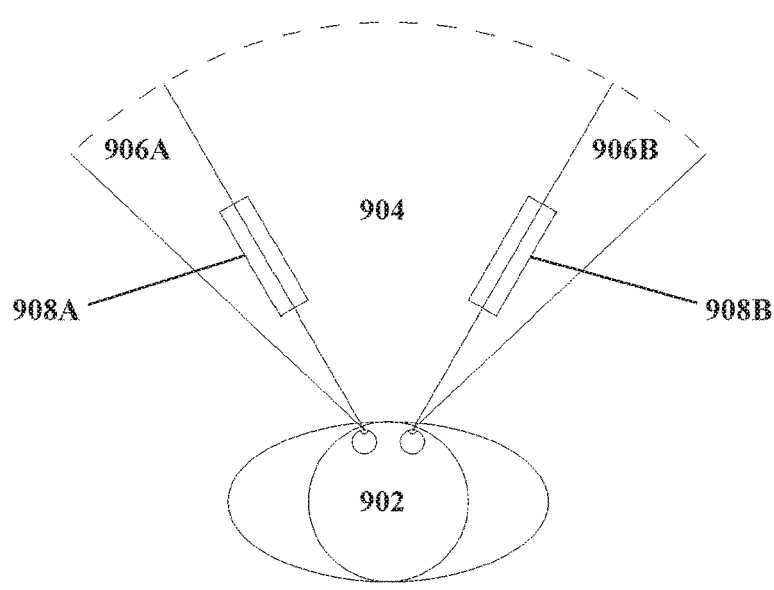
FIG. 9 shows an overhead schematic view of an example arrangement of a first domain and two second domains according to the present invention.

Turning to FIG. 9, an example arrangement is shown with a first domain 904 and two second domains 906A and 906B, each second domain 906A and 906B being distinct from the first domain 904. First and second bridges 908A and 908B are shown arranged so as to enable communication between the first domain 904 and the second domains 906A and 906B. As shown, the first domain 904 is configured so as to approximately correspond with an area of an environment that would be within the visual field of a viewer 902 as shown therein. The second domains 906A and 906B are shown to represent a portion of an environment other than the first domain 904. Also, the second domains 906A and 906B are shown to be substantially peripheral to the field of view of the viewer 902, though this is an example only and is not required. In addition, as may be understood from FIG. 9, the present invention is not limited only to one second domain 906A and 906B; likewise, the present invention is not limited only to one first domain 904.

It is noted the use of multiple second domains 906A and 906B as in FIG. 9 may support organization of multiple entities within the second domain(s) of a particular embodiment. However, other arrangements for organizing multiple entities within one or more second domains may be equally suitable. Many approaches for organizing entities, identifying entities, and distinguishing therebetween are possible within the scope of the present invention, and the present invention is not particularly limited with respect thereto.

Figure 10:
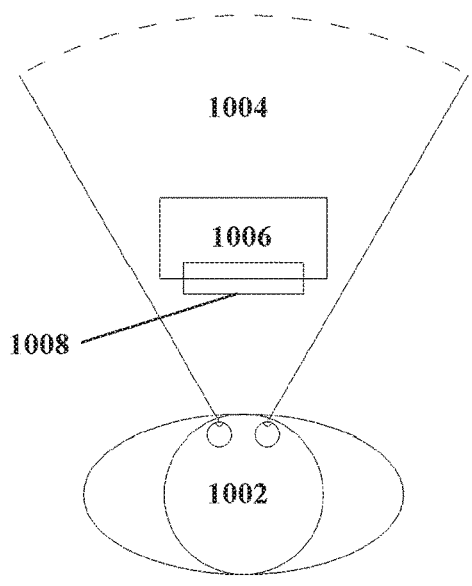
FIG. 10 shows an overhead schematic view of an example arrangement of a first domain substantially corresponding to a visual field and a second domain disposed therein, according to the present invention.

With reference now to FIG. 10, an example arrangement is shown with a first domain 1004 and a second domain 1006 distinct from the first domain 1004. A bridge 1008 is shown arranged so as to enable communication between the first domain 1004 and the second domain 1006. As shown, the first domain 1004 is configured so as to approximately correspond with an area of an environment that would be within the visual field of a viewer 1002 as shown therein. The second domain 1006 is shown to represent a portion of an environment other than the first domain 1004. More particularly, the second domain 1006 is shown to be a discrete space within the first domain 1004, with the bridge 1008 communicating therebetween. (Although as noted previously specifically with regard to FIG. 3B and FIG. 3D, a second domain may coincide spatially with a first domain, thus the area of the second domain 1006 in FIG. 11 is not necessarily excluded from the area of the first domain 1004.)

Figure 11:
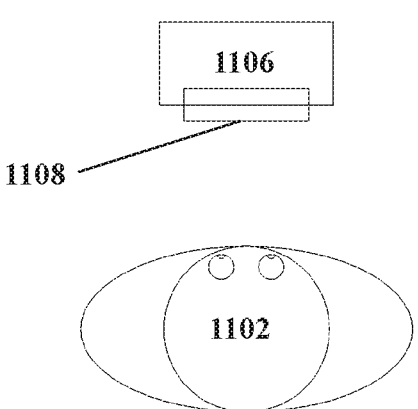
FIG. 11 shows an overhead schematic view of an example arrangement of a first domain substantially unbounded and a second domain disposed therein, according to the present invention.

Turning to FIG. 11, an example arrangement is shown with a first domain 1104 and a second domain 1106 distinct from the first domain 1104. A bridge 1108 is shown arranged so as to enable communication between the first domain 1104 and the second domain 1106. As shown, the first domain 1104 is configured so as to encompass substantially an entire environment surrounding a viewer 1102, potentially excepting the area of the second domain 1106. (As noted previously specifically with regard to FIG. 3B and FIG. 3D, a second domain may coincide spatially with a first domain, thus the area of the second domain 1106 in FIG. 11 is not necessarily excluded from the area of the first domain 1104.) The second domain 1106 is shown to represent a portion of an environment other than the first domain 1104, as a discrete space within the first domain 1104. The arrangement of FIG. 11 is at least somewhat similar to that of FIG. 10, except in that the first domain 1104 in FIG. 11 is essentially unbounded except for the bridge 1108 and/or second domain 1106.

Figure 12:
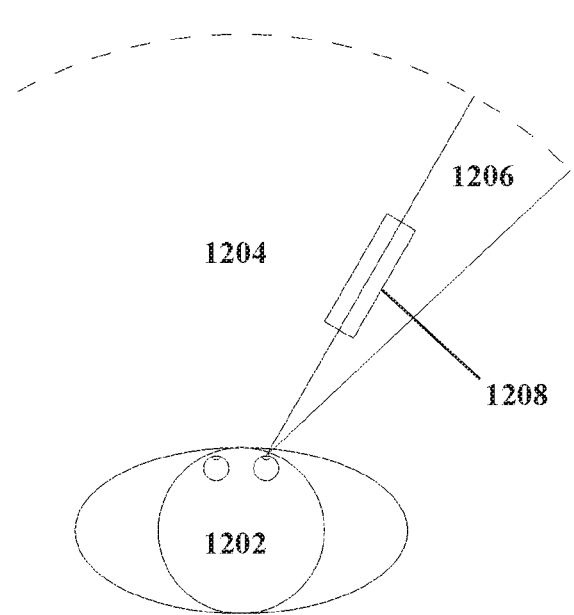
FIG. 12 shows an overhead schematic view of an example arrangement of a first domain with a second domain substantially outside a visual field, according to the present invention.

Referring now to FIG. 12, an example arrangement is shown with a first domain 1204 and a second domain 1206 distinct from the first domain 1204. A bridge 1208 is shown arranged so as to enable communication between the first domain 1204 and the second domain 1206. As shown, the first domain 1204 is configured so as to approximately correspond with an area of an environment that would be within the visual field of a viewer 1202 as shown therein. The second domain 1206 is shown to represent a portion of an environment other than the first domain 1204, in particular a region peripheral to the visual field of the viewer 1202 and to the right thereto. As may be seen, the arrangement of first domains 1204 and/or second domains 1206 is not required to be symmetrical, nor is such arrangement required to be centered with respect to the field of view of a viewer 1202.

Figure 13:
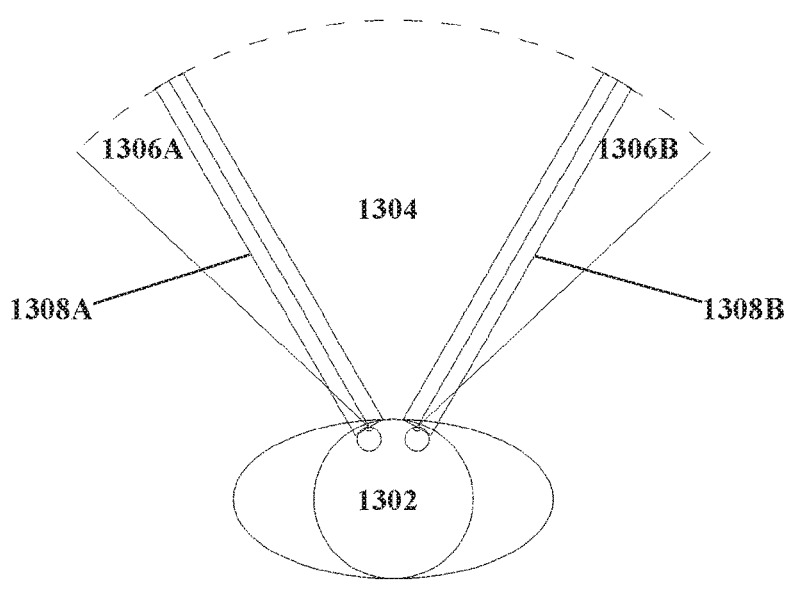
FIG. 13 shows an overhead schematic view of an example arrangement of a first domain with two second domains and bridges extending a length thereof, according to the present invention.

In FIG. 13 an example arrangement is shown with a first domain 1304 and two second domains 1306A and 1306B, each second domain 1306A and 1306B being distinct from the first domain 1304. First and second bridges 1308A and 1308B are shown arranged so as to enable communication between the first domain 1304 and the second domains 1306A and 1306B. As shown, the first domain 1304 is configured so as to approximately correspond with an area of an environment that would be within the visual field of a viewer 1302 as shown therein. The second domains 1306A and 1306B are shown to represent a portion of an environment other than the first domain 1304, substantially peripheral to the field of view of the viewer 1302.

It is noted that while FIG. 13 may be at least somewhat similar to FIG. 9, the bridges 1308A and 1308B in FIG. 13 are significantly longer than the bridges in FIG. 9, with the bridges 1308A and 1308B in FIG. 13 extending substantially the entire illustrated boundary between the first domain 1304 and the second domains 1306A and 1306B. It is pointed out that bridges are not particularly limited insofar as size and/or configuration. In addition, although for simplicity bridges typically are illustrated herein as straight lines and/or flat planes, this is an example only, and other shapes and/or arrangements for bridges may be equally suitable, including but not limited to curved and/or asymmetric bridges.

Figure 14:
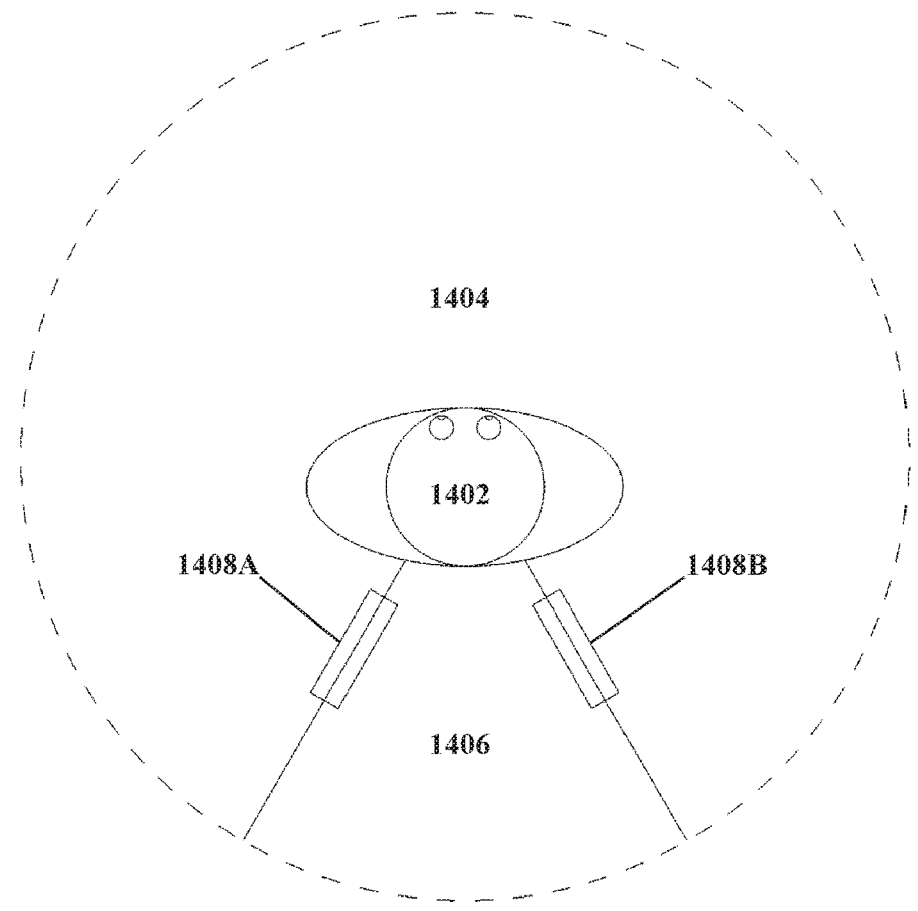
FIG. 14 shows an overhead schematic view of an example arrangement of a first domain and a second domain substantially behind a viewer, according to the present invention.

Turning to FIG. 14, an example arrangement is shown therein with a first domain 1404 and a second domain 1406 distinct from the first domain 1404. First and second bridges 1408A and 1408B are shown arranged so as to enable communication between the first domain 1204 and the second domain 1206. As may be seen, the present invention permits for at least some embodiments the use of multiple bridges 1408A and 1408B for each first domain 1404 and/or each second domain 1406. In addition, as also may be seen the second domain 1406 may be arranged so as to be substantially outside the field of view of the viewer 1402. Although not illustrated in FIG. 14, the first domain 1404 likewise may be arranged so as to be substantially outside the field of view of the viewer 1402.

At this point additional discussion regarding potential uses of the present invention may be illuminating.

There is a notion in animated films that is sometimes referred to as "hammerspace". The term derives from the ability of characters to reach out of view—behind their back, behind an object obstructing line of sight, out of the field of view, etc.—to obtain that are then used on-screen. The classic item so retrieved, and presumably the source of the term, is a large hammer that the character then proceeds to use. Implausibly large and/or complex items may be drawn from small or even apparently non-existent spaces. In practice, the effect on-screen is as if objects were taken from nowhere (sometimes disappearing thereafter just as inexplicably).

The arrangement of first domain, second domain, and bridge in the present invention as shown and described herein is at least somewhat similar in general concept to the notion of hammerspace. However, it is emphasized that while the animation version of hammerspace is only an example of artistic license, the present invention can be implemented so as to actually provide such functionality, in settings including but not limited to viewer interfaces such as virtual and/or augmented reality environments.

For example, again with reference to FIG. 14, in the example arrangement shown therein the first domain 1404 generally surrounds the viewer 1402, except for the second domain 1406 disposed generally behind the viewer 1402. Consider further an example wherein entities in the first domain 1404 are resolved while entities in the second domain 1406 are not, and wherein first and/or second stimuli for transferring entities between the first and second domains 1404 and 1406 are hand gestures that include passing a hand through the bridge 1408A or 1408B. The viewer 1402 could then, in effect, reach behind himself or herself, reach through the bridge 1408A or 1408B, and transfer an object in the second domain 1406 into the first domain 1404. For at least some such arrangements, the effect would be that the viewer 1402 retrieved an entity—for purposes of illustration, perhaps a virtual hammer—from out of nowhere (though in practice the entity was formerly in the second domain). The viewer 1402 could likewise transfer the hammer (or another entity) into the second domain 1406 from the first domain 1404 with the effect of disposing of the hammer into nowhere.

It is emphasized that although certain implementations of the present invention may exhibit properties that may appear in some instances counterintuitive insofar as physical-world behavior is concerned, such as the appearance of drawing items from "nowhere", the present invention supports such functionality in practice, e.g. through the use of first and second domains with a bridge therebetween as shown and described herein.

Although for illustrative purposes a hammer is used as an example of an entity that may be transferred between first and second domains, the present invention is not limited thereto. A wide range of entities may be utilized with the present invention, and/or transferred between first and second domains thereof, including but not limited to virtual objects, augmentations and/or augmented objects, files and/or other data, and applications and/or other executable instructions. Other entities also may be equally suitable.

The present invention may be implemented in numerous environments, and is not particularly limited with respect thereto. Suitable environments may include, but are not limited to, virtual reality environments, augmented reality environments, and non-immersive graphical user interfaces. In addition, the functionality of the present invention may be advantageous for many reasons, including but not limited to the following.

For certain embodiments, the ability to transfer entities between first and second domains may be useful at least insofar as such ability provides for convenient "storage" of entities that even when not in use may desirably be kept close-at-hand. For example, a person viewing and/or operating within a virtual/augmented reality environment may wish to have various entities easily accessible such as virtual objects, commonly-used applications, etc. While a virtual or augmented reality environment may support arranging such objects either in "free space" (floating unsupported) or otherwise resolved and nearby, such an arrangement may result in a cluttered environment. Entities resolved may tend to clutter up available space, obstruct views, distract viewers, etc. By distinguishing first and second domains, and enabling application of different rules for handling entities in the first and second domains, it becomes possible to store entities unresolved (or otherwise less obtrusive) within a second domain. The second domain may nevertheless be nearby and convenient to the viewer, leaving the entities stored therein readily available for access by the viewer.

In addition, for environments with multiple persons viewing and/or interacting therewith, advantages may be offered by the present invention in terms of privacy and interactivity. In an interactive multi-user environment, it may be possible for multiple persons to manipulate a single entity such as a virtual object, a file, etc. Such cooperative manipulation may be productive or otherwise desirable in at least some cases. However, the ability of multiple persons to interact with a single entity also raises issues of permission, e.g. how can "rights" to manipulate a given entity be limited? It may not be desirable in all cases to simply allow everyone to manipulate everything.

With first and second domains having the potential for separate rules for handling entities, it is possible to broadly group entities using the first and second domains, and apply different general rules regarding privacy, accessibility, security, etc. For example, the first domain may establish rules such that entities therein may be accessed, manipulated, etc. by anyone, or at least by anyone within some defined group, etc. To continue the example, the second domain then may establish rules such that entities therein may be accessed, manipulated, etc. only by a single viewer, only by a group of trusted viewers, etc. Moreover, rules might be instituted for the second domain such that only a single viewer or a limited group could even see entities in the second domain (selectively resolving the entities therein only for that viewer), reach into or otherwise remove entities from the second domain, etc. The second domain might thus be made a private or at least semi-private location.

Such a security arrangement would not necessarily preclude other measures, such as passwords, biometric identification, etc. However, arranging entities into groups for/in a first domain and a second domain (and/or additional domains) with different levels of privacy may provide at least a framework for security, and/or a basis on which to implement additional security features.

Figure 15:
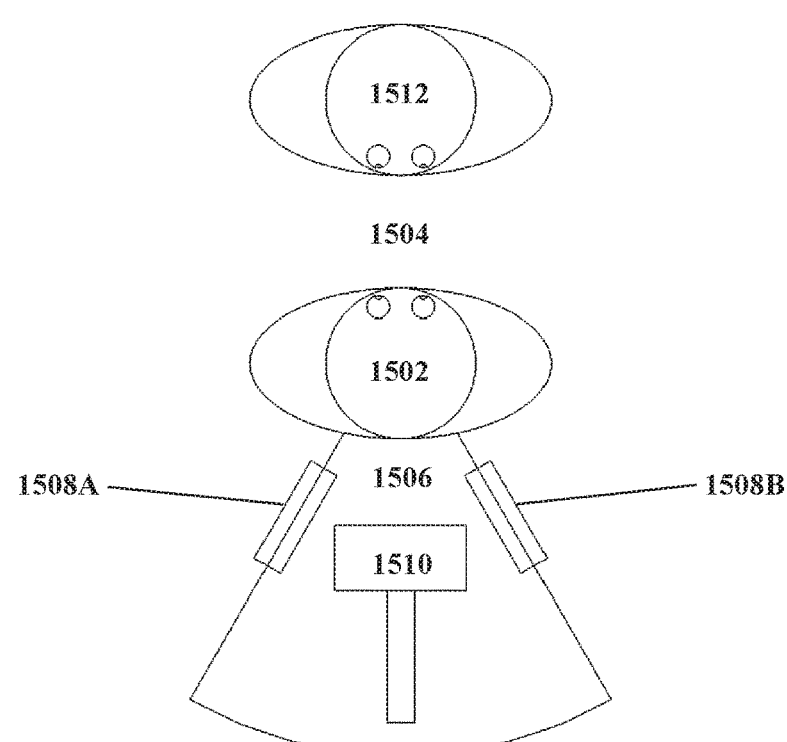
FIG. 15 shows an overhead schematic view of an example arrangement of two viewers, as viewable by one viewer according to the present invention.
Figure 16:
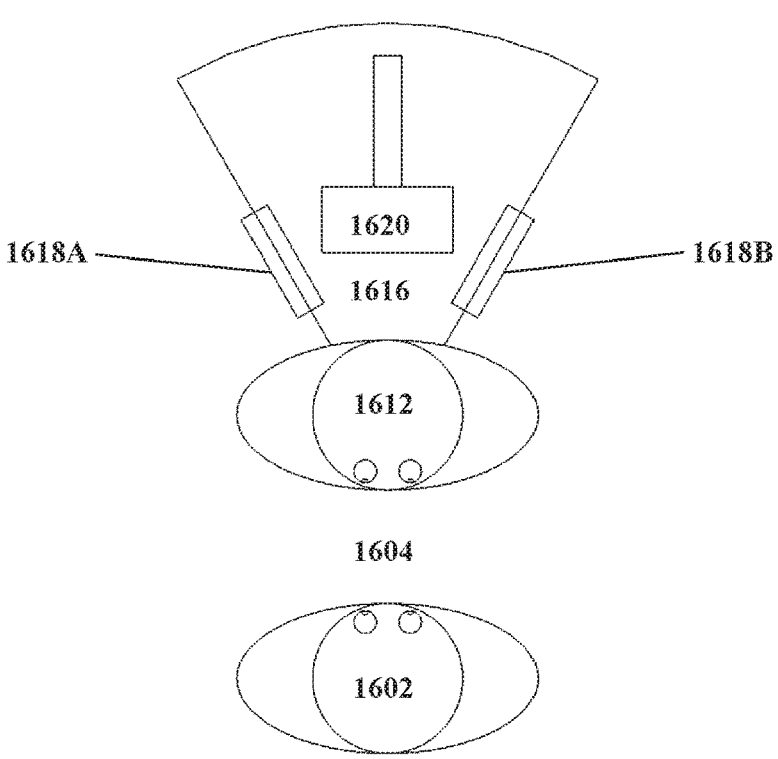
FIG. 16 shows an overhead schematic view of an example arrangement of two viewers, as viewable by another viewer according to the present invention.

As may be suggested by the preceding, for at least some embodiments the second domain may be personal. That is, for an environment supporting multiple viewers interacting therewith, there may be a second domain specific to each such viewer. With reference now to FIG. 15 and FIG. 16, an arrangement wherein a second domain may be personal and/or specific to an individual is shown therein.

In FIG. 15, a first viewer 1502 and a second viewer 1512 are present therein. The arrangement in FIG. 15 is shown with respect to the first viewer 1502. That is, what is present in FIG. 15 is what could be perceived by the first viewer 1502 (though with a top-down perspective for clarity, rather than necessarily being shown from the literal point of view of the first viewer 1502). A first domain 1504 substantially fills the environment surrounding the first and second viewers 1502 and 1512, except for a second domain 1506 disposed behind the first viewer 1502. The first domain 1504 and second domain 1506 are in communication via bridges 1508A and 1508B. In addition, an entity 1510 is present in the second domain 1506.

As may be seen, with respect to the first viewer 1502 the second viewer 1512 does not have a second domain associated therewith, nor any entities therein.

Now with reference to FIG. 16, again a first viewer 1602 and a second viewer 1612 are present therein. However, the arrangement in FIG. 16 is shown with respect to the second viewer 1612, so that what is present in FIG. 16 is what could be perceived by the second viewer 1612. A first domain 1604 substantially fills the environment surrounding the first and second viewers 1602 and 1612, except for a second domain 1616 disposed behind the second viewer 1612. The first domain 1604 and second domain 1616 are in communication via bridges 1618A and 1618B. In addition, an entity 1620 is present in the second domain 1616.

As may be seen, with respect to the second viewer 1612 the first viewer 1602 does not have a second domain associated therewith, nor any entities therein.

A comparison of FIG. 15 with FIG. 16 reveals an arrangement wherein each of first and second viewers shares a common first domain, but wherein each such viewer has a second domain specific to the individual viewer, i.e. in FIG. 15 the second domain 1506 (and the entity 1510 therein) is visible to (resolved for) the first viewer 1502 but not for the second viewer 1512, while in FIG. the second domain 1616 (and the entity 1620 therein) is visible to the second viewer 1612 but not the first viewer 1602. In both FIG. 15 and FIG. 16, a viewer therein sees his or her "personal" second domain, but does not see (and may not be permitted to access) a second domain associated with another viewer in the same vicinity.

Figure 17:
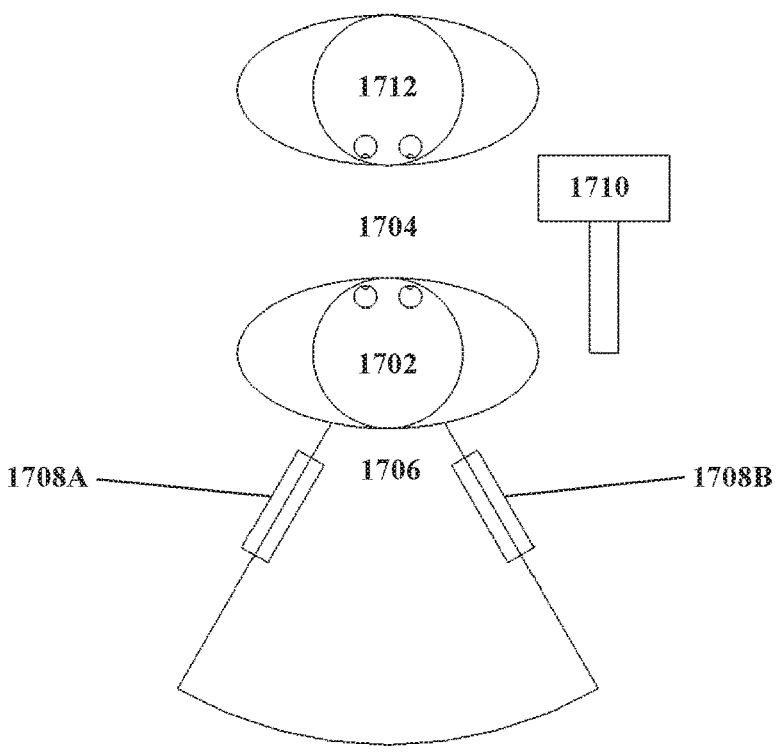
FIG. 17 shows an overhead schematic view of another example arrangement of two viewers, as viewable by one viewer according to the present invention.
Figure 18:
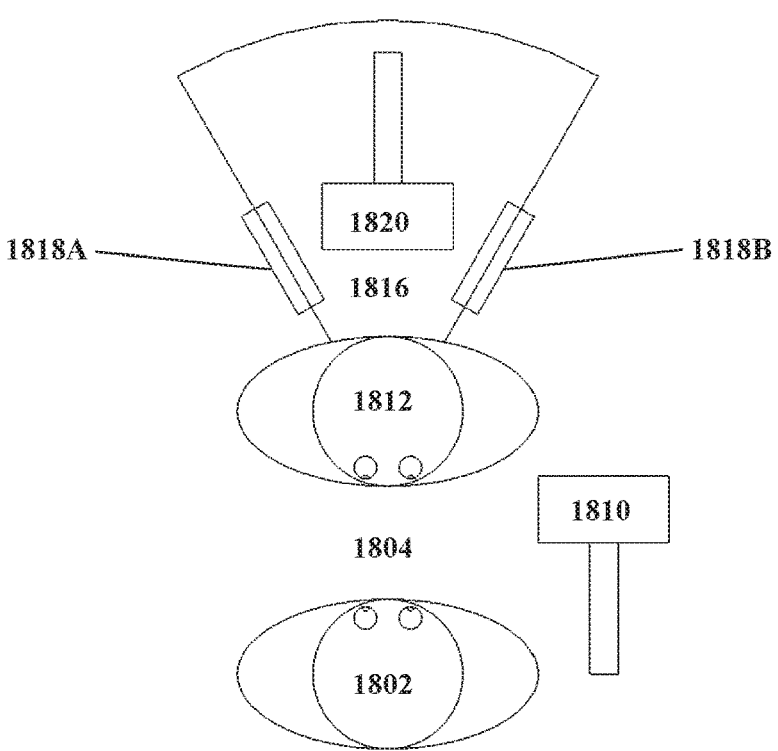
FIG. 18 shows an overhead schematic view of another example arrangement of two viewers, as viewable by another viewer according to the present invention.

However, as may be seen with respect to FIG. 17 and FIG. 18, a first domain may nevertheless be managed as common to multiple viewers.

In FIG. 17, a first viewer 1702 and a second viewer 1712 are present therein. The arrangement in FIG. 17 is shown with respect to the first viewer 1702, so that what is present in FIG. 17 is what could be perceived by the first viewer 1702. A first domain 1704 substantially fills the environment surrounding the first and second viewers 1702 and 1712, except for a second domain 1706 disposed behind the first viewer 1702. The first domain 1704 and second domain 1706 are in communication via bridges 1708A and 1708B. In addition, an entity 1710 is present in the first domain 1704. The arrangement is at least somewhat similar to that in FIG. 15, except that in FIG. 17 the entity 1710 is in the first domain 1704 rather than in the second domain 1706 (as might be the case if the entity 1710 had been transferred from the second domain 1706 to the first domain 1704).

Again as may be seen, in FIG. 17 with respect to the first viewer 1702 the second viewer 1712 does not have a second domain associated therewith, nor any entities therein.

Now with reference to FIG. 18, again a first viewer 1802 and a second viewer 1812 are present therein. However, the arrangement in FIG. 18 is shown with respect to the second viewer 1812, so that what is present in FIG. 18 is what could be perceived by the second viewer 1812. A first domain 1804 substantially fills the environment surrounding the first and second viewers 1802 and 1812, except for a second domain 1816 disposed behind the second viewer 1812. The first domain 1804 and second domain 1816 are in communication via bridges 1818A and 1818B. In addition, an entity 1820 is present in the second domain 1816.

As may be seen, with respect to the second viewer 1812 the first viewer 1802 does not have a second domain associated therewith, nor any entities therein. However, as also may be seen, an entity 1810 is present in the first domain 1804, as might present if the entity 1810 had been transferred to the first domain 1804 from a second domain associated with the first viewer 1802. It is emphasized that FIG. 18 is shown with respect to the second viewer, and that even though the second viewer 1812 could perceive no second domain associated with the first viewer 1802, nevertheless an entity 1810 drawn from a second domain associated with the first viewer 1802 may be visible to the second viewer 1812 once that entity 1810 is in the first domain 1804. The second viewer 1812 likewise may interact with such an entity 1810 while in the first domain 1804, even if the entity 1810 was previously in a second domain inaccessible to that second viewer 1812.

In effect, then, from the standpoint of viewers within an environment having first and second domains according to the present invention, it is possible for entities to manifest to some or all viewers that previously were not apparent to those viewers, to some appearances as if pulled out of another viewer's back pocket, or from "hammerspace". Entities likewise may be made to apparently disappear in similar fashion.

The previous discussion addressed an arrangement wherein a bridge and/or a second domain is disposed behind a viewer's back, so as to be out of sight of that viewer. However, other arrangements that may dispose a bridge and/or a second domain out of sight of a viewer may also be equally suitable, including but not limited to the following.

Figure 19:
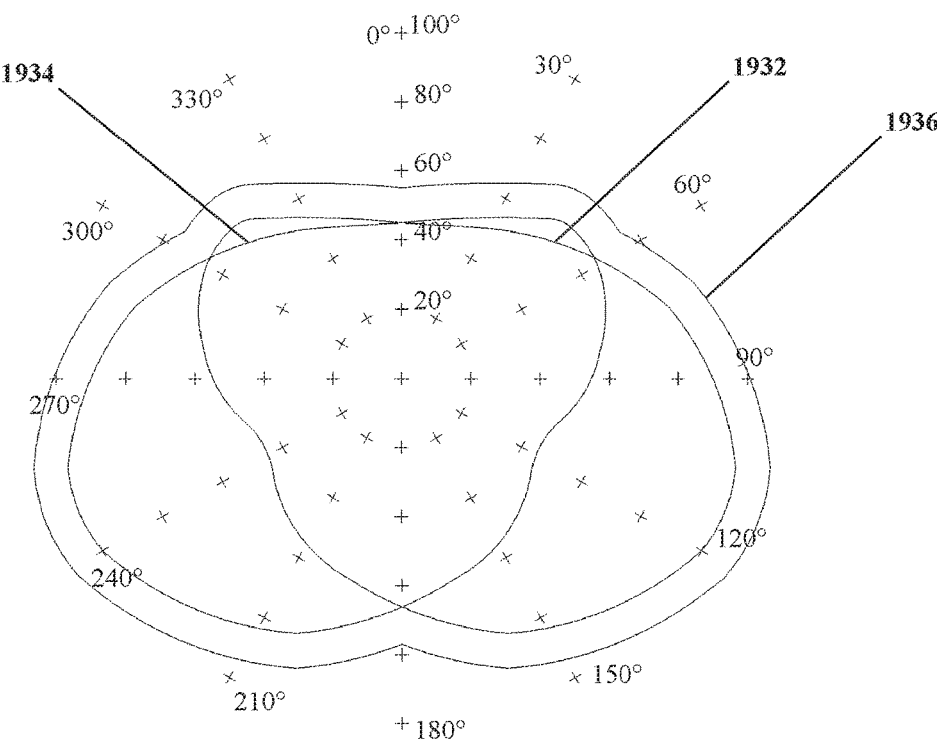
FIG. 19 shows a schematic view of visual fields of a viewer.

With reference to FIG. 19, a diagram illustrating a typical human visual field is shown therein. Peripheral numbers indicate angle clockwise from the vertical, while radial numbers indicate angle outward from a nominal centerline. As human vision typically is stereo in nature, as may be expected a visual field is a combination of two individual sub-fields, a right sub-field 1932 as viewed by the right eye and a left sub-field 1934 as viewed by the left eye. It is noted that the visual field shown in FIG. 19 is an example only for purposes of illustration; variations may exist among individuals and even within individuals over time, etc.

So long as a bridge is disposed substantially at the edge of a viewer's combined visual field 1932 and 1934, and/or is disposed substantially outside the combined visual field 1932 and 1934, that bridge will not be visible to the viewer (even if the bridge is resolved in a nominally visible form, though as previously noted such resolution is not required). To assure such non-visibility, a bridge might be disposed for example at some angular distance outside the nominal combined visual fields 1932 and 1934; an example of such an angular distance beyond the combined visual fields 1932 and 1934 is indicated by the outline 1936 in FIG. 19; as shown the outline 1936 is approximately 10 degrees beyond the combined visual fields 1932 and 1934. If one or more bridges were disposed anywhere along such an outline 1936, or even if the entirety of the outline 1936 were to serve as a bridge, such a bridge would not be visible to the viewer.

It is noted that the arrangements shown in FIG. 14 through FIG. 17, may be considered special cases of such an arrangement. In FIG. 14 through FIG. 17 second domains therein are disposed behind the viewers associated therewith, thus being outside of the fields of view of those viewers. Disposing the bridge substantially at or substantially outside the edges of the visual field 1932 and 1934 as shown in FIG. 19 may be a considered a more general arrangement.

However, an arrangement wherein a bridge is outside the visual field of a viewer is an example only, and the present invention is not limited thereto. In addition, the present invention does not require that a bridge be disposed so as to be non-visible to a viewer associated therewith (or to any other viewer).

Thus far description has focused mainly on static arrangements, that is, arrangements of first domain(s), second domain(s), bridge(s), and viewer(s) wherein all such entities remain substantially fixed in position and/or orientation. However, the present invention does not require static arrangements, and is not limited thereto.

Figure 20A:
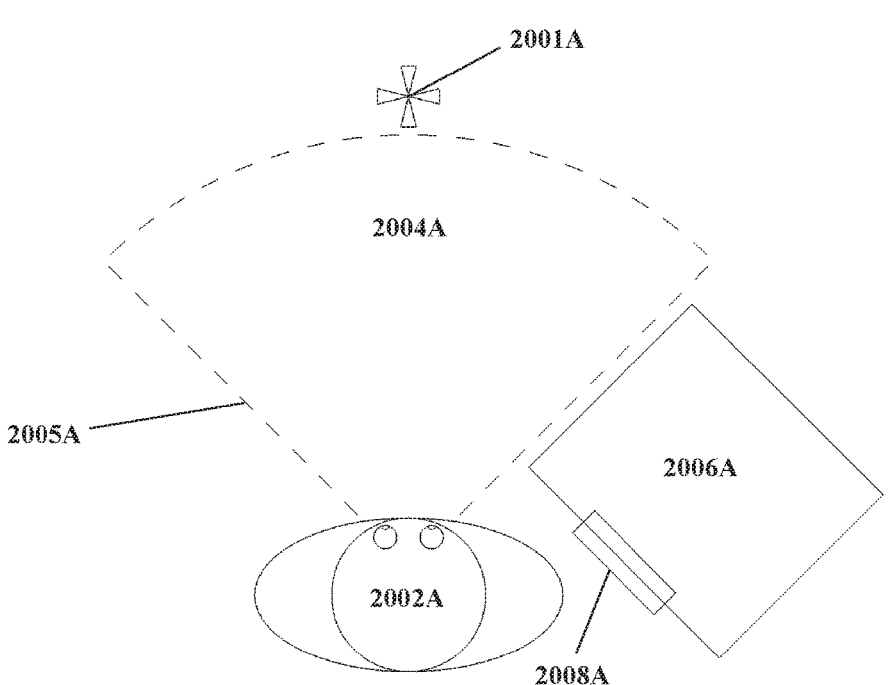
FIG. 20A shows an overhead schematic view of an example arrangement of a first and second domain with a bridge therebetween according to the present invention, relative to a stationary mark.

With reference now to FIG. 20A, an arrangement is shown therein with a viewer 2002A, a first domain 2004A, a second domain 2006A, and a bridge therebetween 2008A. In addition, an approximation of the visual field 2005A of the viewer is shown therein; in practice a particular viewer's visual field may not exactly match the visual field 2005A as shown in FIG. 20A (e.g. possibly being broader, narrower, less uniform, etc.), but the visual field 2005A as shown serves as a representation thereof.

Also, for references purposes (as will be described below) a stationary position reference mark 2001A is shown in FIG. 20A. As may be seen, the reference mark 2001A is disposed centrally in front of the viewer 2002A, at some distance therefrom. It is also pointed out that the bridge 2008A is disposed to the right of the viewer 2002A, angled so as to face approximately toward the right shoulder (and perhaps the hand, not shown) of the viewer 2008A.

Figure 20B:
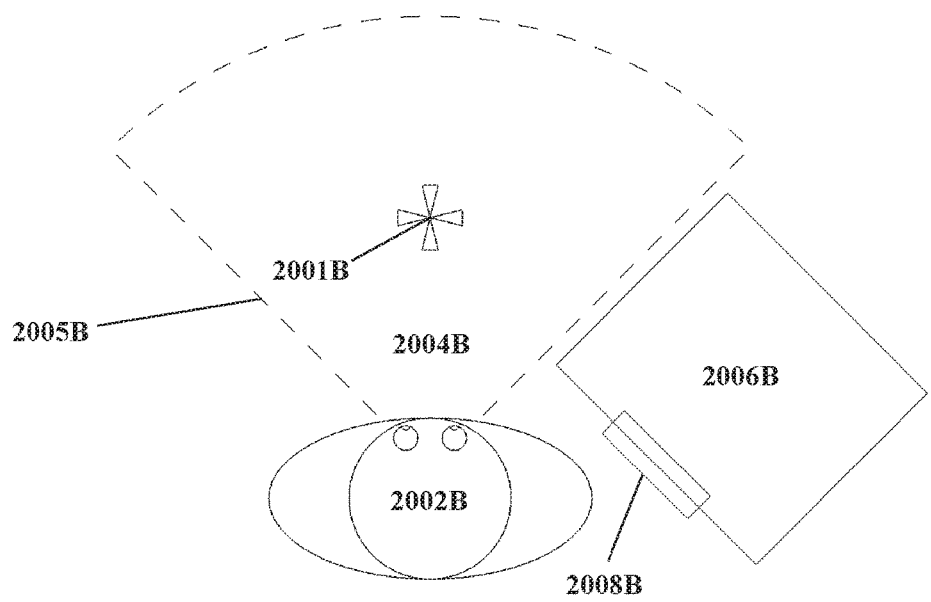
FIG. 20B shows an overhead schematic view of an example arrangement of a first and second domain with a bridge therebetween according to the present invention, with translation relative to a stationary mark.

Turning to FIG. 20B, an arrangement is shown that is at least somewhat similar to FIG. 20A, including a viewer 2002B, a first domain 2004B, a second domain 2006B, and a bridge therebetween 2008B, along with a reference mark 2001B and an outline approximating the viewer's visual field 2005B. However, in FIG. 208 the viewer 2002B has translated forward compared with FIG. 20A. This translation may be noted in particular through comparison of the relative position of the viewer 2002B to the mark 2001B in FIG. 20B with the relative position of the viewer 2002A to the mark 2001A in FIG. 20A.

Despite the translation, it may be observed that the relative position and orientation of the bridge 2008B to the viewer 2002B in FIG. 20B is substantially the same as the relative position and orientation of the bridge 2008A to the viewer 2002A in FIG. 20A. Thus, the bridge 2008B in FIG. 20B has not moved with respect to the viewer 2002B, or with respect to the viewer's visual field 2005B. Likewise the second domain 2006B has not moved with respect to either the bridge 2008B, the viewer 2002B, or the viewer's visual field 2005B. However, the bridge 2008B and the second domain 2006B each have moved relative to the mark 2001B. Depending on whether the first domain 2004B is and/or is considered to be stationary with respect to the mark 2001B, it may also be accurate to state that the bridge 2008B and the second domain 2006B each have moved relative to the first domain 2004B.

Figure 20C:
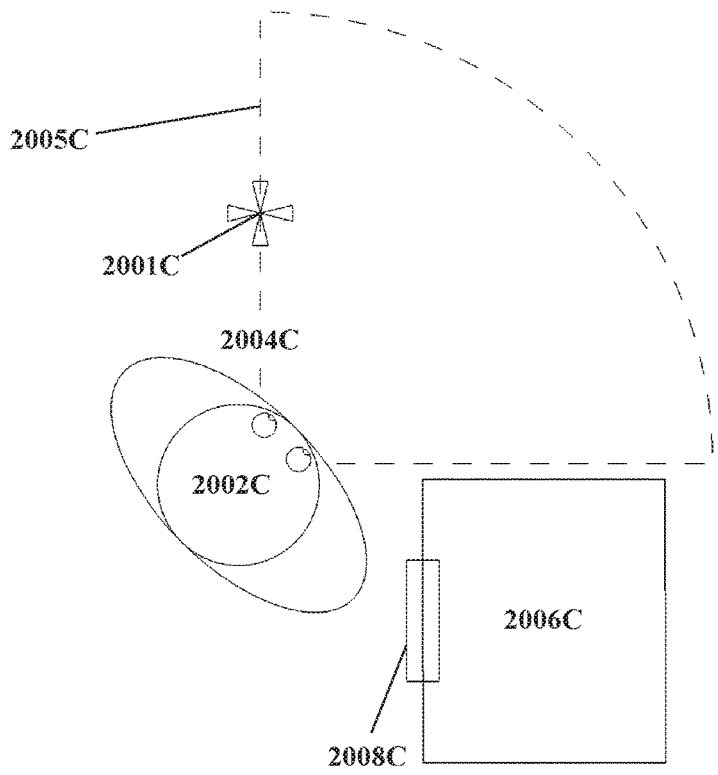
FIG. 20C shows an overhead schematic view of an example arrangement of a first and second domain with a bridge therebetween according to the present invention, with rotation relative to a stationary mark.

Moving on to FIG. 20C, an arrangement is shown that is again at least somewhat similar to FIG. 20A and FIG. 20B, including a viewer 2002C, a first domain 2004C, a second domain 2006C, and a bridge therebetween 2008C, along with a reference mark 2001C and an outline approximating the viewer's visual field 2005C. However, in FIG. 20C the viewer 2002C has rotated approximately 45 degrees to the right compared with FIG. 20B. This rotation may be noted in particular through comparison of the relative position and orientation of the viewer 2002C to the mark 2001C in FIG. 20C with the relative position and orientation of the viewer 2002B to the mark 2001B in FIG. 20B.

Despite the rotation, it may be observed that the relative position and orientation of the bridge 2008C to the viewer 2002C in FIG. 20C is substantially the same as the relative position and orientation of the bridge 2008B to the viewer 2002B in FIG. 20B. Thus, the bridge 2008C in FIG. 20C has not moved with respect to the viewer 2002C, or with respect to the viewer's visual field 2005C. Likewise the second domain 2006C has not moved with respect to either the bridge 2008C, the viewer 2002C, or the viewer's visual field 2005C. However, the bridge 2008C and the second domain 2006C each have moved relative to the mark 2001C. Depending on whether the first domain 2004C is and/or is considered to be stationary with respect to the mark 20010, it may also be accurate to state that the bridge 2008C and the second domain 2006C each have moved relative to the first domain 2004C.

In the examples shown in FIG. 20A through FIG. 20C, the bridge and second domain move so as to remain substantially in the same position and/or orientation with respect to the viewer. While such an arrangement may be useful for at least some embodiments, it is not required that the bridge and/or second domain remain stationary with respect to the viewer.

Figure 20D:
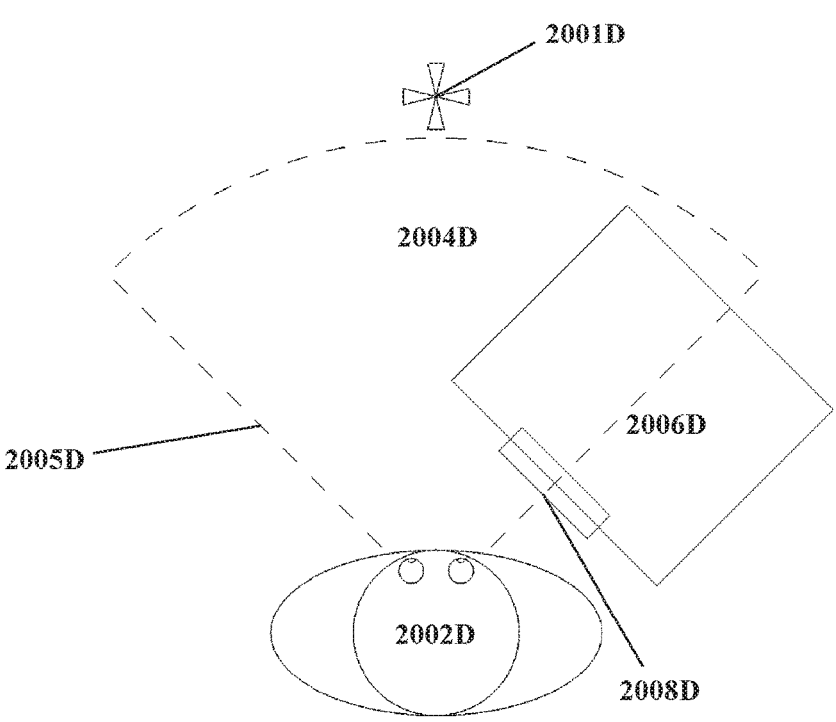
FIG. 20D shows an overhead schematic view of an example arrangement of a first and second domain with a bridge therebetween according to the present invention, with another translation relative to a stationary mark.

With reference now to FIG. 20D, an arrangement is shown therein with a viewer 2002D, a first domain 2004D, a second domain 2006D, and a bridge therebetween 2008D. An approximation of the visual field 2005D of the viewer is shown therein, and a stationary position reference mark 2001D.

A comparison of FIG. 20D to FIG. 20A will reveal that the viewer 2002D in FIG. 20D is in substantially the same position and orientation with respect to the reference mark 2001D as is the viewer 2002A in FIG. 20A with respect to the reference mark 2001A therein. That is, the viewer is in substantially the same position and orientation in FIG. 20A and FIG. 20D. However, as may also be seen by comparison, in FIG. 20D the bridge 2008D and the second domain 2006D have translated up and to the left compared to the position of the bridge 2008A and second domain 2006A in FIG. 20A. The bridge 2008D and the second domain 2006D thus may be considered to have translated with respect to the viewer 2002D.

Figure 20E:
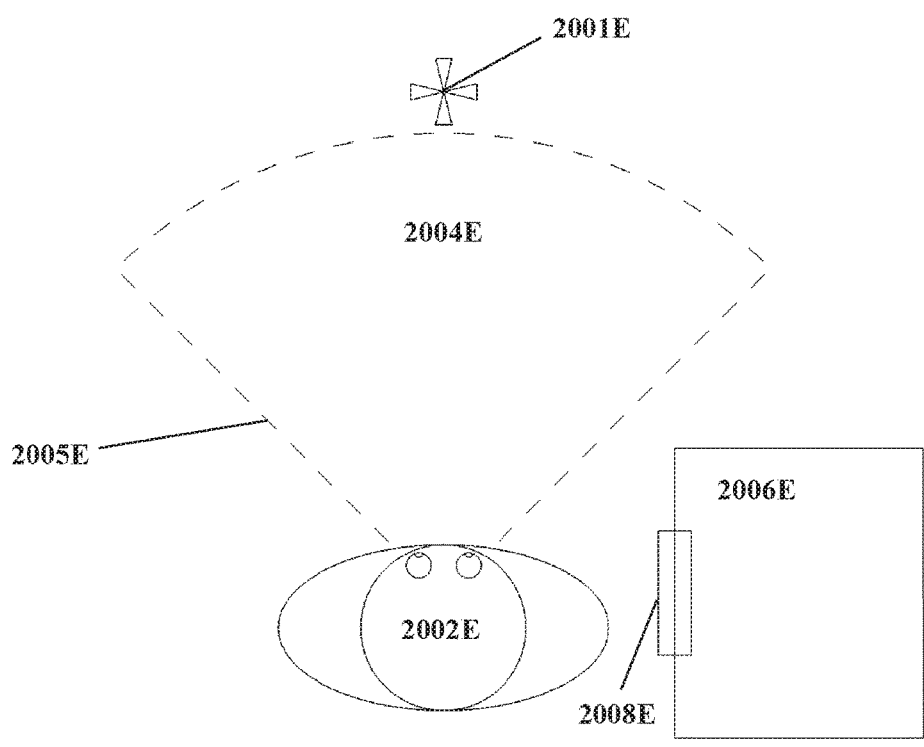
FIG. 20E shows an overhead schematic view of an example arrangement of a first and second domain with a bridge therebetween according to the present invention, with another rotation relative to a stationary mark.

With reference to FIG. 20E, another arrangement is shown therein with a viewer 2002E a first domain 2004E, a second domain 2006E, and a bridge therebetween 2008E. An approximation of the visual field 2005E of the viewer is shown therein, and a stationary position reference mark 2001E.

Again, a comparison of FIG. 20E to FIG. 20A will reveal that the viewer 2002E in FIG. 20E is in substantially the same position and orientation with respect to the reference mark 2001E as is the viewer 2002A in FIG. 20A with respect to the reference mark 2001A therein. That is, the viewer is in substantially the same position and orientation in FIG. 20A and FIG. 20E. However, as may also be seen by comparison, in FIG. 20E the bridge 2008E has rotated approximately 45 degrees clockwise compared to the orientation of the bridge 2008A in FIG. 20A. The second domain 2006E in FIG. 20E has also changed position and orientation relative to the viewer 2002E but has retained position and orientation relative to the bridge 2008E. The bridge 2008E and the second domain 2006D thus may be considered to have rotated with respect to the viewer 2002E.

It will be understood that while motions are shown individually in FIG. 20A through FIG. 20E for clarity, combined motions, e.g. the viewer moving while the bridge and/or second domain also moves, may also be suitable. Likewise, it will be understood that although examples of motions are given, the present is not limited only to the specific motions shown herein.

Motions of the bridge, the second domain, etc. may be managed in numerous ways. For example, in at least some embodiments a viewer might command the bridge, second domain, etc. to move relative to the viewer, and/or relative to some other point or feature. Commands might be delivered to a processor controlling the environment, and might include verbal commands, gestural commands, eye motion commands, etc.

Alternately, the bridge, second domain, etc. may move partly or entirely automatically, without requiring deliberate user commands. For example, as a viewer moves, the bridge, second domain, etc. may move so as to remain substantially stationary with respect to the viewer, perhaps behaving in a fashion similar to that shown in FIG. 20A through FIG. 20C (although the arrangement shown therein does not necessarily exclude the use of viewer commands, the behavior shown is such that the bridge and second domain remain substantially stationary with respect to the viewer).

As yet another alternative, some combination of commanded and automatic motion may be suitable for at least certain embodiments. For example, a default or "rest" position and/or orientation for the bridge, second domain, etc. may be defined in a processor, set by a viewer, or otherwise established. Absent input from the viewer, the bridge, second domain, etc. may then maintain substantially constant position and/or orientation with respect to the viewer (or some other point or feature), while still moving if commanded. Moreover, in at least some embodiments the bridge, second domain, etc. may be biased towards their rest position and/or orientation, such that e.g. when not being commanded the bridge, second domain, etc. tends to return towards their rest position and/or orientation.

In arrangements having such a rest position and/or a rest orientation, the rest position and/or rest orientation may vary considerably. For example, with respect to rest positions for certain embodiments it may be useful to dispose a rest position outside the visual field of the viewer, substantially at the edge of the visual field of the viewer, or partly or entirely within the visual field of the viewer. The rest orientation likewise may vary.

Other arrangements for motion, rest position and/or orientation, etc. also may be equally suitable.

Entities present in the first domain and/or the second domain also may be moveable. It should be kept in mind that the distinction between first and second domain may be purely logical rather than necessarily spatial, thus for example the second domain may not be a space in a strict sense, and the idea of motion within the second domain may not be relevant. As a more concrete example, if entities "within" the second domain exist only as data stored and/or manipulated on a processor, the second domain may have no dimensions and the notion of the position of such entities within the second domain may be meaningless.

However, even for embodiments wherein position and/or orientation is meaningful, and wherein entities are moveable, the motion behavior of such entities may not necessarily be intuitive, nor is such motion required to correspond entirely (or even at all) with natural law as applicable to physical objects.

Figure 21:
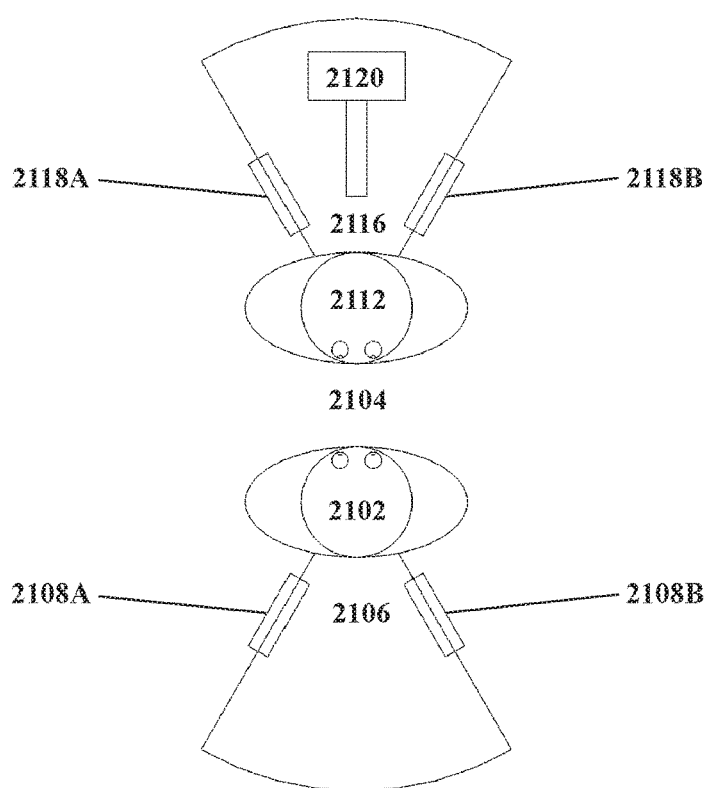
FIG. 21 shows an overhead schematic view of an example arrangement of two viewers, each with second domains according to the present invention.

For example, with reference to FIG. 21 an arrangement is illustrated with two viewers 2102 and 2112 shown therein. As a preliminary matter, the viewer identified with reference number 2102 is referred to herein as the alpha viewer 2102, and the viewer identified with reference number 2112 is referred to herein as the beta viewer. As will described below, both viewers 2102 and 2112 have for example second domains associated therewith, and it is considered that terms such as "first second domain", "second second domain", would be unnecessarily confusing.

In FIG. 21, only one first domain 2104 is illustrated. While it is possible to define independent first domains specific to each user, the arrangement in FIG. 21 assumes a single common first domain for all viewers, with each viewer having an individual second domain associated specifically with that viewer.

Behind the alpha viewer 2102 is an alpha second domain 2106 associated therewith, having first and second alpha bridges 2108A and 2108B in communication with the first domain 2104. Similarly, behind the beta viewer 2112 a beta second domain 2116 associated therewith, having first and second beta bridges 2118A and 2118B in communication with the first domain 2104. In addition, the beta second domain 2116 has therein an entity 2120.

Figure 22:
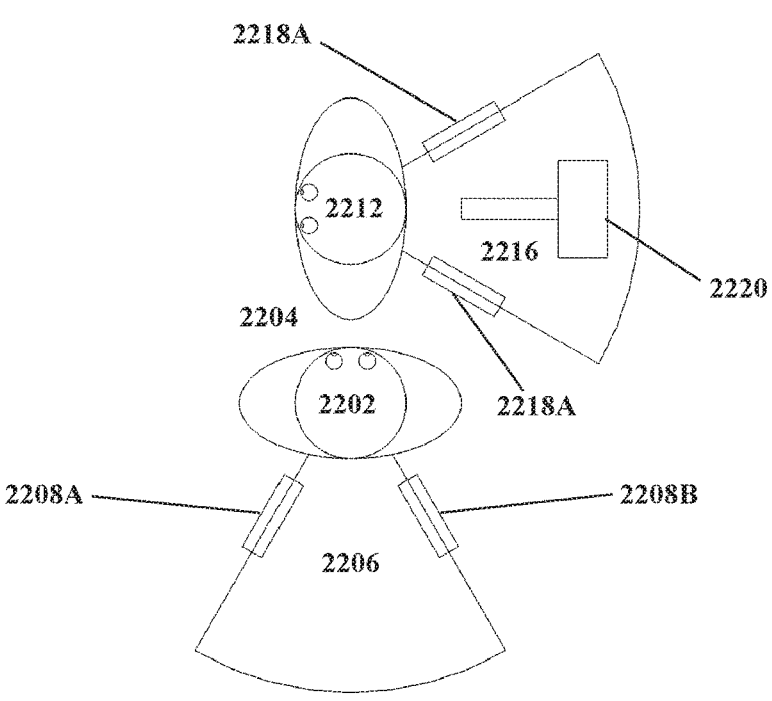
FIG. 22 shows an overhead schematic view of an example arrangement of two viewers, one viewer being rotated, each with second domains according to the present invention.

Turning to FIG. 22, an arrangement at least somewhat similar to that in FIG. 21 is shown, except that the beta viewer 2212 is rotated approximately 90 degrees clockwise. FIG. 21 also includes a first domain 2204 and an alpha viewer 2202. An alpha second domain 2206 is shown associated with the alpha viewer 2202, having first and second alpha bridges 2208A and 2208B in communication with the first domain 2204. A beta second domain 2116 is shown associated with the beta viewer 2112, having first and second beta bridges 2218A and 2218B in communication with the first domain 2204. In addition, the beta second domain 2216 has therein an entity 2220.

Assuming for illustrative purposes that FIG. 21 and FIG. 22 represent sequential events, it may be considered that the beta viewer 2212 in FIG. 22 has rotated 90 degrees clockwise. It is noted that the beta bridges 2218A and 2218B and the beta second domain 2216 likewise move with the beta viewer 2212. Furthermore, the entity 2220 also moves with the viewer. It is emphasized that the entity 2220, although not visibly restrained, does not remain in place as the beta viewer 2212 moves; the entity 2220 is not left behind. Where a purely physical object might be subject to inertia, might have to be restrained, etc., as illustrated in FIG. 22 the entity 2220 moves substantially with the beta bridges 2218A and 2218B and the beta second domain 2216, such that the entity 2220 remains substantially stationary with the beta bridges 2218A and 2218B and the beta second domain 2216 (and likewise with the beta viewer 2212, since the beta bridges 2218A and 2218B and the beta second domain 2216 are shown to remain substantially stationary with respect to the beta viewer 2212).

Thus, with reference to FIG. 21 and FIG. 22, motion of second domains, bridges, etc. in and of itself does not necessarily cause a transfer of entities from a second domain into a first domain, even if a second domain moves so as to overlap an entity, and even if a bridge moves such that an entity passes spatially therethrough.

Figure 23:
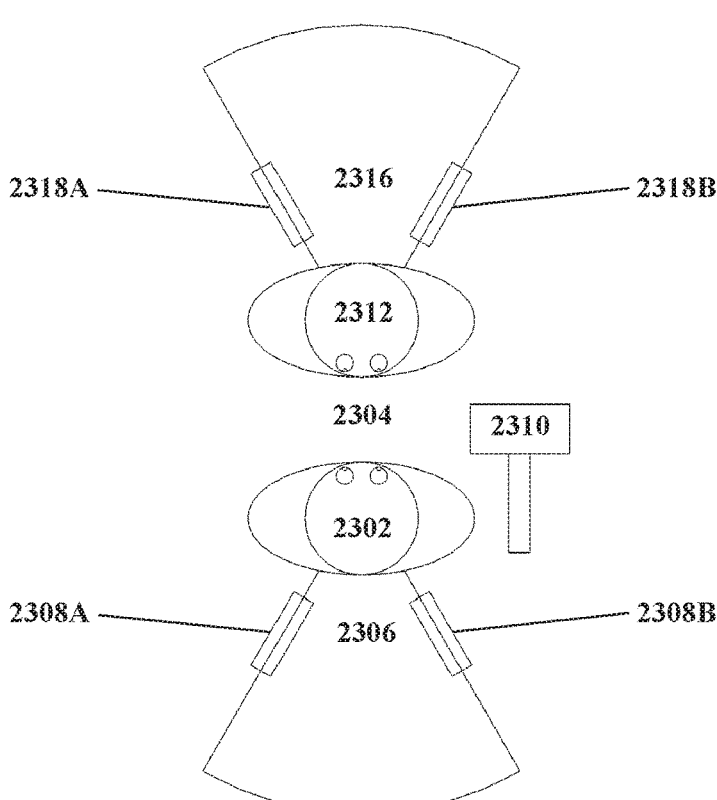
FIG. 23 shows an overhead schematic view of an example arrangement of two viewers, each with second domains according to the present invention.

With reference to FIG. 23, an arrangement is shown with an alpha viewer 2302, a beta viewer 2312, and a first domain 2304. An alpha second domain 2306 is shown associated with the alpha viewer 2302, having first and second alpha bridges 2308A and 2308B in communication with the first domain 2304. A beta second domain 2316 is shown associated with the beta viewer 2312, having first and second beta bridges 2318A and 2318B in communication with the first domain 2304. In addition, an entity 2310 is disposed within the first domain 2304.

Figure 24:
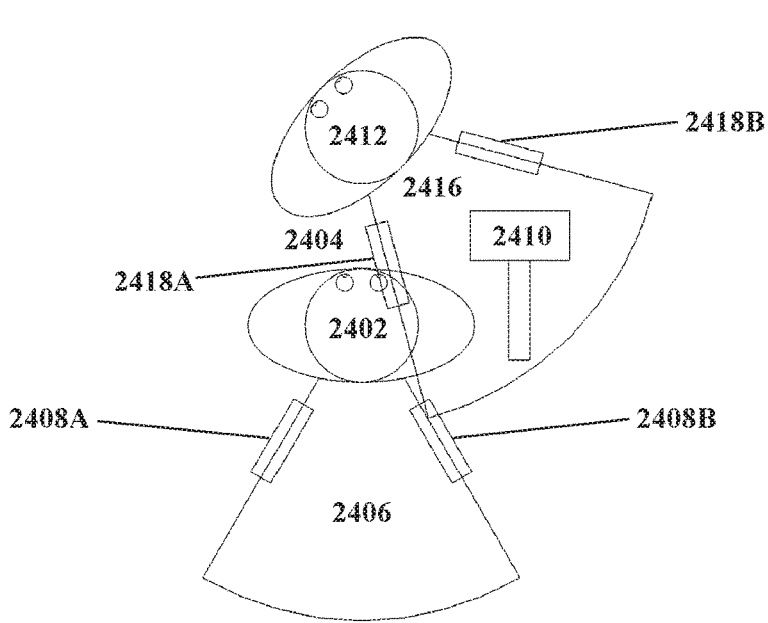
FIG. 24 shows an overhead schematic view of an example arrangement of two viewers, one viewer being rotated, each with second domains according to the present invention.

Turning now to FIG. 24, another arrangement is shown that is at least somewhat similar to that of FIG. 23, the arrangement of FIG. 24 also having an alpha viewer 2402, a beta viewer 2412, and a first domain 2404. An alpha second domain 2406 is shown associated with the alpha viewer 2402, having first and second alpha bridges 2408A and 2408B in communication with the first domain 2404. A beta second domain 2416 is shown associated with the beta viewer 2412, having first and second beta bridges 2418A and 2418B in communication with the first domain 2404.

An entity 2410 also is shown.

It is noted that as compared with FIG. 23, in FIG. 24 the beta viewer 2412 is rotated approximately 135 degrees clockwise, with the beta second domain 2416 and the beta bridges 2418A and 2418B being rotated therewith.

Assuming for illustrative purposes that FIG. 23 and FIG. 24 represent sequential events, it may be considered that the beta viewer 2412 in FIG. 24 has rotated 135 degrees clockwise. Because the beta bridges 2418A and 2418B and the beta second domain 2416 likewise move with the beta viewer 2412, the beta second domain 2416 now overlaps the entity 2410. However, if as stated FIG. 23 and FIG. 24 are considered to be sequential, then the entity 2410 in FIG. 24 corresponds with the entity 2310 in FIG. 23. As described previously with reference to FIG. 23, the entity 2310 therein is disposed in the first domain 2304. If FIG. 23 and FIG. 24 are considered to be sequential, the entity 2410 in FIG. 24 therefor likewise will be in the first domain 2404, absent an appropriate stimulus being executed so as to transfer the entity 2410 into either the alpha second domain 2406 or the beta second domain 2416.

Thus, with reference to FIG. 23 and FIG. 24, motion of second domains, bridges, etc. in and of itself does not necessarily cause a transfer of entities from a first domain into a second domain, even if a second domain moves so as to overlap an entity, and even if a bridge moves such that an entity passes spatially therethrough.

Similarly, it will be understood that just as motion of domains, bridges, etc. with respect to stationary entities does not necessarily transfer those entities between first and second domains (with reference to FIG. 21 and FIG. 22, and FIG. 23 and FIG. 24), likewise motion of entities with respect to stationary domains, bridges, etc. does not necessarily transfer those entities between first and second domains. Furthermore, combined motions of moving domains, bridges, etc. and moving entities also do not necessarily transfer entities between first and second domains.

Rather, entities are transferred between first and second domains through execution of first and second stimuli. Although first and/or second stimuli may include spatial motions of entities and/or first domains and/or second domains, such spatial motions alone are not necessarily sufficient to transfer entities between first and second domains, except in embodiments wherein the stimuli are specifically defined such that such motions alone constitute the stimuli (in which case executing those motions would constitute executing the appropriate stimuli, which then may be sufficient for transfer between first and second domains).

As has been previously described, entities may be transferred from a first domain to a second domain with a first stimulus, and from a second domain to a first domain with a second stimulus. However, the present invention is not limited only to such stimuli. Other stimuli for implementing other functions may also be included. Additional stimuli may include, but are not limited to, a third stimulus that transfers entities between an alpha second domain and a beta second domain for embodiments wherein two or more viewers (alpha and beta) are present, each with a second domain associated therewith.

Although bridges as previously described herein are adapted to communicate between first and second domains, bridges may be adapted to communicate between alpha second domains and beta second domains in addition or instead. This may be counterintuitive if first domains, second domains, and/or bridges are considered to be spatial objects. However, as has been previously stated, first domains, second domains, and/or bridges are not required to be spatially defined, and may be purely logical in nature.

Thus, for example, a bridge may be adapted to transfer objects between a first domain and an alpha second domain, and also may be adapted to transfer objects between an alpha second domain and a beta second domain, even if there is no apparent spatial connection therebetween (and even if in terms of geometry such a spatial connection may appear impossible).

It is emphasized that the bridge, like the first and second domains, may be partly or entirely a logical construct. While a bridge may have spatial dimension, and may function spatially (e.g. as a spatial link between spatially-defined first and second domains), this is not required, and the present invention is not limited only thereto. The bridge may, for certain embodiments, have substantially no dimensional form at all, rather being implemented only as executable instructions for transferring entities from one domain to another in response to appropriate first and second stimuli. Thus, for certain embodiments a bridge might also transfer entities between alpha and beta second domains associated with alpha and beta viewers, e.g. in response to a third stimulus.

In similar fashion as described above with respect to FIG. 21 through FIG. 24, for an arrangement wherein a bridge may transfer an entity from an alpha second domain to a beta second domain, motion alone is not necessarily sufficient to effect a transfer absent a third stimulus. Such functionality is illustrated in FIG. 25 and FIG. 26.

Figure 25:
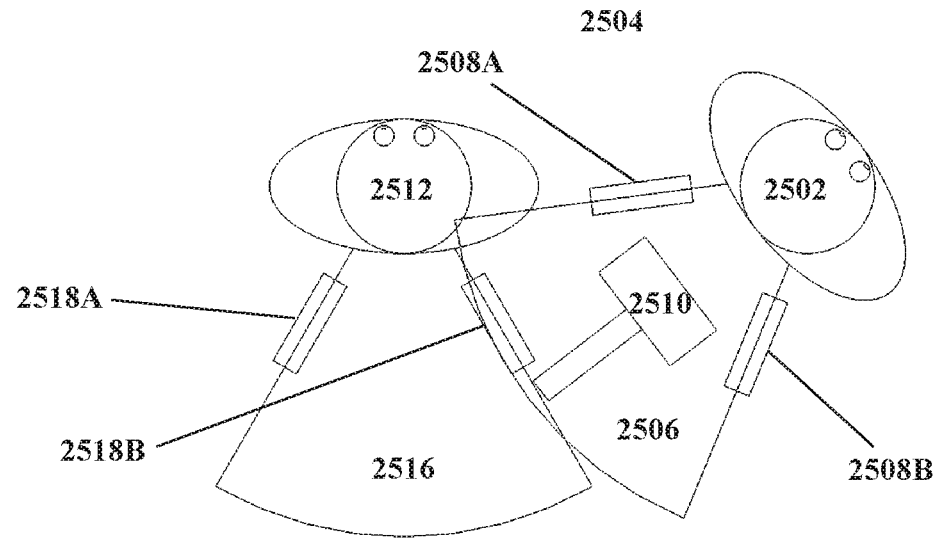
FIG. 25 shows an overhead schematic view of an example arrangement of two viewers, each with second domains according to the present invention.

In FIG. 25, an example arrangement is shown with an alpha viewer 2502, a beta viewer 2512, and a first domain 2504. An alpha second domain 2506 is shown associated with the alpha viewer 2502, having first and second alpha bridges 2508A and 2508B in communication with the first domain 2504. A beta second domain 2516 is shown associated with the beta viewer 2512, having first and second beta bridges 2518A and 2518B in communication with the first domain 2504. In addition, an entity 2510 is disposed within the alpha second domain 2506.

Figure 26:
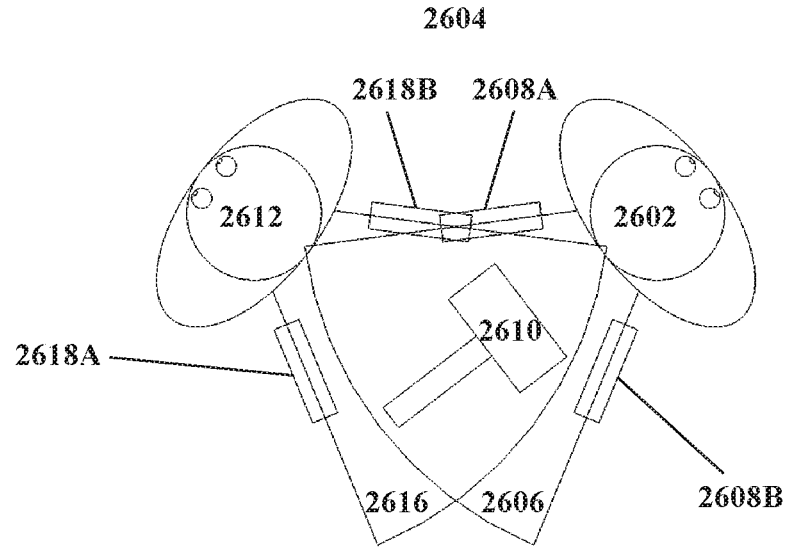
FIG. 26 shows an overhead schematic view of an example arrangement of two viewers, one viewer being rotated, each with second domains according to the present invention.

Turning now to FIG. 26, another arrangement is shown that is at least somewhat similar to that of FIG. 25, the arrangement of FIG. 26 also having an alpha viewer 2602, a beta viewer 2612, and a first domain 2604. An alpha second domain 2606 is shown associated with the alpha viewer 2602, having first and second alpha bridges 2608A and 2608B in communication with the first domain 2604. A beta second domain 2616 is shown associated with the beta viewer 2612, having first and second beta bridges 2618A and 2618B in communication with the first domain 2604.

FIG. 26 also shows therein an entity 2610.

It may be considered for the sake of the example of FIG. 26 that alpha bridges 2608A and 2608B and/or beta bridges 2618A and 2618B are adapted to communicate between alpha second domain 2606 and beta second domain 2616, since absent such communication consideration of the potential transfer of an entity 2610 from the alpha second domain 2606 and beta second domain 2616 via the alpha bridges 2608A and 2608B and/or beta bridges 2618A and 2618B would be moot.

As compared with FIG. 25, in FIG. 26 the beta viewer 2612 is rotated approximately 60 degrees counterclockwise, with the beta second domain 2616 and the beta bridges 2618A and 2618B being rotated therewith.

Assuming for illustrative purposes that FIG. 25 and FIG. 26 represent sequential events, it may be considered that the beta viewer 2612 in FIG. 24 has rotated 60 degrees counterclockwise. Because the beta bridges 2618A and 2618B and the beta second domain 2616 likewise move with the beta viewer 2612, the beta second domain 2616 now overlaps the alpha second domain 2606 and the entity 2610 in the alpha second domain 2606. However, although the beta second domain 2616 now overlaps the entity 2610, the entity 2610 is not necessarily transferred to or otherwise present in the beta second domain 2616, absent an appropriate stimulus (e.g. a third stimulus) being executed so as to transfer the entity 2610 into the beta second domain 2616.

Thus, with reference to FIG. 25 and FIG. 26, motion of second domains, bridges, etc. in and of itself does not necessarily cause a transfer of entities from an alpha second domain into a beta second domain, even if one or both of the alpha and beta second domains move so as to overlap an entity, and even if a bridge moves such that an entity passes spatially therethrough. Similarly, motion of entities with respect to stationary domains, bridges, etc. does not necessarily transfer those entities between alpha and beta second domains. Furthermore, combined motions of moving domains, bridges, etc. and moving entities also do not necessarily transfer entities between alpha and beta second domains. Rather, entities are transferred between alpha and beta second domains through execution of third stimuli.

With respect collectively to FIG. 21 through FIG. 26, transfer of entities between domains does not happen by incidental motions of domains, bridges, entities, etc., or otherwise accidentally, but rather in response to appropriate stimuli.

Figure 27:
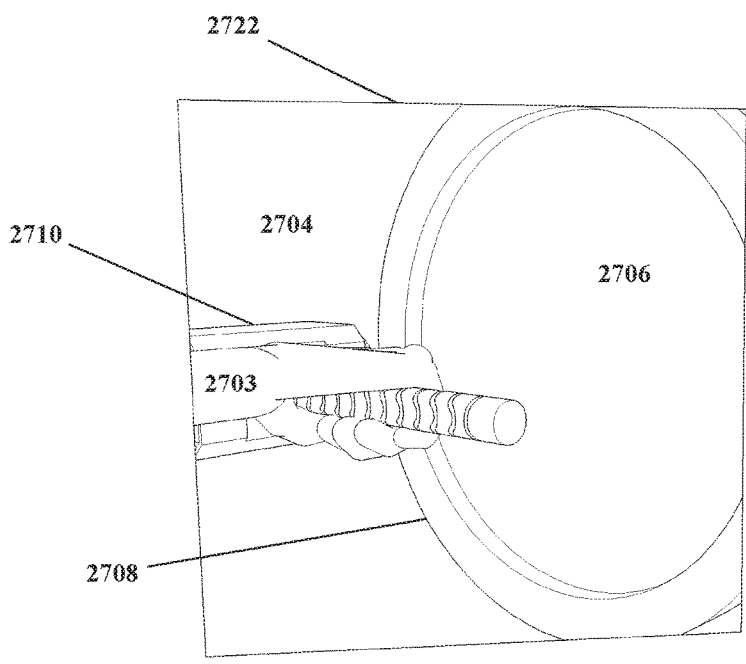
FIG. 27 shows a window outputting a portion of a first domain according to the present invention.

Moving on to FIG. 27, some or all of the contents of the environment, including but not limited to at least a portion of the first domain, may be outputted in some form. For example, FIG. 27 shows an arrangement with an output window 2722. The output window 2722, in the example as shown, is a two-dimensional image of a portion of the overall environment, including at least a portion of the first domain 2704. Output through an output window is not limited to only the first domain 2704 or a portion thereof, however. As may be seen, the window 2722 also shows a portion of the second domain 2706, a portion of a viewer's hand 2703, a portion of an entity 2710 disposed within the first domain, and a portion of the bridge 2708 communicating between the first and second domains 2704 and 2706.

A window 2722 as shown in FIG. 27 might, for example, represent an image displayed on systems including but not limited to a television, a monitor, a screen of a portable device, etc. Such a window 2722 could then output in a readily viewable form some or all of the environment, including at least a portion of the first domain 2704, etc. For example, for an arrangement wherein the first and second domains 2704 and 2706 and bridge 2708 are defined logically on a processor, and/or controlled by that processor, the appearance, manipulations, functions, etc. relating to the first and second domains 2704 and 2706 and bridge 2708, any entities associated therewith, etc. could be displayed through such a window 2722. However, such an arrangement is an example only, and other arrangements may be equally suitable.

Figure 28:
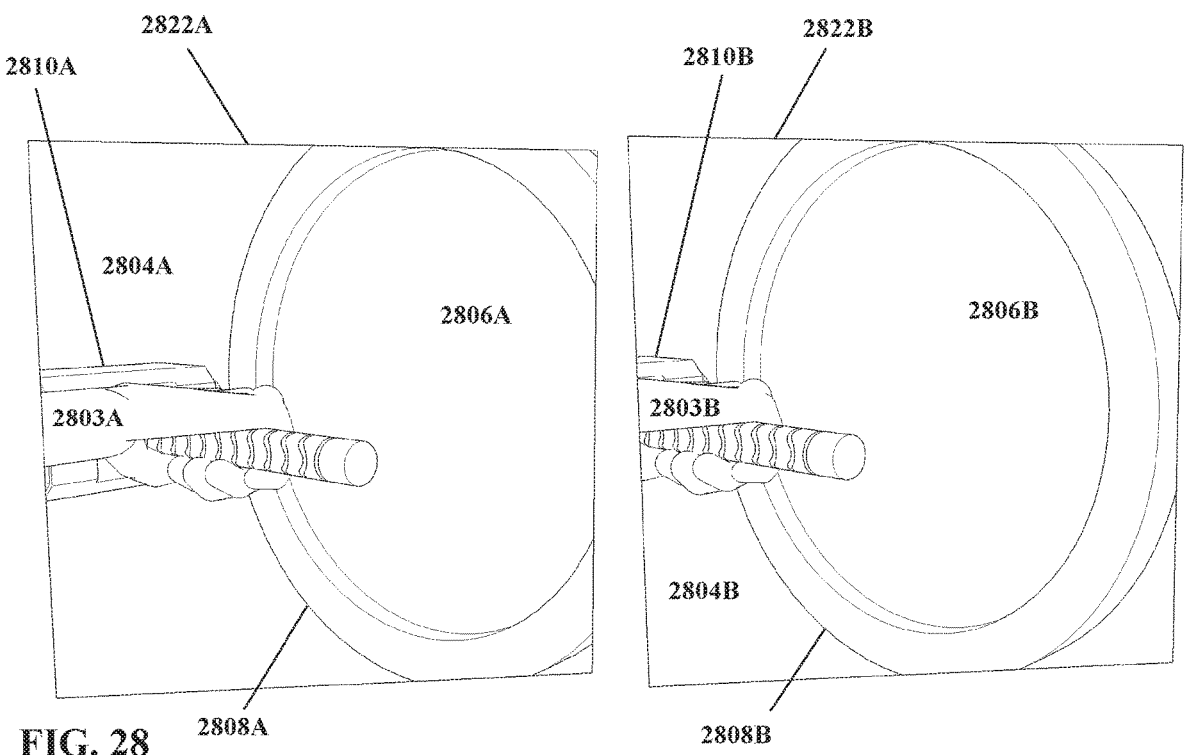
FIG. 28 shows stereo windows outputting portions of a first domain according to the present invention.

One example of such an alternative arrangement is shown in FIG. 28. Therein, first and second windows 2822A and 2822B are shown. The first and second windows 2822A and 2822B display somewhat similar content, however as may be seen the 2822A and 2822B have slightly differing perspectives on that content, as might be expected for windows in a stereo arrangement. That is, the first window 2822A shows portions of a first domain 2804A, a second domain 2806A, a bridge 2808A therebetween, a viewer's hand 2803A, and an entity 2810A disposed in the first domain 2804A. Similarly, the second window 2822B also shows portions of a first domain 2804B, a second domain 2806B, a bridge 2808B therebetween, a viewer's hand 2803B, and an entity 2810B, but the portions thereof as shown are from a point of view slightly to the left of the point of view in the first window 2822A. Taken together, such a stereo pair of windows 2822A and 2822B may serve to provide the appearance of depth, three-dimensionality, etc. even for two dimensional display systems. For example, a viewer utilizing a head mounted display or other device having stereo windows 2822A and 2822B might perceive a virtual and/or augmented reality environment in three dimensions, as though physically immersed therein, even if that environment (and the first domain, second domain, etc.) exist within a processor and are outputted only to two dimensional display screens.

However, the use of stereo output windows, and the use of output windows generally, are examples only, and the present invention is not limited only thereto.

Figure 29:
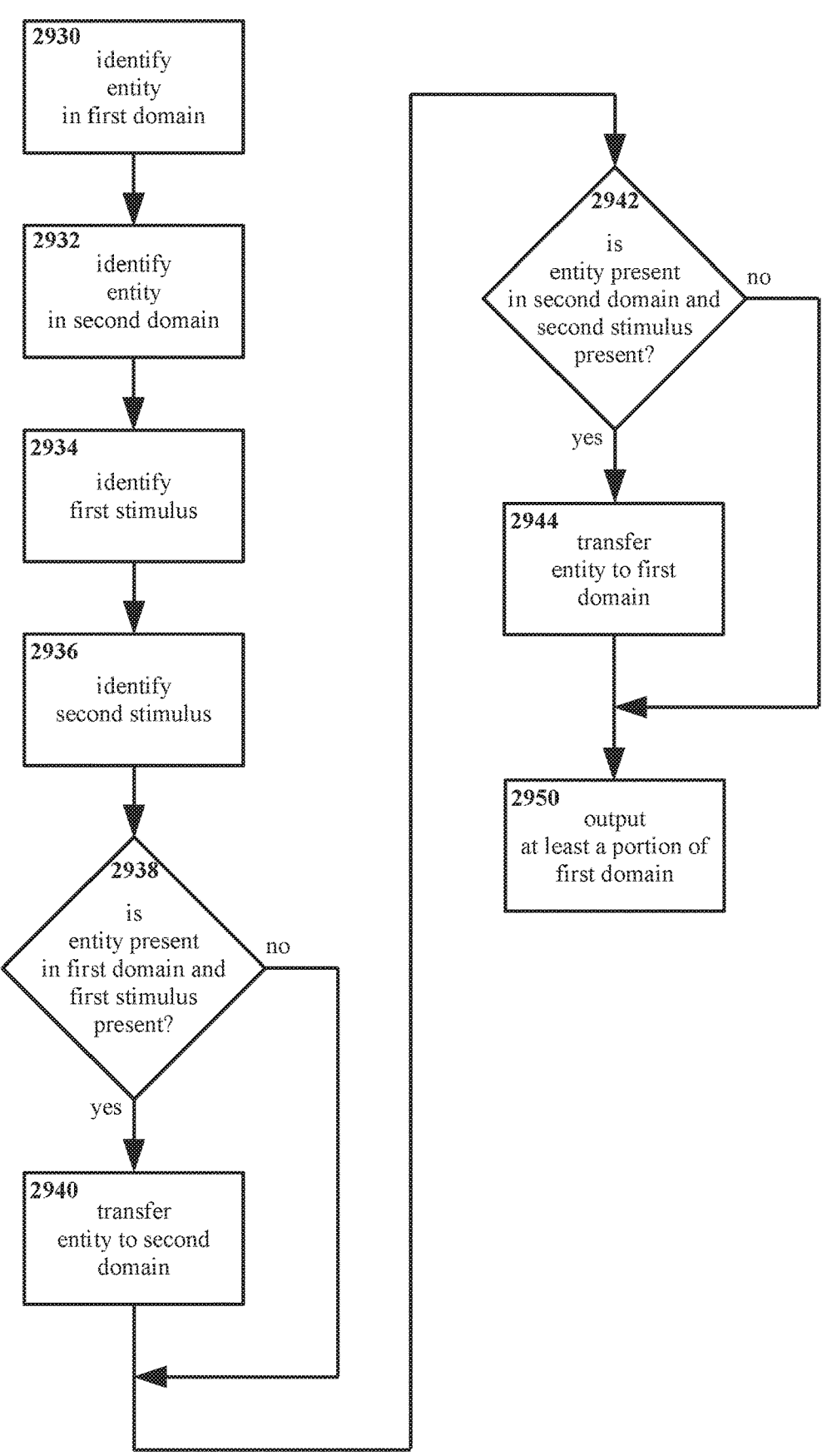
FIG. 29 shows an example method for transferring entities between first and second domains according to the present invention.

With reference now to FIG. 29, an example embodiment of method steps according to the present invention is shown therein.

In the example method of FIG. 29, it is identified whether an entity is present in a first domain 2930. It is also identified whether an entity is present in a second domain 2932. Entities, first domains, and second domains according to the present invention have been described previously herein.

The manner by which the presence of an entity in the first and/or second domains may be identified 2930 and 2932 may vary considerably, and the present invention is not particularly limited with respect thereto. For example, for an embodiment wherein the entities in question are virtual objects, identifying the presence of an entity in the first domain 2930 and/or in the second domain 2932 may be accomplished by evaluating data in a processor controlling the first and/or second domains. That is, for a particular entity that is a virtual entity represented by data in a processor, the location of that particular entity within the first and/or second domains may be acquired by analysis of data in the processor associated with the entity. However, this is an example only, and other arrangements may be equally suitable.

Moving on in FIG. 29, it is identified whether a first stimulus is present 2934. It is also identified whether a second stimulus is present 2936. First and second stimuli according to the present invention also have been described previously herein. With regard to being present, it is noted that stimuli need not necessarily be present in a first or second domain. For at least certain embodiments stimuli may be executed within a first domain and/or a second domain, e.g. executing a gestural first stimulus within the first domain, executing a gestural second stimulus within the second domain, etc. However, stimuli may be executed in multiple domains (for example initiating in a first domain and transitioning into a second domain, or vice versa), or may be executed outside either a first or a second domain according to the present invention.

The identification 2934 and 2934 of the presence of a first stimulus and/or a second stimulus also may be executed in many ways, and the present invention is not particularly limited with respect thereto. For example, for an embodiment wherein the first and second stimuli are gestures with a hand or other end-effector, a sensor such as a camera may be used to sense the gestures being executed. However, this is an example only, and other arrangements may be equally suitable.

Continuing in FIG. 29, a determination is made 2938 as to whether an entity is present in the first domain (as identified in step 2930) and a first stimulus is present (as identified in step 2934). Both factors must be positive for the determination to be positive. If the determination is positive—if an entity is present in the first domain and a first stimulus is present—then the method continues with step 2940 (below). If the determination is negative—if an entity is present in the first domain but the first stimulus is not present, if a first stimulus is present but no entity is present in the first domain, or if no entity is present in the first domain and no first stimulus is present—then the method skips step 2940 and continues with step 2942 (below).

If the determination in step 2938 is positive, the entity in question is transferred 2940 to the second domain.

Moving on in FIG. 29, a determination is made 2942 as to whether an entity is present in the second domain (as identified in step 2932) and a second stimulus is present (as identified in step 2936). Again, both factors must be positive for the determination to be positive. If the determination is positive—if an entity is present in the second domain and a second stimulus is present—then the method continues with step 2944 (below). If the determination is negative—if an entity is present in the second domain but the second stimulus is not present, if a second stimulus is present but no entity is present in the second domain, or if no entity is present in the second domain and no second stimulus is present—then the method skips step 2944 and continues with step 2950 (below).

If the determination in step 2942 is positive, the entity in question is transferred 2944 to the first domain.

At least a portion of the first domain is then outputted 2950. Typically, although not necessarily, at least a portion of the first domain is outputted 2950 to a viewer, e.g. through a monitor, display screen on a hand-held device, head mounted display, etc. It is also permitted but not required to output the entirety of the first domain, and/or any content (such as entities) that may be disposed within and/or visible within the portion of the first domain. Other output also may be permitted but is not required, including but not limited to some or all of the second domain, some or all of the bridge, some or all of entities present within the first and/or second domain, etc.

Typically, but not necessarily, the method of FIG. 29 is executed more than once, e.g. repeating from step 2930 after having completed step 2950. For example, a processor or other system executing the method might cycle through executable instructions for implementing the method steps in a repeating loop, so as to determine in an ongoing manner whether to transfer an entity between the first and second domains and to execute such a transfer as appropriate.

Figure 30:
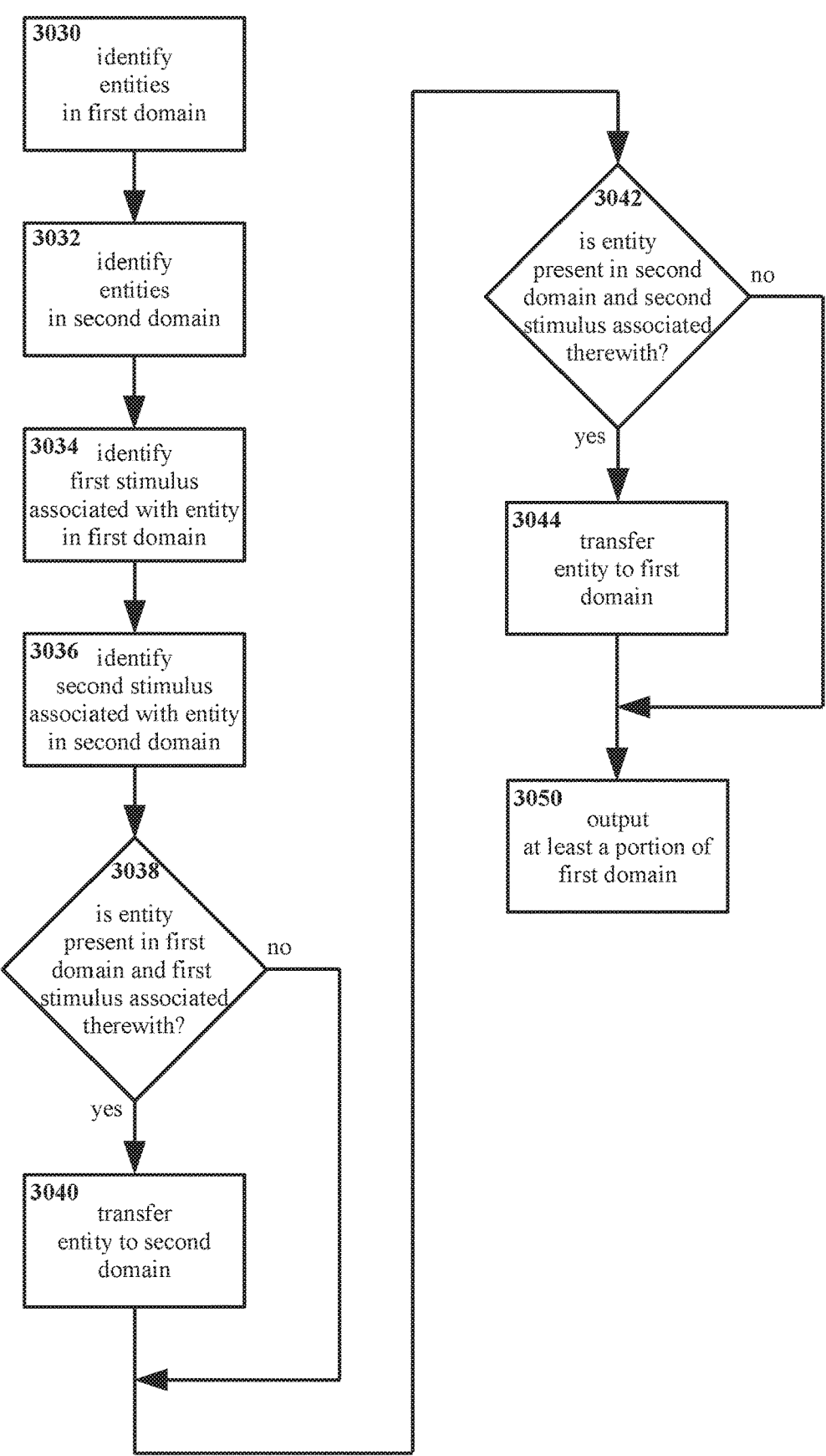
FIG. 30 shows another example method for transferring entities between first and second domains according to the present invention.

Turning now to FIG. 30, while the present invention may be implemented with only a single entity under consideration, for at least some embodiments it may be useful to manage and/or manipulate multiple entities. For simplicity, FIG. 29 was presented with the assumption that only one entity may be present. By contrast, FIG. 30 shows an example embodiment of method steps adapted for addressing multiple entities according to the present invention.

In the example method of FIG. 30, it is identified whether one or more entities are present in a first domain 3030. It is also identified whether one or more entities are present in a second domain 3032. Either or both of the first and second domains may have no entities therein, one entity therein, or multiple entities therein. Regardless of the number of entities, entities therein are identified as present in the appropriate domains.

It is also identified whether a first stimulus is present 3034 in association with one or more of the entities (if any) in the first domain. It is further identified whether a second stimulus is present 3036 in association with one or more of the entities (if any) in the second domain. First and/or second stimuli may be applied to multiple entities at a time, or only to one entity. Identification of whether a first or second stimulus is associated with a particular entity may be accomplished in many ways, and the present invention is not particularly limited with respect thereto. For example, for first and second stimuli that are gestural in nature, a gesture may be identified as being associated with a particular entity based on contact with the entity, on distance to the entity (e.g. some minimum distance between hand or other end-effector and entity), on previous selection of the entity, etc. Other arrangements may be equally suitable.

Continuing in FIG. 30, a determination is made 3038 as to whether an entity is present in the first domain (as identified in step 3030) and a first stimulus associated therewith is present (as identified in step 3034). A distinction is noted here as compared with FIG. 29: it is possible for an entity to be present within the first domain, and a first stimulus to be present, without satisfying the determination of step 3038. Namely, if an entity is present in the first domain, and a first stimulus is present, but the first stimulus is not associated with the entity, then the determination 3038 is negative. Only if an entity is present in the first domain, and a first stimulus is present, and the first stimulus and the entity are associated, is the determination 3038 positive.

If the determination 3038 is positive, then the method continues with step 3040 (below). If the determination is negative, then the method skips step 3040 and continues with step 2942 (below).

If the determination in step 3038 is positive, the entity in question is transferred 3040 to the second domain.

Moving on in FIG. 30, a determination is made 3042 as to whether an entity is present in the second domain (as identified in step 3032) and a second stimulus associated therewith is present (as identified in step 3036). As with step 3038, the determination of step 3042 is positive only if an entity is present in the second domain, and a first stimulus is present, and the first stimulus and the entity are associated.

If the determination 3042 is positive, then the method continues with step 3044 (below). If the determination is negative, then the method skips step 3044 and continues with step 3050 (below).

If the determination in step 3042 is positive, the entity in question is transferred 3044 to the second domain.

At least a portion of the first domain is then outputted 3050.

Figure 31:
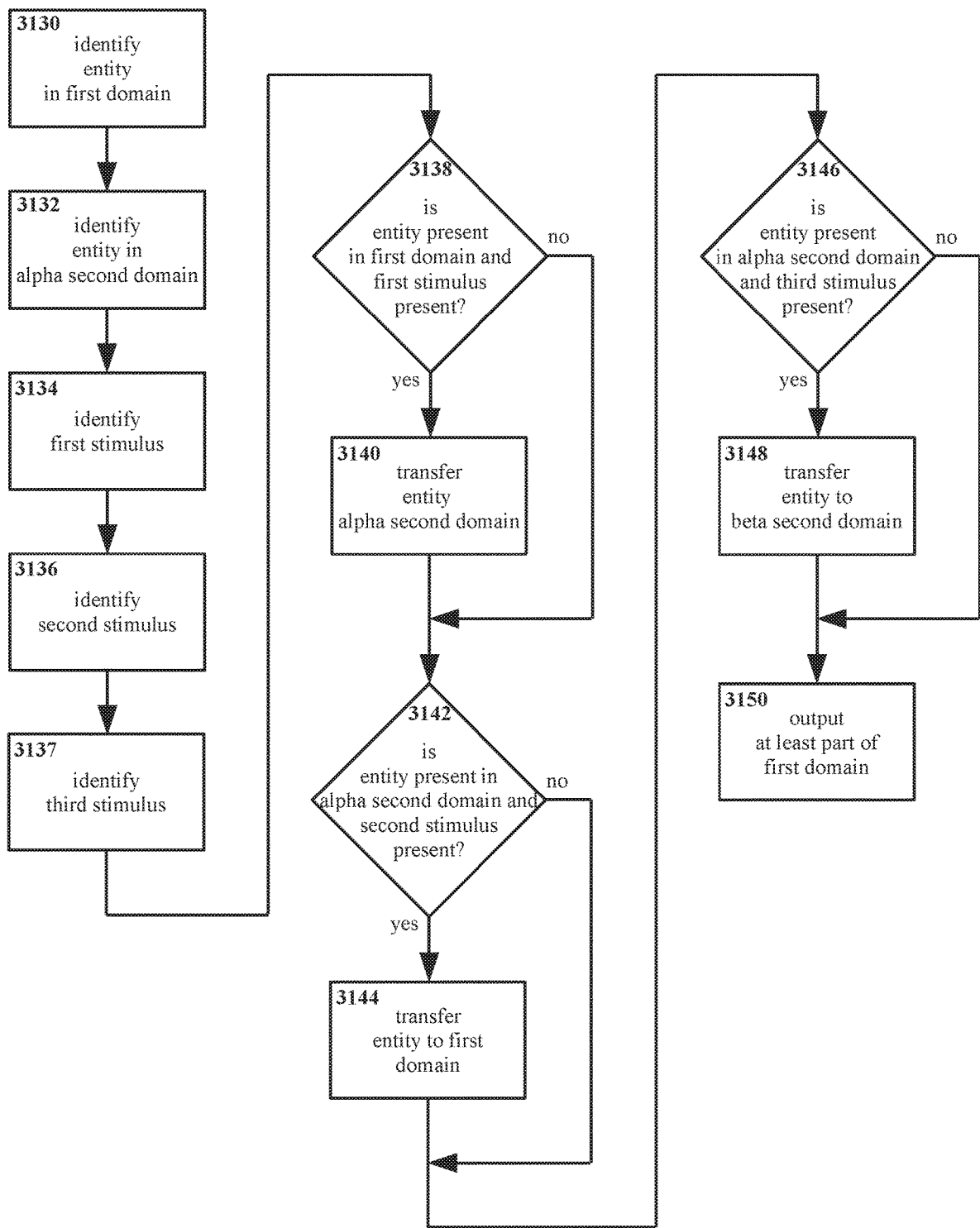
FIG. 31 shows an example method for transferring entities between first and two second domains according to the present invention.

Turning now to FIG. 31, although the present invention may be implemented so as to enable only transfers between one first domain and one second domain, for at least some embodiments it may be useful to enable transfers between two or more second domains. For example, in an arrangement wherein a single viewer has access to two or more second domains (or wherein a second domain has two or more distinct parts), entities might be transferred therebetween without necessarily being transferred to a first domain. Alternately, in an arrangement wherein two or more viewers each have a second domain, entities might be transferred between respective second domains likewise without necessarily being transferred to a first domain. For such arrangements, a third stimulus might for example be utilized to transfer entities from one second domain to another. FIG. 31 shows an example embodiment of method steps adapted for transferring entities between second domains through the use of a third stimulus according to the present invention.

The arrangement of FIG. 31 is an example only. Other arrangements utilizing a third stimulus may also be implemented, potentially with functions other than transfers between second domains. Likewise, addition stimuli beyond a third stimulus also may be implemented, with additional functions.

In the example method of FIG. 31, it is identified whether an entity is present in a first domain 3130. It is also identified whether an entity is present in an alpha second domain 3132. (As in certain previous examples herein, where two or more second domains are referenced those second domains are distinguished as the alpha second domain, the beta second domain, etc. The alpha second domain therefor represents a second domain in which an entity is disposed initially, while a beta second domain—referenced below—represents a second domain into which the entity may be transferred.)

It is identified whether a first stimulus is present 3134. It is also identified whether a second stimulus is present 3136. It is further identified whether a third stimulus is present 3137. As with the first and second stimuli, identifying a third stimulus may be executed in many ways, and the present invention is not particularly limited with respect thereto. For example, for an embodiment wherein the first and second stimuli are gestures with a hand or other end-effector, a sensor such as a camera may be used to sense the gestures being executed. However, this is an example only, and other arrangements may be equally suitable.

A determination is made 3138 as to whether an entity is present in the first domain (as identified in step 3130) and a first stimulus is present (as identified in step 3134). If the determination is positive then the method continues with step 3140 (below). If the determination is negative then the method skips step 3140 and continues with step 3142 (below).

If the determination in step 3138 is positive, the entity in question is transferred 3140 to the alpha second domain.

Moving on in FIG. 31, a determination is made 3142 as to whether an entity is present in the alpha second domain (as identified in step 3132) and a second stimulus is present (as identified in step 3136). If the determination is positive then the method continues with step 3144 (below). If the determination is negative then the method skips step 3144 and continues with step 3146 (below).

If the determination in step 3142 is positive, the entity in question is transferred 3144 to the first domain.

A determination is also made 3146 as to whether an entity is present in the alpha second domain (as identified in step 3132) and a third stimulus is present (as identified in step 3137). If the determination is positive then the method continues with step 3148 (below). If the determination is negative then the method skips step 3148 and continues with step 3150 (below).

If the determination in step 3146 is positive, the entity in question is transferred 3148 to the beta second domain.

At least a portion of the first domain is then outputted 3150.

Typically, though not necessarily, when implemented for alpha and beta viewers the arrangement of FIG. 31 may be implemented such that an alpha viewer may transfer an entity from an alpha second domain associated with the alpha viewer to a beta second domain associated with the beta viewer. That is, a viewer "exports" an entity from a second domain associated with that viewer into a second domain associated with another viewer. However, other arrangements, including but not limited to "importing" an entity from a second domain associated with another viewer, may be equally suitable.

As has been indicated previously, certain embodiments of the present invention may be executed as a machine-implemented method. For example, method steps may be executed on a data processor. In addition, a definitions may be loaded onto and/or defined on a data processor, and/or executable instructions instantiated thereon, so as to enable execution of method steps according to the present invention. FIG. 32 shows such an arrangement.

Referring now to FIG. 32, in a processor, a first domain is defined 3260. A second domain distinct from the first domain also is defined 3262. A bridge is defined 3264 so as to dispose the first and second domains in communication by supporting transfer of entities therebetween. First and second domains and bridges according to the present invention have been described previously herein. It is again pointed out that first and second domains and bridges are, or at least may be, logical constructs, and thus for at least some embodiments may exist entirely or at least primarily as definitions and/or data on a processor.

A first stimulus is defined 3266. A second stimulus also is defined 3268. First and second stimuli according to the present invention also have been previously described herein.

A first response to the first stimulus is defined 3270, the first response being to transfer an entity to the second domain. A second response to the second stimulus is also defined 3272, the second response being to transfer an entity to the first domain. Transfer of entities between first and second domains has been previously described herein.

Executable instructions are instantiated on the processor 3274 to identify whether an entity is present in the first domain. Executable instructions also are instantiated 3276 whether an entity is present in the second domain. Executable instructions are instantiated 3278 to identify the presence of the first stimulus. Executable instructions are instantiated 3280 to identify the presence of the second stimulus.

Executable instructions are instantiated 3282 to execute the first response, that is, to transfer an entity from the first domain to the second domain. Executable instructions are instantiated 3284 to execute the second response, that is, to transfer an entity from the second domain to the first domain.

Executable instructions are instantiated 3286 to output at least a portion of the first domain.

Figure 33:
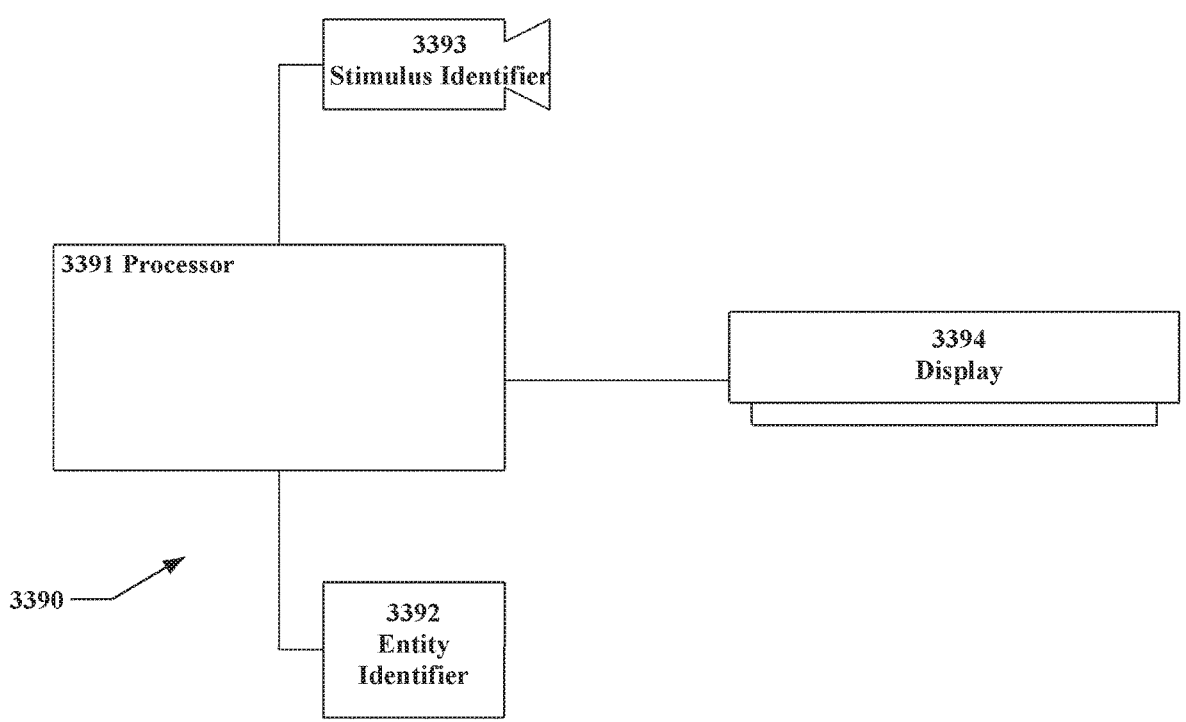
FIG. 33 shows an example apparatus according to the present invention in schematic form.

Turning now to FIG. 33, a schematic of an example apparatus 3390 according to the present invention is shown therein.

The apparatus 3390 includes a processor 3391, an entity identifier 3392 in communication with the processor 3391, a stimulus identifier 3393 in communication with the processor 3391, and a display 3394 in communication with the processor 3391.

The processor 3391 is adapted to define a first domain and a second domain substantially distinct from said first domain, with the first and second domains each having at least two dimensions.

The processor 3391 also is adapted to define a bridge such that the first and second domains are in communication via the bridge so as to enable transfer of an entity between the first and second domains via the bridge. The processor 3391 is further adapted to transfer an entity from the first domain to the second domain in response to a first stimulus, and to transfer an entity from the second domain to the first domain in response to a second stimulus.

A range of general-purpose, special-purpose, and embedded systems may be suitable for use as the processor 3391. It may also be suitable for the processor 3391 to consist of two or more physical or logical processor components.

The entity identifier 3392 is adapted to identify a presence of the entity in the first domain and/or in the second domain, and to communicate the presence of the entity in the first and/or second domain to the processor 3391.

The nature of the entity identifier 3392 is to at least some degree dependent on the nature of the entities in question. For an entity having at least some physical substance (e.g. for an augmented reality environment), an imager or other sensor adapted to detect physical objects may be suitable. For an entity that exists wholly or partially as data, physical sensors may be less suited, although in at least some instances physical sensors may nevertheless detect evidence of entities even without detecting the entities directly, for example by using an imager to view entities as outputted on a display. Although the entity identifier 3392 may be a sensor in some embodiments, this is not required.

The stimulus identifier 3393 is adapted to identify the first and second stimuli, and to communicate the presence of the first and/or second stimuli to the processor 3391.

As with the entity identifier 3392, the nature of the stimulus identifier 3393 is to at least some degree dependent on the nature of the stimuli used for a particular embodiment. For visual stimuli such as gestures with a hand or other end-effector, a sensor such as an imager may be suitable. Likewise, for audio stimuli an audio sensor might be suitable, for text inputs a keyboard might be suitable, etc. Although the entity identifier 3392 may be a sensor in some embodiments, this is not required, for example a keyboard in the previous example may be suitable but may not necessarily be considered a sensor per se.

The display 3394 is adapted to output at least a portion of the first domain.

A range of devices likewise may be suitable for use as the display 3394, including but not limited to light emitting diodes (LED), organic light emitting diodes (OLED), plasma screen panels (PDP), liquid crystal displays (LCD), etc. Likewise, the use of projected or transmitted displays, where the viewed surface (if any) is essentially a passive screen for an image projected or otherwise transmitted after being generated elsewhere, may also be suitable. Other arrangements including but not limited to systems that display images directly onto a viewer's eyes also may also be suitable. Either digital or analog display technologies may be suitable.

An apparatus according to the present invention may vary considerably from one embodiment to another, in ways including but not limited to the following.

Figure 34:
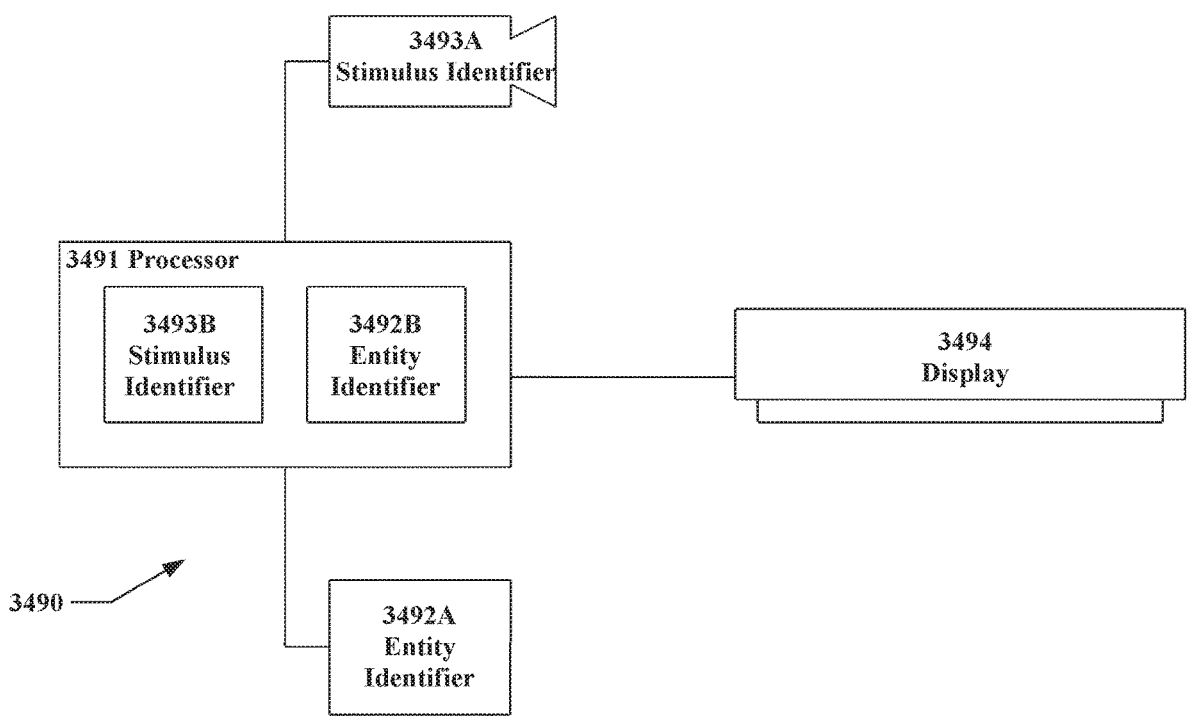
FIG. 34 shows another example apparatus according to the present invention in schematic form, having elements thereof instantiated as executable instructions.

Turning to FIG. 34, another example of an apparatus 3490 according to the present invention is shown therein. The apparatus 3490 includes a processor 3491 and a display 3494 in communication with the processor 3491.

The apparatus 3490 also includes an entity identifier 3492A and 3492B. However, as may be seen, although one portion 3492A of the entity identifier is a hardware component distinct from the processor 3491, another portion 3492B also is present in the form of executable instructions instantiated on the processor 3491. In practice, an entity identifier may be distinct and/or hardware based as is 3492A, or may be a set of executable instructions disposed on a processor as is 3492B, or may be a combination thereof. An entity identifier that is partially or entirely executable instructions may be understood by considering an example wherein entities to be manipulated are virtual entities that are primarily or entirely data. For an entity that is in essence a data construct, it may for certain embodiments be practical to identify the presence of entities in first or second domains by reading the data of the entities, domains, etc. themselves. In such instance, an entity identifier might exist entirely as executable instructions, with no hardware.

Similarly, the apparatus includes a stimulus identifier 3493A and 3493B. As with the entity identifier above, in FIG. 34 the stimulus identifier may have either a hardware component 3493A distinct from the processor 3491, a set of executable instructions 3493B instantiated on the processor 3491, or some combination thereof.

In addition, for certain embodiments it may be suitable to perform multiple functions with a single component. One example of such an arrangement may be seen in FIG. 34 wherein the processor 3491 may also have executable instructions serving as an entity identifier 3492B and/or as a stimulus identifier 3493B disposed thereon. However, other arrangements also may be suitable. For example, a single imager or other hardware device might, for example, serve both to identify stimuli and to identify entities. Thus, even if all functions of the apparatus as described herein are facilitated by a particular embodiment of an apparatus, not all individual functions will necessarily be performed by individual hardware components (of necessarily by individual sets of executable instructions).

Furthermore, it is noted that although components of an apparatus according to the present invention may be integrated as a physically connected unit, such physical connection is not required. For example, although a display might take the form of a monitor, head mounted display screen, etc., wherein other components of the apparatus might readily be physically integrated therewith as a single device, other display arrangements may be equally suitable. One such display arrangement might be an external projector or network thereof, such that a portion of the first domain may be outputted therewith. The output therefrom might then exist as an environment that is visible to a viewer with the naked eye, and/or that is visible to multiple viewers at one time, etc. However, it will be understood that such projectors—which might for example be disposed behind walls, in a ceiling, at intervals around a large physical space, etc.—will not necessarily be physically integrated into a single device.

Likewise, although at least some of the description herein uses as examples a portable, hand-held, and/or wearable apparatus or system, the present invention is not limited thereto. Embodiments that exist for example as substantially stationary rooms, as enclosed environments, etc. may be equally suitable.

Figure 35:
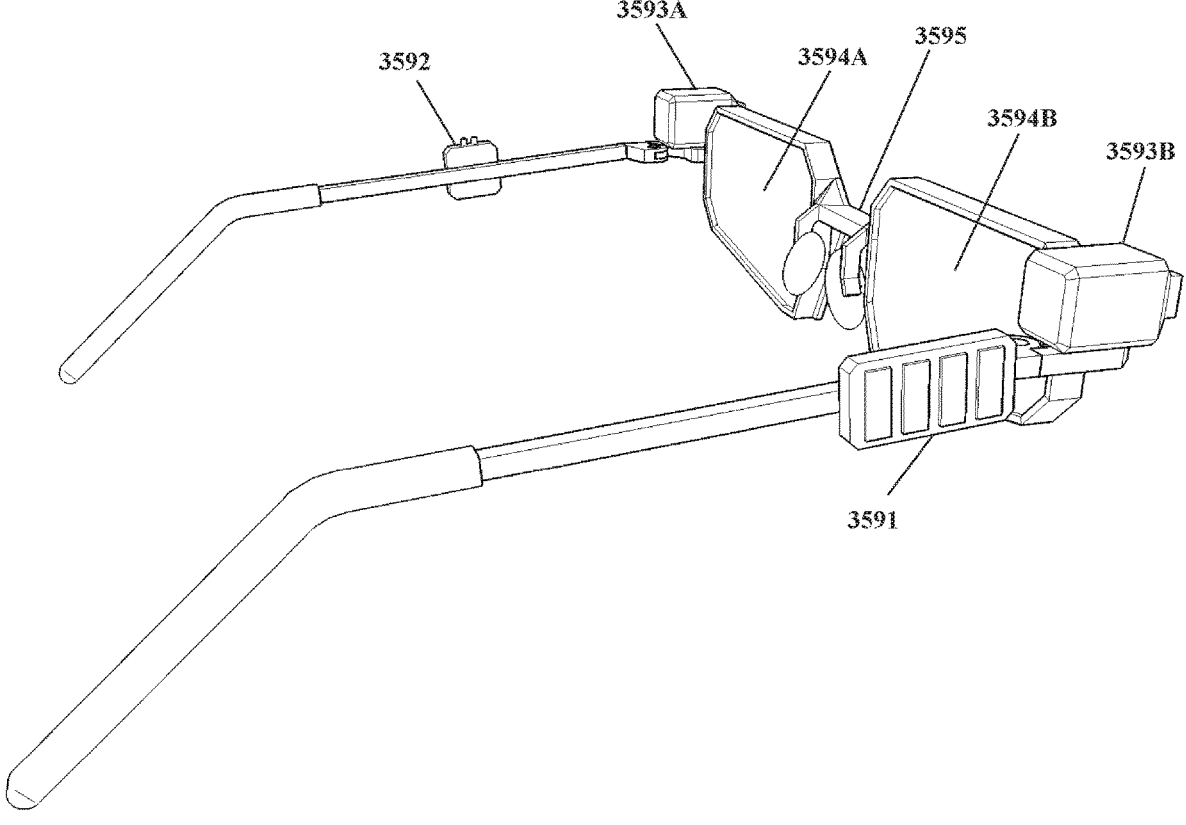
FIG. 35 shows an example apparatus according to the present invention arranged as a head mounted display, in perspective view.

Turning now to FIG. 35, an example embodiment of an apparatus 3590 according to the present invention integrated as a head mounted display unit. The embodiment shown in FIG. 35 includes a processor 3591, an entity identifier 3592 in communication with the processor 3591, a stimulus identifier 3593 in communication with the processor 3591, and a display 3594 in communication with the processor 3591.

It is noted that the stimulus identifier 3593 is shown as a stereo device, having first and second imaging sensors 3593A and 3593B arranged in a stereo configuration. Similarly, the display 3594 is shown as a stereo device, having first and second screens 3594A and 3594B arranged in a stereo configuration. The use of stereo sensors and/or displays may be useful for at least some embodiments, for at least the reason that stereo systems enable the sensing and/or display of depth, so as to support a three dimensional environment. However, such an arrangement is an example only, and the present invention is not limited only to stereo systems.

In addition, the apparatus 3590 shown in FIG. 35 includes a body 3595 in the form of a frame for a head mounted display. As shown the body 3595 resembles a pair of glasses, but this is an example only, and other configurations may be equally suitable. In the arrangement shown, the body 3595 is such that when the body is worn 3595 the stereo display screens 3594A and 3594B would be disposed proximate and substantially in front of a viewer's eyes.

Figure 36:
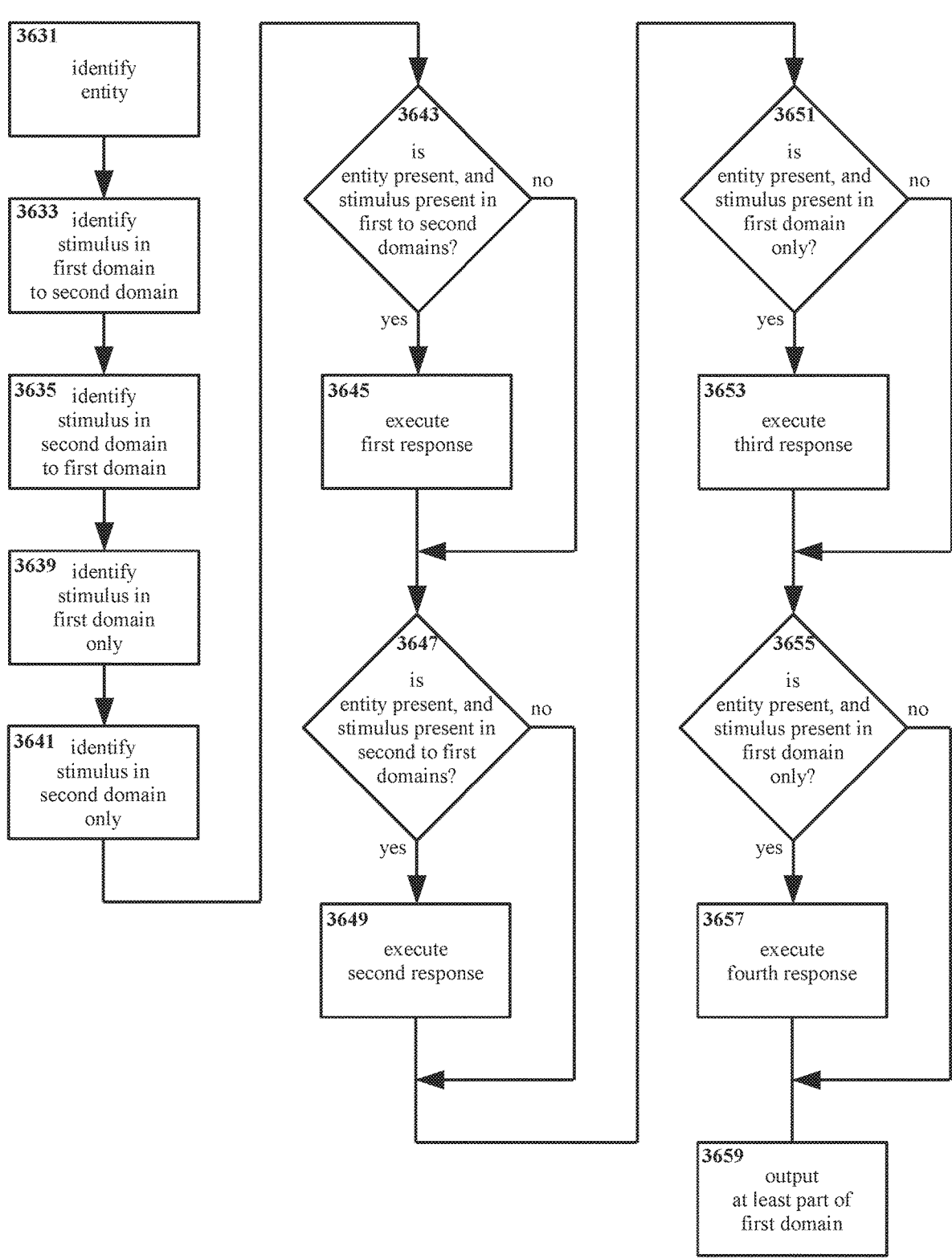
FIG. 36 shows an example method for transferring entities between first and second domains according to the present invention.

With reference now to FIG. 36, although the present invention has been described herein mainly with respect to a relatively specific group of actions responsive to gestures and other stimuli—namely the transfer of an entity between first and second domains—the present invention is not limited only to such responses. The present invention also may be used to invoke responses other than transfer of entities between first and second domains.

Likewise, although the present invention has been described herein mainly with respect to multiple stimuli each having a response associated therewith, e.g. first and second stimuli, the present invention also is not limited only thereto. A single stimulus may be utilized to selectively invoke one of multiple different responses, for example based on where and/or when the stimulus is executed, e.g. executing the stimulus in the first domain as opposed to in the second domain, executing the stimulus beginning in the first domain and transitioning to the second domain or vice versa, etc.

FIG. 36 shows an example embodiment of a method according to the present invention therein, wherein one stimulus may invoke multiple responses based on where the stimulus is executed.

In the example embodiment of FIG. 36, it is identified 3631 whether an entity is present. Entities and identification thereof with regard to the present invention have been previously described herein. However, it is noted that where certain previous examples referred to identifying whether an entity is present specifically in (for example) a first and/or in a second domain, step 3631 is not so limited, nor is the present invention overall so limited. Although an entity in question may be present in first and/or second domains for the example shown in FIG. 36, entities are not required to be present in first and/or second domains to be identified for step 3631.

Moving on in FIG. 36, it is identified 3633 whether a stimulus is present initiating in a first domain and continuing into a second domain. Stimuli, first domains, and second domains according to the present invention have been previously described herein. It is noted that transitioning a stimulus from a first domain to a second domain may, for example, include initiating a hand gesture (for an arrangement wherein a hand gesture is used as a stimulus) within a first domain, then continuing the gesture as the hand moves from the first domain to the second domain (e.g. via a bridge). However, other arrangements may be equally suitable.

It is identified 3635 whether the stimulus is present initiating in the second domain and continuing into the first domain. It is also identified 3639 whether the stimulus is present in the first domain only, and it is further identified 3641 whether the stimulus is present in the second domain only.

It is noted that for purposes of steps 3633, 3635, 3639, and 3641, a single stimulus may be utilized in any of the four conditions (first to second domain, second to first domain, first domain only, second domain only). That is, for an arrangement utilizing a gesture as a stimulus, a single gesture may be identified in any of steps 3633, 3635, 3639, and 3641 depending on where (in terms of domains) the gesture is executed.

Moving on in FIG. 36, a determination 3643 is made as to whether an entity is present (as identified in step 3631) and the stimulus is present in the first domain transitioning to the second domain (as identified in step 3633). If the determination 3643 is positive-if an entity is present and the stimulus is present in the first domain transitioning to the second domain-then the method continues with step 3645 (below). If the determination 3643 is negative, then the method skips step 3645 and continues with step 3647 (below).

If the determination in step 3643 is positive, then a first response is executed 3645. A wide variety of first responses may be suitable for the present invention. For example, as described previously herein, an entity might be transferred between first and second domains. However, other responses might be equally suitable, including but not limited to changes in the size, shape, visibility, content, color, etc. of the entity, changes to the first domain, second domain, and/or bridge, changes to the appearance of the environment overall, and/or changes internal to a processor controlling the environment.

Continuing in FIG. 36, a determination 3647 is made as to whether an entity is present (as identified in step 3631) and the stimulus is present in the second domain transitioning to the first domain (as identified in step 3635). If the determination 364 is positive, then the method continues with step 3649 (below). If the determination 3647 is negative, then the method skips step 3649 and continues with step 3651 (below).

If the determination in step 3647 is positive, then a first response is executed 3651. As noted previously with regard to first responses, a wide variety of second responses may be suitable for the present invention. It is also emphasized that the second response will not necessarily be the same as or even similar to the first response. For example, a first response might include transitioning an entity between first and second domains, while a second response determines whether or not the entity is resolved.

Returning to FIG. 36, a determination 3651 is made as to whether an entity is present (as identified in step 3631) and the stimulus is present solely in the first domain (as identified in step 3639). If the determination 3651 is positive, then the method continues with step 3653 (below). If the determination 3651 is negative, then the method skips step 3653 and continues with step 3655 (below).

If the determination in step 3651 is positive, then a third response is executed 3651. As with the first and second responses, a wide variety of third responses may be suitable.

A determination 3655 is made as to whether an entity is present (as identified in step 3631) and the stimulus is present solely in the second domain (as identified in step 3641). If the determination 3655 is positive, then the method continues with step 3657 (below). If the determination 3655 is negative, then the method skips step 3657 and continues with step 3659 (below).

If the determination in step 3651 is positive, then a fourth response is executed 3651. As with the first, second, and third responses, a wide variety of fourth responses may be suitable.

At least a portion of the first domain is then outputted 3059.

In sum, the arrangement as shown in FIG. 36 facilitates selectively invoking any of four responses with a single stimulus, depending on the conditions under which the stimulus is executed. For example, a single gesture might selectively invoke any of four responses depending on whether the gesture is executed in a first domain, in a second domain, beginning in a first domain and transitioning into a second domain, or beginning in a second domain and transitioning into a first domain. Thus, where the gesture is executed may be used to determine and/or control what the result the gesture produces (e.g. what command the gesture invokes).

An arrangement having first, second, third, and fourth responses as shown in FIG. 36 is an example only. It will be understood that fewer responses may be suitable, if fewer conditions are considered. For example, consider an arrangement wherein steps 3633 and 3636 are removed from the method of FIG. 36, so that the stimulus is only identified as being in the first domain 3639 or in the second domain 3641. Steps 3643 and 3645 then also could be removed from consideration (absent a stimulus in the first domain transitioning to the second domain as identified in step 3633, the determination 3643 can never be positive and the response 3645 will never be executed), and steps 3647 and 3649 likewise could be removed. Such an arrangement would then result in a stimulus being executed under two conditions, with two responses being executed depending on the conditions under which the stimulus is executed.

An arrangement with three responses, or even with one response, likewise may be equally suitable.

Similarly, an arrangement having more than the responses shown in FIG. 36 also may be equally suitable. Such an arrangement might, for example, consider other options with regard to the stimulus, such as an arrangement wherein a stimulus initiates in a first domain, continues in a second domain, and then returns to the first domain and terminates in the first domain. Features other than domain status likewise may be considered.

In addition, as has already been noted with regard to possible first responses for the example of FIG. 36, not all first responses (or second responses, etc.) necessarily will directly affect or even require the presence of an entity. Thus, the arrangement as shown in FIG. 36 might readily be modified so as to eliminate consideration of whether an entity is present altogether (i.e. removing step 3631), while yet remaining functional and within the scope of the present invention. Thus, the first, second, third, and or fourth responses might be selectively invoked with a single stimulus, regardless of the presence or absence of one or more entities, with those responses potentially being entirely unrelated to any entities that might or might not be present.

Figure 37:
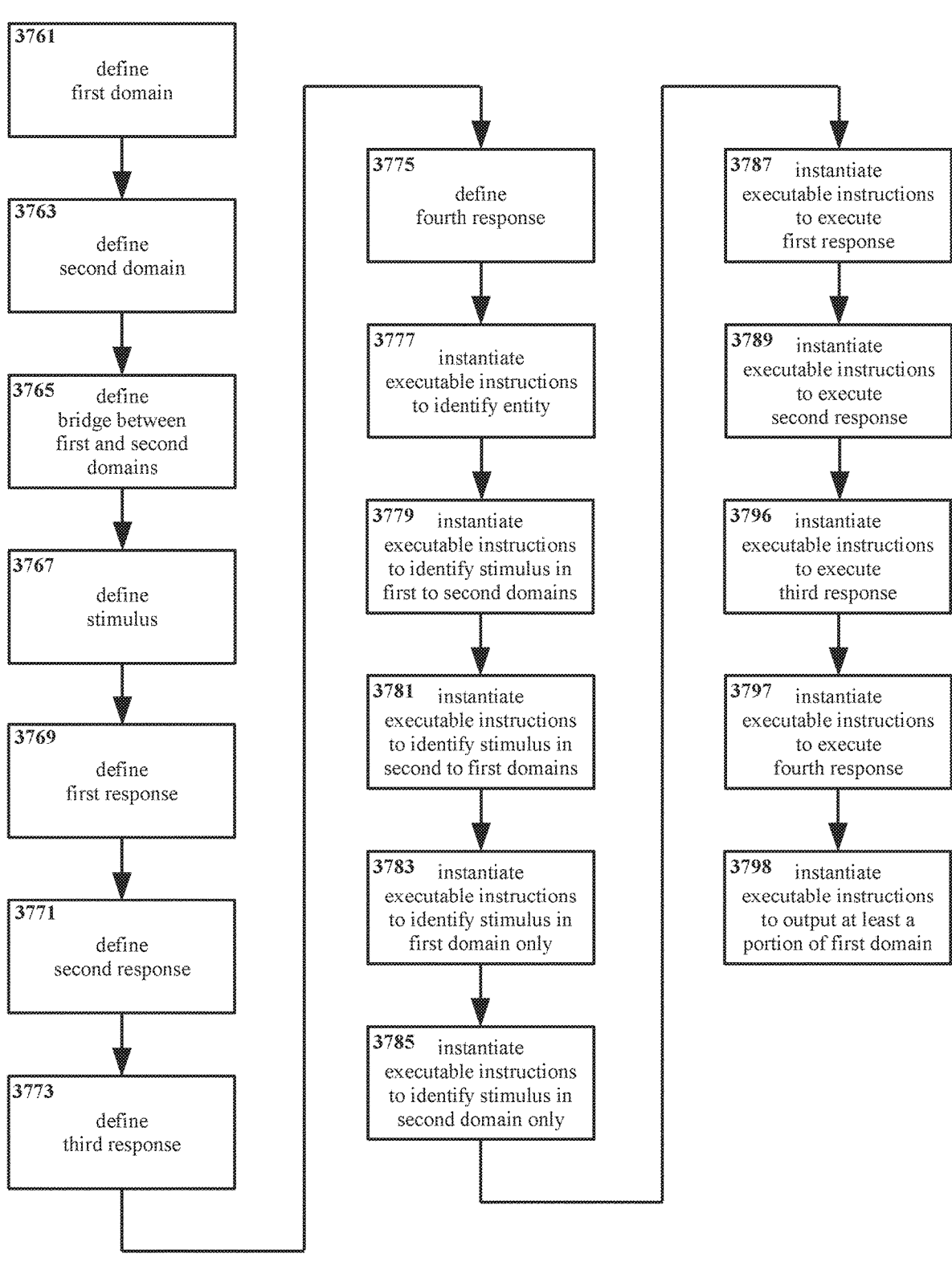
FIG. 37 shows an example method for implementing the steps according to the present invention onto a processor.

Moving on to FIG. 37, as has also been described with respect to FIG. 32 certain embodiments of the present invention may be executed as a machine-implemented method. For example, method steps may be executed on a data processor. In addition, a definitions may be loaded onto and/or defined on a data processor, and/or executable instructions instantiated thereon, so as to enable execution of method steps according to the present invention. FIG. 37 shows such an arrangement for a method at least somewhat similar to that shown in FIG. 36.

In FIG. 37, in a processor, a first domain is defined 3761. A second domain distinct from the first domain also is defined 3763. A bridge is defined 3765 so as to dispose the first and second domains in communication by supporting transfer of entities therebetween. First and second domains and bridges according to the present invention have been described previously herein.

A stimulus is defined 3767. Stimuli according to the present invention also have been previously described herein.

A first response to the stimulus is defined 3769. A second response to the stimulus is also defined 3771. A third response to the stimulus is defined 3773. A fourth response is defined 3775. Example responses such as transfer of entities between first and second domains have been previously described herein, though it is emphasized that the present invention is not limited only to responses relating to transfer of entities between first and second domains.

Executable instructions are instantiated on the processor 3777 to identify whether an entity is present.

Executable instructions are instantiated on the processor 3779 to identify the presence of the stimulus initiating in the first domain and transitioning to the second domain. Executable instructions are instantiated on the processor 3781 to identify the presence of the stimulus initiating in the second domain and transitioning to the first domain. Executable instructions are instantiated on the processor 3783 to identify the presence of the stimulus solely in the first domain. Executable instructions are instantiated on the processor 3785 to identify the presence of the stimulus solely in the second domain.

Executable instructions are instantiated 3787 to execute the first response. Executable instructions are instantiated 3789 to execute the second response. Executable instructions are instantiated 3796 to execute the third response. Executable instructions are instantiated 3797 to execute the fourth response.

Executable instructions are instantiated 3798 to output at least a portion of the first domain.

As with the method in FIG. 36, with respect to FIG. 37 it will be understood that more or fewer than four responses may be utilized through adding or removing appropriate definitions and/or executable instructions while retaining the structure of the example as presented in FIG. 37.

The above specification, examples, and data provide a complete description of the manufacture and use of the composition of the invention. Since many embodiments of the invention can be made without departing from the spirit and scope of the invention, the invention resides in the claims hereinafter appended.

The invention claimed is:
1. A method, comprising:
identifying a presence of at least one of:
a stimulus initiating in a first domain and terminating in a second domain substantially distinct from said first domain, said first and second domains each comprising at least two dimensions, said second domain being substantially distinct from said first domain, said first and second domains being in communication via a bridge so as to enable transfer of said entity between said first and second domains therewith;

said stimulus initiating in said second domain and terminating in said first domain;

said stimulus substantially entirely in said first domain; and said stimulus substantially entirely in said second domain;

if said stimulus is present initiating in said first domain and terminating in said second domain, executing a first response;

if said stimulus is present initiating in said second domain and terminating in said first domain, executing a second response;

if said stimulus is present substantially entirely in said first domain, executing a third response;

if said stimulus is present substantially entirely in said second domain, executing a fourth response;

instantiating in the processor executable instructions adapted to identify the presence of the entity in the first domain and the second domain; and instantiating in the processor executable instructions adapted to identify the presence of the first stimulus and the second stimulus; and outputting at least a portion of said first domain.

2. The method of claim 1, further comprising identifying a presence of at least one entity in at least one of said first domain and said second domain.

3. The method of claim 2, wherein:
said first response comprises transferring said entity from said first domain to said second domain; and
said second response comprises transferring said entity from said second domain to said first domain.

4. The method as in claim 2, further comprising the first and second domains having N dimensions, where N≥3, wherein at least a portion of the second domain is coincident with at least a portion of the first domain in at least two dimensions, and such that that the first and second domains are distinct in at least a dimension other than the two dimensions.

5. The method as in claim 4, further comprising defining the first and second domains in the processor such that at least a portion of the second domain is substantially adjacent a portion of the first domain.

6. The method as in claim 2, further comprising instantiating in the processor executable instructions adapted to enable motion of the bridge.

7. The method as in claim 6, further comprising instantiating in the processor executable instructions adapted to enable motion of the bridge responsive to a viewer command.

8. The method as in claim 6, further comprising instantiating in the processor executable instructions adapted to bias the continuity toward a rest position therefor.

9. The method as in claim 2, further comprising instantiating in the processor executable instructions adapted to selectively resolve the content of the second domain, such that the content is resolved to at least one first viewer but is not resolved to at least one second viewer.

10. The method as in claim 9, further comprising instantiating in the processor executable instructions adapted to selectively resolve the content of the second domain, such that content is resolved with a first configuration to at least one first viewer and with a second configuration to least one second viewer.

11. The method as in claim 2, further comprising:

defining at least one output window; and instantiating in the processor executable instructions adapted to output at least the portion of the first domain through the at least one window.

12. The method as in claim 1, further comprising:

instantiating in the processor executable instructions adapted to execute the first response and the second response; and instantiating in the processor executable instructions adapted to output at least a portion of the first domain.

13. A method, comprising:

defining by a processor a first domain in a first region of space in a real world;

defining by the processor a second domain in a second region of space in the real world;

defining by the processor a bridge that occupies a third region of space that includes a portion of the first domain and a portion of the second domain;

identifying by the processor a presence of at least one stimulus, wherein the stimulus is initiated in accordance with at least one of:

(a) the stimulus initiating in the first domain and terminating in the second domain, wherein:

the first domain and the second domain each comprise at least two dimensions;

the second domain is distinct from the first domain; and the first domain and the second domain are in communication via a bridge so as to enable transfer of an entity between the first domain and the second domain therewith;

(b) the stimulus initiating in the second domain and terminating in the first domain;

(c) the stimulus being entirely in the first domain; and (d) the stimulus being entirely in the second domain;

instantiating, in the processor, executable instructions adapted to identify the entity in the first domain and the second domain;

identifying the entity in the first domain or the second domain;

instantiating, in the processor, executable instructions adapted to identify the stimulus;

in response to the stimulus initiating in the first domain and terminating in the second domain, executing by the processor a first response;

in response to the stimulus initiating in the second domain and terminating in the first domain, executing by the processor a second response;

in response to the stimulus being entirely in the first domain, executing by the processor a third response;

in response to the stimulus being entirely in the second domain, executing by the processor a fourth response; and displaying by a display at least portion of the first domain.

14. The method of claim 13, wherein:

the first response comprises transferring the entity from the first domain to the second domain; and the second response comprises transferring the entity from the second domain to the first domain.

15. The method of claim 13, further comprising:

instantiating, in the processor, executable instructions adapted to execute the first response and the second response; and instantiating, in the processor, executable instructions adapted to display at least the portion of the first domain.

16. The method of claim 13, wherein:

the first domain and the second domain comprise N dimensions, N being greater than or equal to three;

at least part of the second domain is coincident with at least part of the first domain in at least two dimensions; and the first domain and the second domain are distinct in at least one dimension other than the at least two dimensions.

17. The method of claim 16, further comprising defining the first domain and the second domain in the processor such that at least the part of the second domain is adjacent to the part of the first domain.

18. The method of claim 13, further comprising instantiating, in the processor, executable instructions adapted to enable motion of the bridge.

19. The method of claim 18, further comprising instantiating, in the processor, executable instructions adapted to enable motion of the bridge responsive to a viewer command.

20. The method of claim 18, further comprising instantiating, in the processor, executable instructions adapted to bias the bridge toward a rest position therefor.

21. The method of claim 13, further comprising instantiating, in the processor, executable instructions adapted to selectively resolve content of the second domain such that the content of the second domain is resolved to at least one first viewer and is not resolved to at least one second viewer.

22. The method of claim 13, further comprising instantiating, in the processor, executable instructions adapted to selectively resolve a content of the second domain such that:

the content is resolved with a first configuration to at least one first viewer; and the content is resolved with a second configuration to at least one second viewer.

23. The method of claim 13, further comprising:

defining at least one output window; and instantiating, in the processor, executable instructions adapted to display at least the portion of the first domain through the at least one window.

\* \* \* \* \*